(12) United States Patent
Morikawa et al.

(10) Patent No.: US 7,185,194 B2
(45) Date of Patent: Feb. 27, 2007

(54) SYSTEM AND METHOD FOR DISTRIBUTED GROUP MANAGEMENT

(75) Inventors: Ikuya Morikawa, Kawasaki (JP); Makoto Minoura, Kawasaki (JP); Kenichi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 09/863,583

(22) Filed: May 16, 2001

(65) Prior Publication Data

US 2001/0049787 A1    Dec. 6, 2001

(30) Foreign Application Priority Data

May 17, 2000    (JP) ............................. 2000-145397

(51) Int. Cl.
*H04L 9/00*    (2006.01)
(52) U.S. Cl. ....................... 713/156; 713/157; 713/175
(58) Field of Classification Search ........ 713/156–157, 713/167, 175; 705/67; 726/2
See application file for complete search history.

(56) References Cited

U.S. PATENT DOCUMENTS

| | | | |
|---|---|---|---|
| 5,339,403 A * | 8/1994 | Parker | 711/221 |
| 5,633,931 A | 5/1997 | Wright | |
| 5,761,309 A * | 6/1998 | Ohashi et al. | 713/156 |
| 5,818,936 A * | 10/1998 | Mashayekhi | 713/167 |
| 5,892,828 A * | 4/1999 | Perlman | 713/183 |
| 6,052,787 A * | 4/2000 | Euchner et al. | 713/201 |
| 6,055,236 A * | 4/2000 | Nessett et al. | 370/389 |
| 6,609,199 B1 * | 8/2003 | DeTreville | 713/172 |
| 6,981,147 B1 * | 12/2005 | Hamann et al. | 713/175 |

FOREIGN PATENT DOCUMENTS

| | | |
|---|---|---|
| EP | 0 781 003 | 6/1997 |
| JP | 4-71058 | 3/1992 |
| JP | 9-34822 | 2/1997 |
| WO | 99/35783 | 7/1999 |

OTHER PUBLICATIONS

The Kerberos Network Authentication Service (Version 5), Sep. 1993, John Kohl et al., Internet Request for Comments RFC-1510.

(Continued)

*Primary Examiner*—Kim Vu
*Assistant Examiner*—T. B. Truong
(74) *Attorney, Agent, or Firm*—Katten Muchin Rosenman LLP

(57) ABSTRACT

A system of distributed group management for generating authentication information relating to a group to which users belong at a high speed on a client side and, at the same time, wherein a server side can verify this at a high speed. This system provides a group certificate issuing apparatus for issuing a group certificate on a client side based on original group information including the name of the group to which the users belong and a group certificate verification unit for verifying a legitimacy of the certificate transmitted from the client side in a server. Here, the group certificate issuing apparatus adds an issuance side processed value obtained by processing the information of the original group information by a cryptographic function to this original group information to obtain a group certificate, and the group certificate verification unit processes part of information included in the received certificate by an identical cryptographic function to obtain a verification side processed value and performs an authentication by confirming that the issuance side processed value and the verification side processed value coincide.

24 Claims, 47 Drawing Sheets

OTHER PUBLICATIONS

"Proxy-Based Authorization and Accounting for Distributed Systems" by B. Clifford Neuman Proceedings of the 13th International Conference on Distributed Computing Systems, Pittsburgh, May 1993: pp. 283-291.

German Search Report dated Jul. 12, 2002, for German Application 101 24 111.9-53.

* cited by examiner

| USER | GROUP |
|---|---|
| server X, user A<br>server X, user B<br>server Y, user A<br>server Y, user C<br>⋮ | server X.group 3<br>server X.group 1<br>server Y.group 4<br>server Y.group 4<br>⋮ |

| USER | GROUP |
|---|---|
| server X, user A<br>server X, user B<br>server Y, user A<br>server Y, user C<br>⋮ | server X.group 3<br>server X.group 1<br>server Y.group 4<br>server Y.group 4<br>⋮ |

Fig.11

| NAME OF GROUP | AUTHORIZATION | |
| --- | --- | --- |
| | OBJECT | CONTENT |
| group 1 | file A | r- |
| group 1 | file B | — |
| group 2 | file A | rw |
| group 2 | file B | r- |
| group 3 | file A | rw |
| group 3 | file B | rw |
| ⋮ | ⋮ | ⋮ |

Fig. 21

| NAME OF GROUP | LOG-IN REQUEST GC' | | VALUE OF k |
|---|---|---|---|
| | VALID TERM INFORMATION | time stamp | ONE-TIME PASSWORD temp' | |
| server X.group 1 | 00/03/01 | 15:00 | $H^{(n)}(temp')$ | 0 |
| server X.group 4 | 00/03/01 | 13:00 | $H^{(n-4)}(temp')$ | 4 |
| server X.group 2 | 00/03/01 | 14:00 | $H^{(n-6)}(temp')$ | 6 |
| ... | ... | ... | ... |

Fig. 37

LOG FILE OF GROUP CERTIFICATE ISSUING APPARATUS /48

| ISSUE DATE AND TIME | USER | SERVER | GROUP | VALID TERM INFORMATION | TEMPORARY PASSWORD temp |
|---|---|---|---|---|---|
| 00/03/01 09:42 | user A | server X | group 2 | 00/03/01 13:00 | 2983301136 |
| 00/03/01 10:25 | user B | server X | group 1 | 00/03/01 15:00 | 4023502123 |
| ... | ... | ... | ... | ... | ... |

Fig.38

LOG FILE OF SERVER 47

| START DATE AND TIME OF PROCESSING | FINISH DATE AND TIME OF PROCESSING | NAME OF CLIENT HOST | GROUP | VALID TERM INFORMATION | TEMPORARY PASSWORD temp |
|---|---|---|---|---|---|
| 00/03/01 10:14 | 00/03/01 12:20 | host J | group 2 | 00/03/01 13:00 | 2983301136 |
| 00/03/01 10:25 | 00/03/01 14:41 | host K | group 1 | 00/03/01 15:00 | 4023502123 |
| ... | ... | ... | ... | ... | ... |

Fig. 45

DATA HELD BY GROUP CERTIFICATE
TEMPORARY STORING UNIT /52

| NAME OF GROUP | GROUP CERTIFICATE | | | SESSION ID |
|---|---|---|---|---|
| | VALID TERM INFORMATION | time stamp | TEMPORARY PASSWORD temp | |
| server X.group 1 | 00/03/01 | 14:00 | temp_a | 4820100 |
| server X.group 2 | 00/03/01 | 14:00 | temp_b | 4820100 |
| server X.group 3 | 00/03/01 | 14:00 | temp_c | 4820100 |
| server X.group 2 | 00/03/01 | 15:00 | temp_d | 2351121 |
| server X.group 4 | 00/03/01 | 15:00 | temp_e | 2351121 |
| ... | ... | ... | ... | ... |

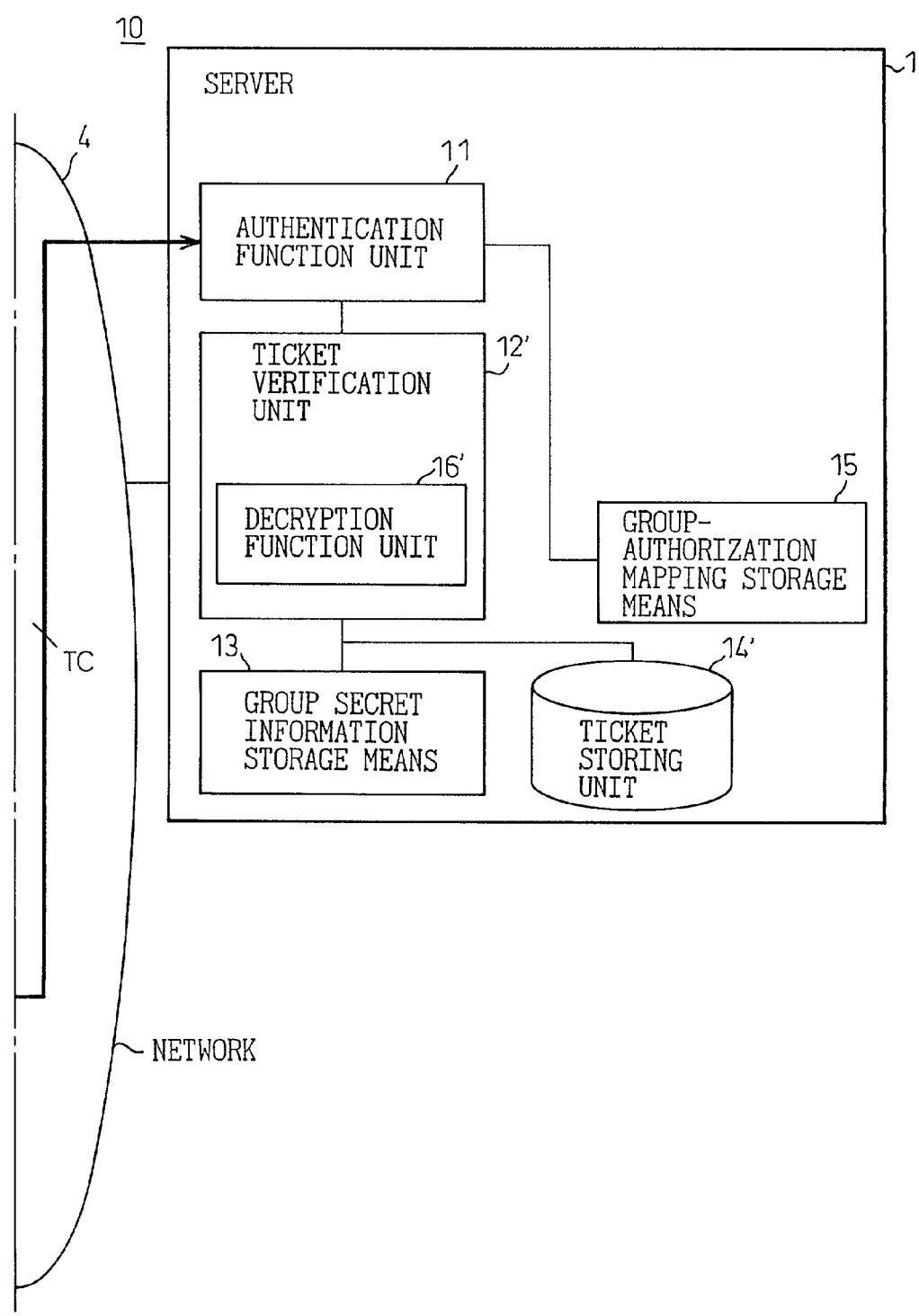

SYSTEM AND METHOD FOR DISTRIBUTED GROUP MANAGEMENT

BACKGROUND OF THE INVENTION

1. Field of the Invention

The present invention relates to a system for distributed group management for management of security of information relating to users and groups to which the users belong at the time of distributed processing among a plurality of computer systems.

Along with the advances made in computer networks in recent years, a demand has arisen for processing for transfer of information distributed among a plurality of computer systems, that is, remote processing. At the time of such remote processing, a management for authentication and management for authorization based on the authentication, that is, security management, are indispensable.

On the other hand, looking at authorization, when there are many users requesting remote processing, the general practice has been to set a plurality of groups each including predetermined users in the computer system. These correspond to the groups explained above. This makes it possible to extremely effectively manage authorizations of many users, for example, authorization for reading files and authorization for reading/writing files.

Note that the concept of a "group" has been widely known under the terms "role" or "privilege". In the present invention, the term "group" will be used to represent these terms. This is because no matter what term used, the basic nature is the same, i.e., a plurality of users can belong to one group (in certain cases, one user can belong to a plurality of groups).

Almost all current authentication systems used for security management authenticate by means of (i) using secret information such as a password or secret key information, (ii) devising a special physical structure and issuing an article difficult to forge such as an IC card, or (iii) utilizing physical characteristics enabling identification of a specific person, for example, fingerprints or retina patterns.

However, there are problems when trying to use each of the means of authentication shown in the above (i) to (iii) as they are directly for the authentication of a group. For example, it is extremely difficult to commonly share the means of authentication by the plurality of users comprising a group. Also, there is an inconvenience that when a user leaves the group, it is also extremely difficult to retrieve the means of authentication from the user.

In order to deal with this, use has been made of a security management technique comprised of a two-tier model, i.e., first authenticating the individual user by the means of authentication shown in the above (i) to (iii), then separately managing to which group the user belongs. This model is used in many computer systems, for example, for UNIX users and groups.

The present invention concerns a security management technique relating to authentication as described above.

2. Description of the Related Art

The conventional standard UNIX has the concepts of users and groups, but these groups exist locally in the corresponding servers. Accordingly, there is the disadvantage that a user requesting usage of authorization shared by this group must first be authenticated as the user by him (or her) self.

On the other hand, relating to the concept of users and groups, an information sharing management technique referred to as a network information service (NIS) is known. When this technique is used, it becomes possible to centrally manage a user/authentication information table, a user/group correspondence table, and a user/authorization correspondence table at a single NIS server for users of the plurality of servers.

However, even if that information sharing management technique is used, close communication must be guaranteed between the server and the NIS server, so this NIS server must be treated more like a server than a client from the viewpoints of the main entity in charge of security management and the structure of the organization. Also, even if that information sharing management technique is used, there is still the accompanying disadvantage explained above that the individual users must be authenticated.

As one of the techniques for dealing with the above disadvantage that the individual users must still be authenticated in this way, the technique of indirect authentication has been known. As one system incorporating such an indirect authentication technique mainly into a UNIX system, a distributed authentication system referred to as "Kerberos" has been proposed in Reference 1 (John Kohl and B. Clifford Neuman, The Kerberos Network Authentication Service (Version 5), Internet Request for Comments RFC-1510, September 1993).

In this Kerberos distributed authentication system, not the server performing remote processing, but another server referred to as a ticket server centrally directly authenticates users. After the direct authentication, the ticket server issues a ticket to each user. In this mechanism, the user presents the issued ticket to the original server to indirectly be authenticated. Such a mechanism is realized by a cryptographic technique.

Further, it is proposed to include group membership information in an extension field of Kerberos Version 5 in Reference 2 (B. Clifford Neuman, Proxy-Based Authorization and Accounting for Distributed Systems, in Proceedings of the Thirteenth International Conference on Distributed Computing Systems, pages 283–291, May 1993).

Under the above background, the known related art will be explained later by using FIG. 48 and FIG. 49. FIGS. 48 and 49 are views of a conventional system of distributed group management. As will be explained later by using these figures, there is the following problem.

An encryption function unit (34') shown in the figure encrypts an original ticket (TC) by using a secret key. Accordingly, it is extremely difficult for a malicious third party to eavesdrop the original ticket (TC) unless knowing the secret key, so the security is secured.

However, in general, the processing speed for the encryption is slow, so a considerable processing time is required. For this reason, there is a problem that the indirect authentication of the group cannot be carried out at a high speed.

SUMMARY OF THE INVENTION

An object of the present invention is to, in view of the above problem, provide a system of distributed group management capable of raising the speed of indirect authentication of a group.

To attain the above object, a system of distributed group management according to the present invention is provided with a group certificate issuing apparatus (3) for issuing a group certificate (GC) on a client (2) side based on original group information including a name of a group to which a user belongs and a group certificate verification unit (12) for verifying legitimacy of a group certificate GC transmitted from the client (2) side in a server (1). Here, the group certificate issuing apparatus (3) adds an issuance side processed value obtained by processing the information of the original group information by a cryptographic function to this original group information to obtain a group certificate (GC). The group certificate verification unit (12) processes part of the information included in the received certificate (GC) by an identical cryptographic function to obtain a verification side processed value and performs the authentication by confirming that the issuance side processed value and the verification side processed value coincide.

Thus, the system of distributed group management can generate authentication information relating to a group to which users belong on the client side at a high speed and, at the same time, verify this on the server side at a high speed.

BRIEF DESCRIPTION OF THE DRAWINGS

The above object and features of the present invention will be more apparent from the following description of the preferred embodiments given with reference to the accompanying drawings, wherein:

FIG. 7 is a view of an example of a data structure in a password storage means 21;

FIG. 8 is a view of an example of the data structure in a user-group mapping storage means 32;

FIG. 11 is a view of an example of the data structure in a group-authorization mapping storage means 15;

FIG. 21 is a view of an example of the data held in a modified group certificate (log-in request) storing unit 14;

FIG. 37 is a view of an example of the data in a log file 48 in a group certificate issuing apparatus 3 of the fifth embodiment;

FIG. 38 is a view of an example of the data in a log file 47 in a server 1 of the fifth embodiment;

FIG. 45 is a view of an example of the data in a group certificate temporary storing unit 52 employed in the seventh embodiment;

FIG. 49 is a second part of a view of the conventional system of distributed group management.

DESCRIPTION OF THE PREFERRED EMBODIMENTS

Before describing the embodiments of the present invention, the related art and the disadvantages therein will be described with reference to the related figures.

Figure 48:
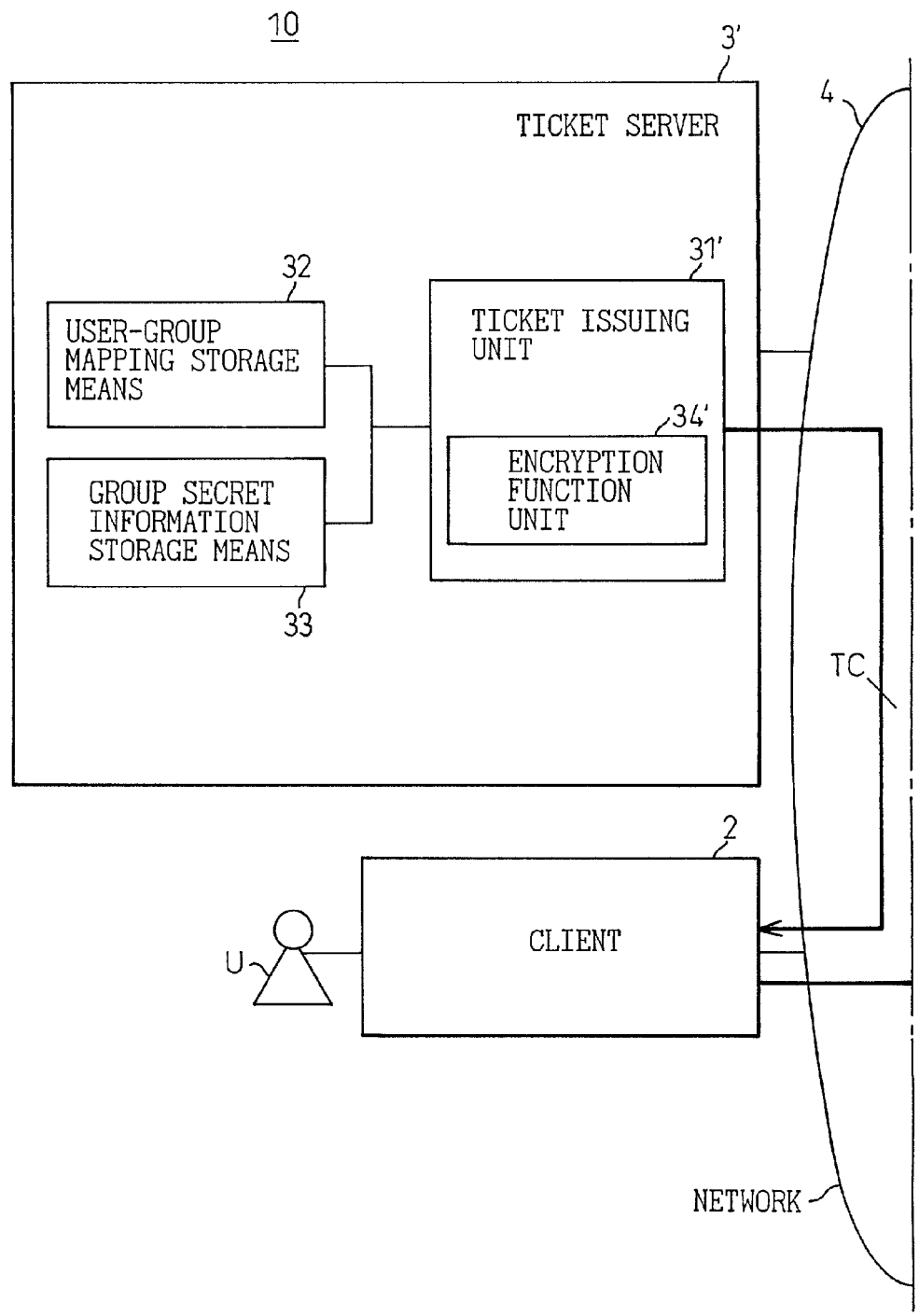
FIG. 48 is a first part of a view of a conventional system of distributed group management.

FIGS. 48 and 49 are first and second parts of a view of a conventional system of distributed group management.

The system shown in these figures represents a system configuration obtained by adding a function for certifying group membership to the Kerberos system disclosed in Reference 2. Note that the system is illustrated in a fashion enabling comparison with the system configuration of the present invention explained later.

Referring to Reference 2, a ticket includes information of the user name of the personal user (U) other than the group membership information, but the server 1 side does not always use the user name. It can apply authentication and authorization just by the group membership information. Therefore, FIGS. 48 and 49 do not show information relating to the user U which can be held by the server 1.

By incorporating the group membership information into the mechanism of the indirect authentication explained above in this way, the user groups can be centrally managed, separately from the server 1. Due to this, a system of distributed group management eliminating the need for registration of the personal users (U) in the server 1 is realized.

The system shown in FIGS. 48 and 49 will be explained in more detail below.

In the figure, reference numeral 10 represents a system of distributed group management. This is comprised of a server 1, a client 2, and a ticket server 3'. These components 1, 2, and 3' can communicate with each other via a network 4.

Usually there are a plurality of clients 2 (only one is shown in the figure for simplification, same below). In addition, a large number of users U request remote processing to the server 1 via these clients 2 and network 4.

A table indicating group membership, that is, to which group each user belongs, is centrally held by the ticket server 3' for all users. In the figure, a user-group mapping storage means 32 functions as the table.

When a user U requests remote processing to the server 1 via the client 2, the user U first requests the issuance of the ticket TC to the ticket server 3'. Note that illustration of the path for this request is omitted (same in following figures). When the ticket server 3' receives the request and acknowledges the fact that the user belongs to for example a "group 2" among for example a "group 1 to group 4" (registered in the means 32 in advance) from the user-group mapping storage means 32, it issues the ticket TC including this "group 2", from a ticker issuing unit 31' and returns that to the client 2. The user accesses the server 1 with this ticket TC to request the remote processing.

Upon receipt of this, the server 1 authenticates the related access at an authentication function unit 11 and decides whether or not it is a legitimate access. At the time of this decision, a ticket verification unit 12' verifies the received ticket TC.

When it acknowledges that the related access is a remote processing request for the "group 2" by the verification of this ticket TC, the server 1 refers to a group-authorization mapping storage means 15 and executes the related remote processing within the authorization if the authorization permitted for the "group 2" is for example "only read from file" (registered in advance).

Note that a group secret information storage means 33 in the ticket server 3' cooperates with a group secret information storage means 13 in the server 1. They have secret information (secret codes) imparted for every group in advance with respect to each other in order to further raise security. Also, a ticket storing unit 14' temporarily stores and holds the received ticket TC. This held information is used for deciding whether or not a request is a remote processing request made by a malicious third party.

Assume that such a malicious third party covertly views the ticket TC from the user on for example the network 4 and tries to alter "group 2" to "group 3" (assume that the authorization given to the "group 3" is for example "both read from file and write to file"). Then, the content of the file may be rewritten by the malicious third party.

Occurrence of such a situation must be prevented as much as possible for security management. An encryption function unit 34' is provided in the ticket issuing unit 31' for this purpose. Here, the ticket TC is encrypted by using a secret code as a secret key and then returned to the client 2.

The encrypted ticket TC is transmitted to the network 4. The server 1 receiving this decrypts the ticket TC in a decryption function unit 16' by using the secret code as a secret key and returns this to the original ticket TC. Such encryption greatly improves the security.

As already explained, the encryption function unit 34' encrypts the original ticket TC with the secret key. Accordingly, unless the malicious third party knows the secret key, it is extremely difficult to covertly view the original ticket TC, so the security is secured.

However, in general, the processing speed for the encryption is slow, so a considerable processing time is required. For this reason, there is the above problem that the indirect authentication of the group cannot be carried out at a high speed.

Accordingly, the present invention provides a system of distributed group management capable of solving the above problem and raising the speed of indirect authentication of a group.

Below, the present invention will be explained in further detail.

Figure 1:
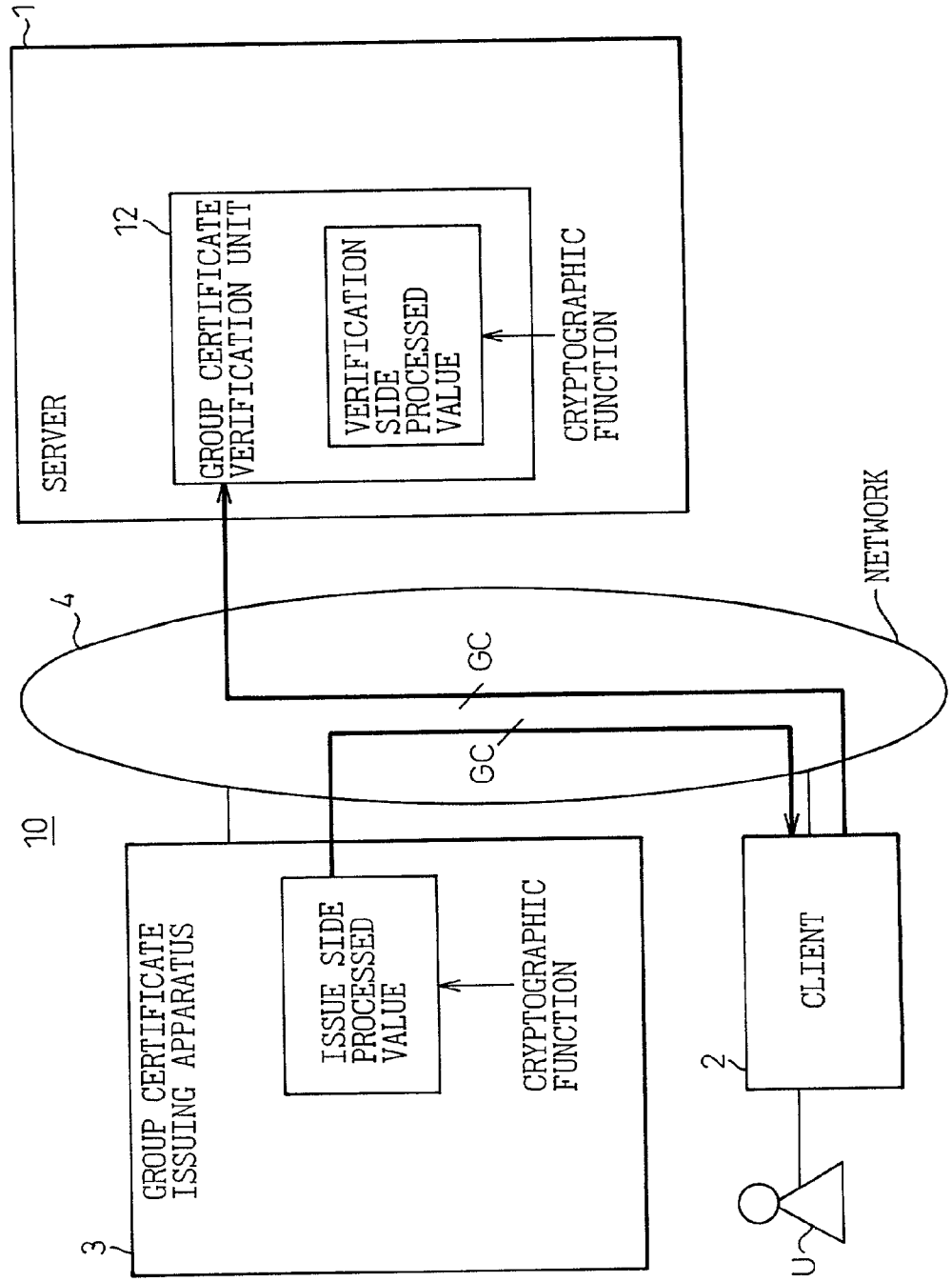
FIG. 1 is a view of a fundamental configuration of a system of distributed group management according to the present invention.

FIG. 1 is a view of a fundamental configuration of the system of distributed group management according to the present invention. Note that the same reference numerals or symbols are attached to similar components throughout all views.

In the figure, reference numeral 10 represents the system of distributed group management. This system 10 indirectly authenticates the membership of a user U in a group in order to manage the security of the client 2 on the user (U) side and the server 1 executing a remote processing request from the user side under predetermined authorization assigned for every group.

This system 10 is comprised of the server 1, client 2, group certificate issuing apparatus 3, and the network 4 provided for mutual communications among them. Further, the server 1 side is provided with the group certificate verification unit 12.

The group certificate issuing apparatus 3 issues a group certificate GC on the client 2 side based on original group information GR including the name of group to which related user belongs when there is a remote processing request.

The group certificate verification unit 12 verifies the legitimacy of the group certificate GC transmitted from the client 2 side in the server 1.

Here, the group certificate issuing apparatus 3 adds an issuance side processed value obtained by processing information of the original group information GR by a cryptographic function to this original group information GR and defines this as the group certificate GC. Also, the group certificate verification unit 12 processes part of the information included in the received group certificate GC by an identical cryptographic function to obtain the verification side processed value and authenticates by confirming that these issuance side processed value and verification side processed value coincide.

The system for distributed group management 10 of the present invention can also be understood as a method for distributed group management explained next.

Figure 2:
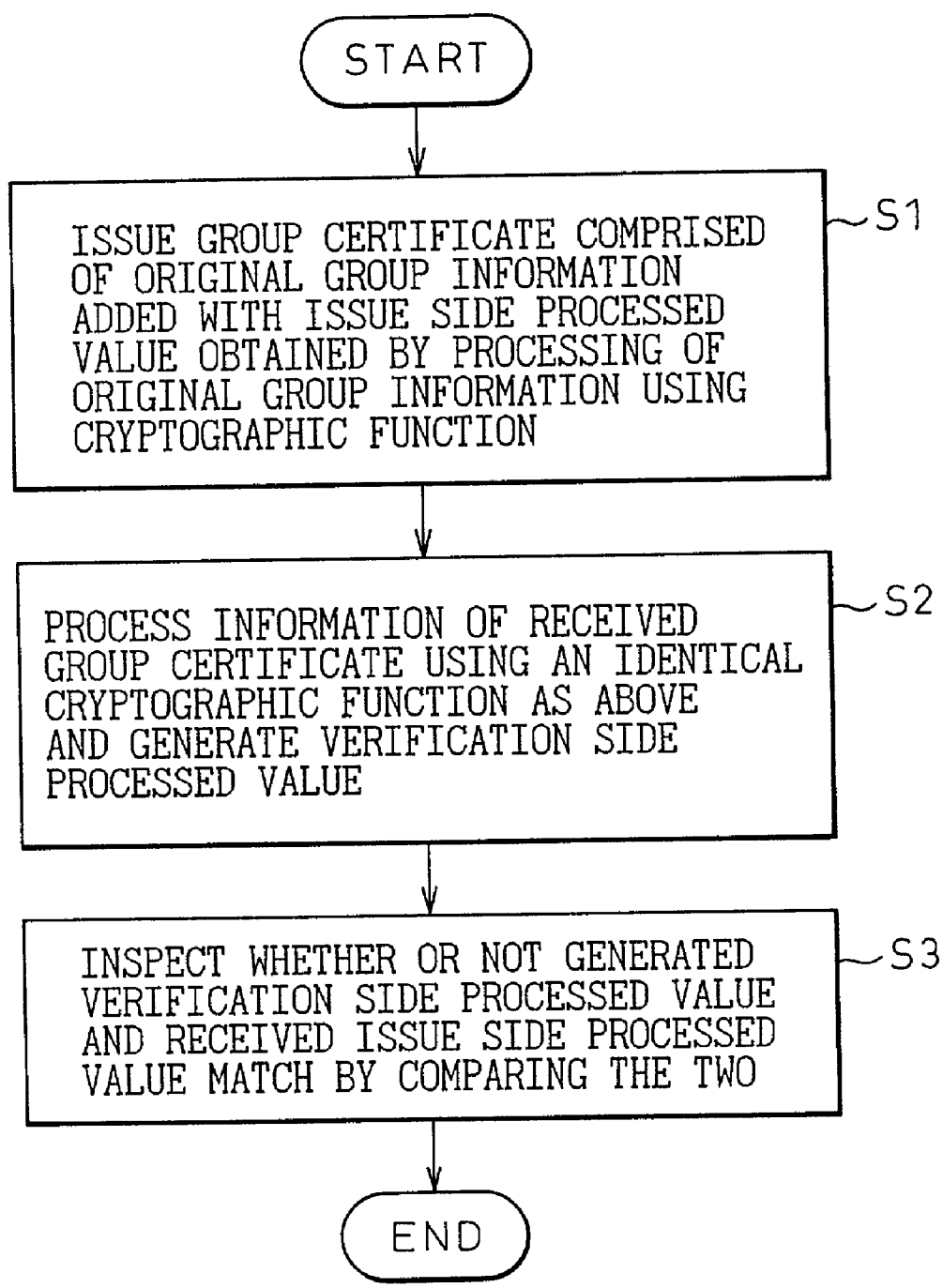
FIG. 2 is a view of basic steps of the method of distributed group management according to the present invention.

FIG. 2 is a view of basic steps of the method of distributed group management according to the present invention.

As shown in the figure, this method is comprised of a first step S1, a second step S2, and a third step S3. This method is a method of distributed group management for indirectly authenticating the membership of a user U in a group for security management with respect to the client 2 on the user (U) side and a server 1 executing a remote processing request from the user side based on predetermined authorization assigned for every group.

(i) At the first step S1, when there is a remote processing request, the client 2 side processes the original group information GR including the name of group to which the related user U belongs by a cryptographic function and issues a group certificate GC obtained by adding the obtained issuance side processed value to the original group information.

(ii) At the second step S2, the server 1 side processes the information of the received group certificate GC by the identical cryptographic function to obtain the verification side processed value.

(iii) At step S3, the server 1 side compares the verification side processed value and the received issuance side processed value and authenticates by confirming that they coincide. The legitimacy of the group certificate GC transmitted from the client 2 side is verified in the server 1.

Conventionally, as already explained, message data (corresponding to the ticket TC) including the information of the group name etc. is encrypted by a secret key to obtain a cryptogram. Then, the cryptogram transmitted from the client side is decrypted by the secret key on the server side to reproduce the original message data. Namely, large scale processing is performed to convert the original message data to a completely different cryptogram for transmission and to convert the received cryptogram back to the original message data. For this reason, considerable time has been required for both generation and verification of a ticket TC.

The present invention, however, does not convert the message data including the group name etc. to completely different data. Accordingly, it does not have to return this to the original message data again either. For this reason, the message data to be transmitted is substantially raw data as it is. The issuance side processed value obtained by processing the message data to be transmitted by a cryptographic function is simply added to this message data. The reception side merely processes the message data by the identical cryptographic function to individually generate the verification side processed value and only verifies whether or not these processed values coincide. If they do not coincide, it can be deduced that the message data was partially tampered with by a malicious third party during the time from the transmission of the message data from the client side to the reception on the server side. Accordingly, the server 1 does not accept the related remote processing request.

As a preferred example of the cryptographic function described above, a cryptographic hash function can be mentioned. This function is realized by a simple algorithm. The following explanation will be given by taking this cryptographic hash function (hereinafter, also simply referred to as a "hash function") as an example. In this case, this hash function per se is already known, so there is undeniably a possibility of malicious reproduction of the issuance side processed value. As an example for reliably dealing with such a concern, secret information can be utilized. The system of distributed group management of the present invention where this secret information is utilized can be comprised as follows.

Referring to FIG. 1 again, the group certificate issuing apparatus 3 includes the secret information assigned to a group in the original group information GR and performs processing by the cryptographic function (hash function). Also, the group certificate verification unit 12 includes the secret information assigned to the group in part of the information included in the received group certificate and performs the processing by the cryptographic function (hash function). Here, the group certificate issuing apparatus 3 and the server 1 commonly share the same secret information for identical groups.

When comprising the system in this way, the secret information is held only by the apparatus 3 and the verification unit 12. Therefore a third party does not know this secret information and cannot acquire the identical issuance side processed value (hash value). In this case, it is impossible to reproduce the content of the original group certificate from an eavesdropped hash value. This is another advantage of employing a hash value. Note that the following explanation will be given by taking as an example the case where the secret information is used.

[First Embodiment]

Figure 3:
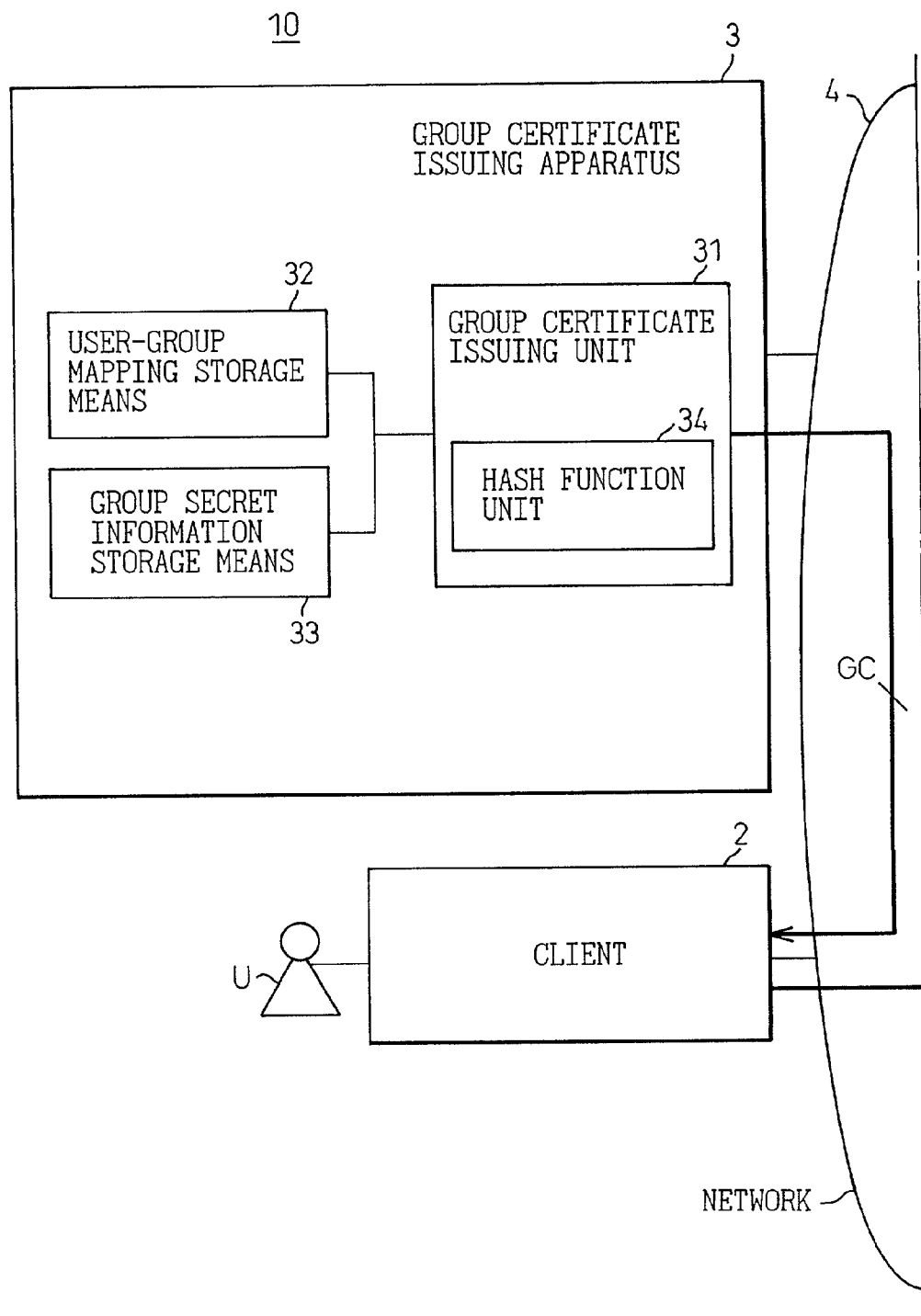
FIG. 3 is a first part of a view of a first embodiment according to the present invention.
Figure 4:
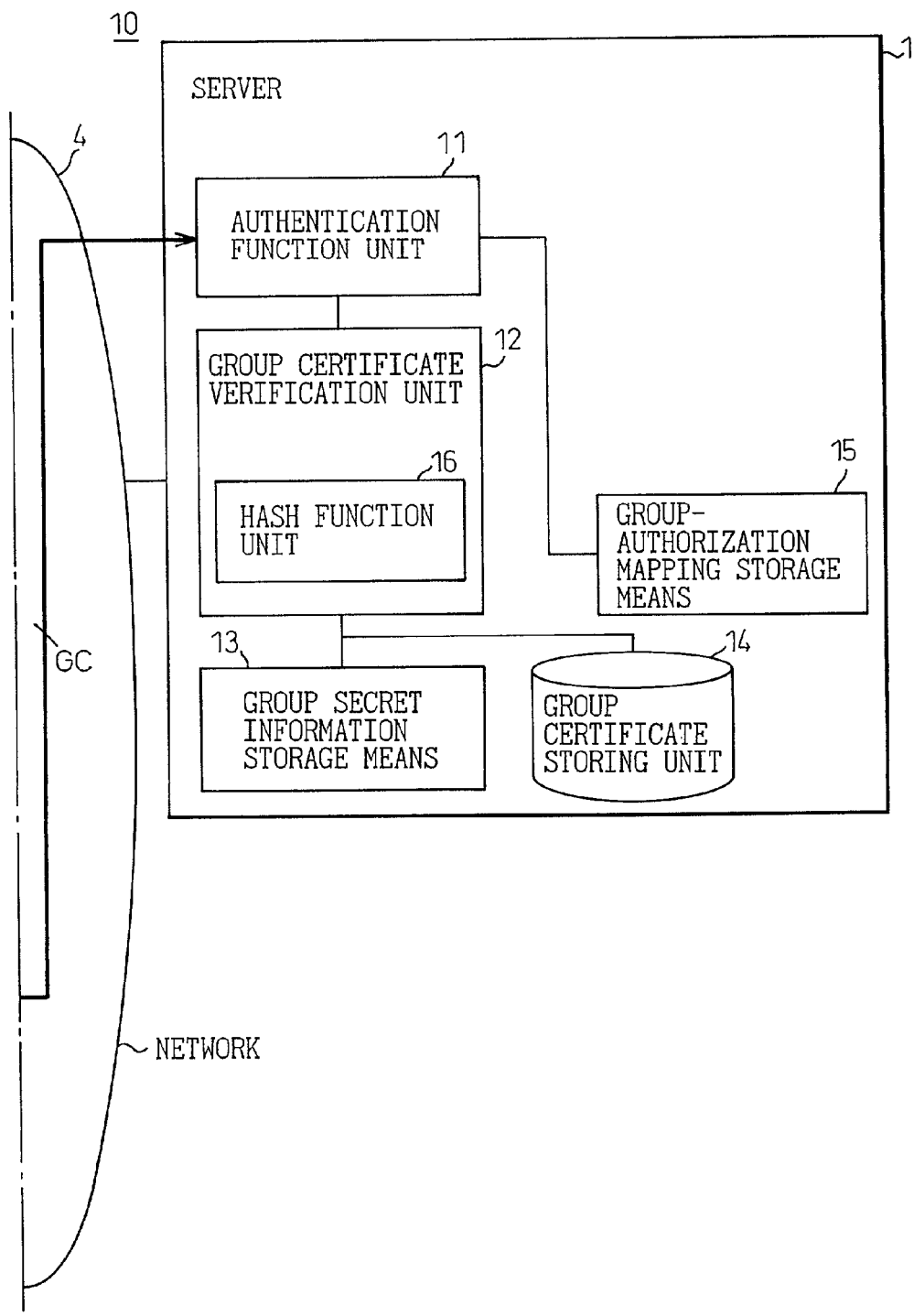
FIG. 4 is a second part of a view of the first embodiment according to the present invention.

FIGS. 3 and 4 are parts of a view of a first embodiment according to the present invention.

Note that, after this first embodiment, an explanation will be given of a second embodiment to seventh embodiment. In each embodiment, the group certificate issuing apparatus 3 and the group certificate verification unit 12 in the server 1 are basically configured as follows:

The former (3) is a group certificate issuing apparatus comprising a system of distributed group management for indirectly authenticating the membership of a user U in a group for security management with respect to the client 2 on the user side and the server 1 for executing the remote processing request from the user side under predetermined authorization assigned for every group. The characteristic feature thereof resides in a point of providing an issuance side processor (34) for issuing the original group information GR including the name of the group to which the related user belongs when there is a remote processing request and, at the same time, adding issuance side processed value obtained by processing the information of this original group information GR by a cryptographic function (hash function) to this original group information GR to obtain the group certificate GC.

On the other hand, the latter (12) is a group certificate verification unit similarly comprising a system of distributed group management for indirectly authenticating the membership of a user U to a group for security management with respect to the client 2 on the user side and the server 1 for executing the remote processing request from the user side under predetermined authorization assigned for every group. The characteristic feature thereof resides in the point that a verification side processor (16) for processing the information included in the group certificate GC received from the client 2 side by a cryptographic function (hash function) to generate a verification side processed value is included on the server 1 side. The authentication is carried out by confirming that the issuance side processed value included in the received group certificate GC and the above verification side processed value coincide.

Referring to FIG. 3 and FIG. 4, the server 1 and a plurality of clients 2 (only one is shown for simplification) are connected by the network 4. The server 1 has the authentication function unit 11, group certificate verification unit 12, group secret information storage means 13, group certificate storing unit 14, and the group-authorization mapping storage means 15.

The group certificate issuing apparatus 3 is connected to the network 4 and has a group certificate issuing unit 31, user-group mapping storage means 32, and group secret information storage means 33.

The group certificate issuing apparatus 3 and the server 1 share a part of a name space for the names of groups and hold values corresponding to each other as the secret information of the groups assigned to the names of groups shared in this way in the group secret information storage means 33 of the group certificate issuing apparatus 3 and the group secret information storage means 13 of the server 1. Also, it is assumed that the group certificate issuing apparatus 3 and the server 1 have unillustrated clock functions and that the two are synchronized completely or within a small range of error.

At the time of a request for remote processing by the user U of the client 2 to the server 1, first the user U transmits the name of the server 1 to be connected (server name) and its own user name registered in the group certificate issuing apparatus 3 to the group certificate issuing apparatus 3 so as to request the issuance of the group certificate GC (this process is not illustrated as arrow in FIG. 3). The group certificate issuing unit 31 in the group certificate issuing apparatus 3 receives this, uses the name of the group assigned to the user obtained by the user-group mapping storage means 32, the secret information assigned to the group obtained by the group secret information storage means 33, and valid term information calculated from the present time (the valid term being the period for which the assigned authorization of a group is used) as the original group information GR, processes these values (processes the hash function, etc.) by a hash function unit 34 forming the issuance side processor, and thereby prepares the group certificate GC. Then, it returns this to the client 2.

The client 2 receiving the group certificate GC transmits this via the network 4 to the server 1. At the server 1, the group certificate verification unit 12 verifies the legitimacy of the received group certificate GC by using the group secret information storage means 13 and the group certificate storing unit 14. If it is legitimate, it stores the group certificate GC in the group certificate storing unit 14. This verification is carried out by the hash function unit 16 forming the verification side processor based on the result of the hash function processing.

Upon the success of the verification, the authentication function unit 11 regards the authentication as complete, checks the group indicated in the group certificate GC in the group-authorization mapping storage means 15, and recognizes the authorization given to this group. The remote processing requested from the user U of the client 2 is executed within the range of this authorization.

Figure 5:
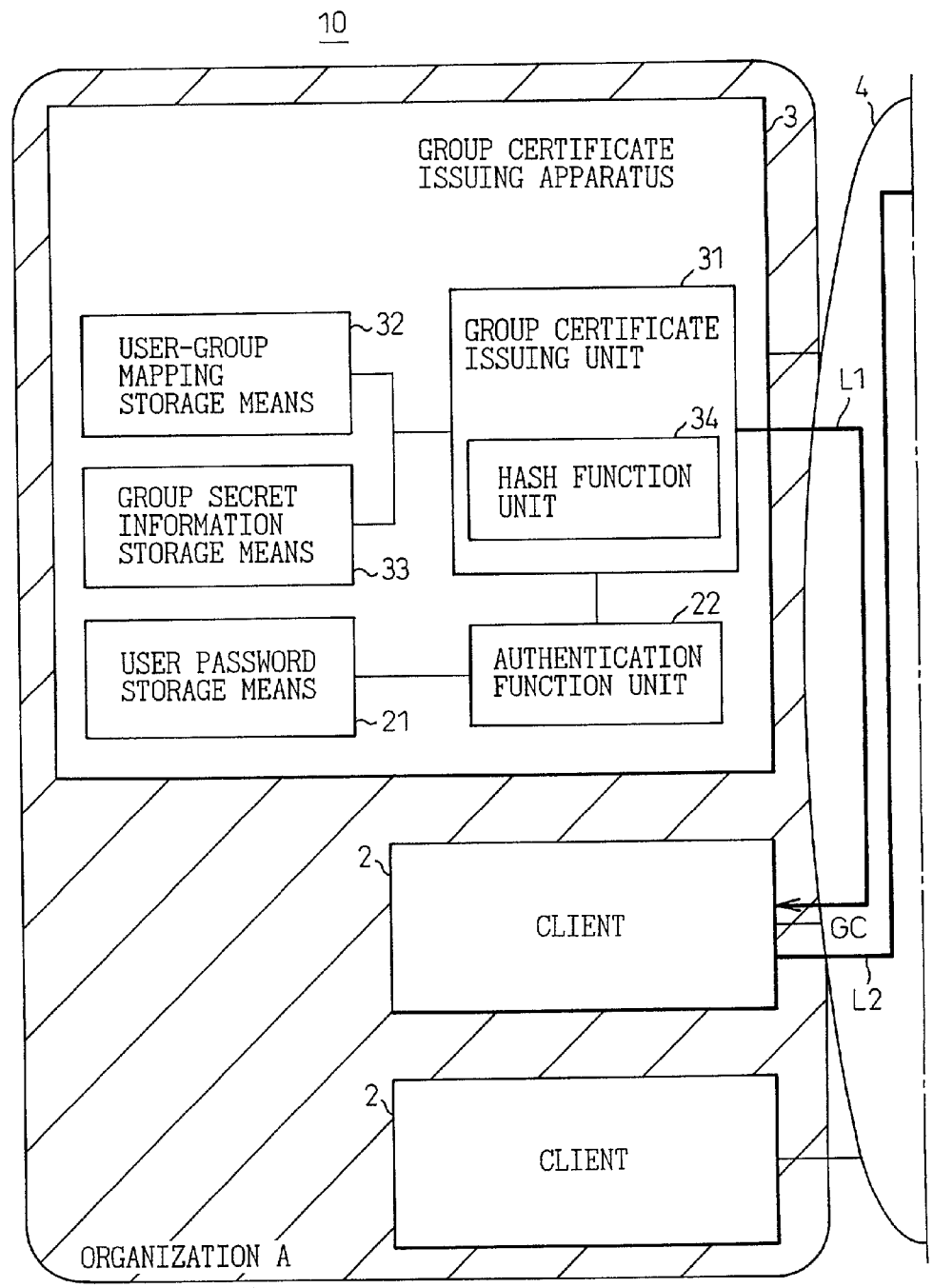
FIG. 5 is a first part of a view of an example of an overall configuration to which the first embodiment according to the present invention is applied.
Figure 6:
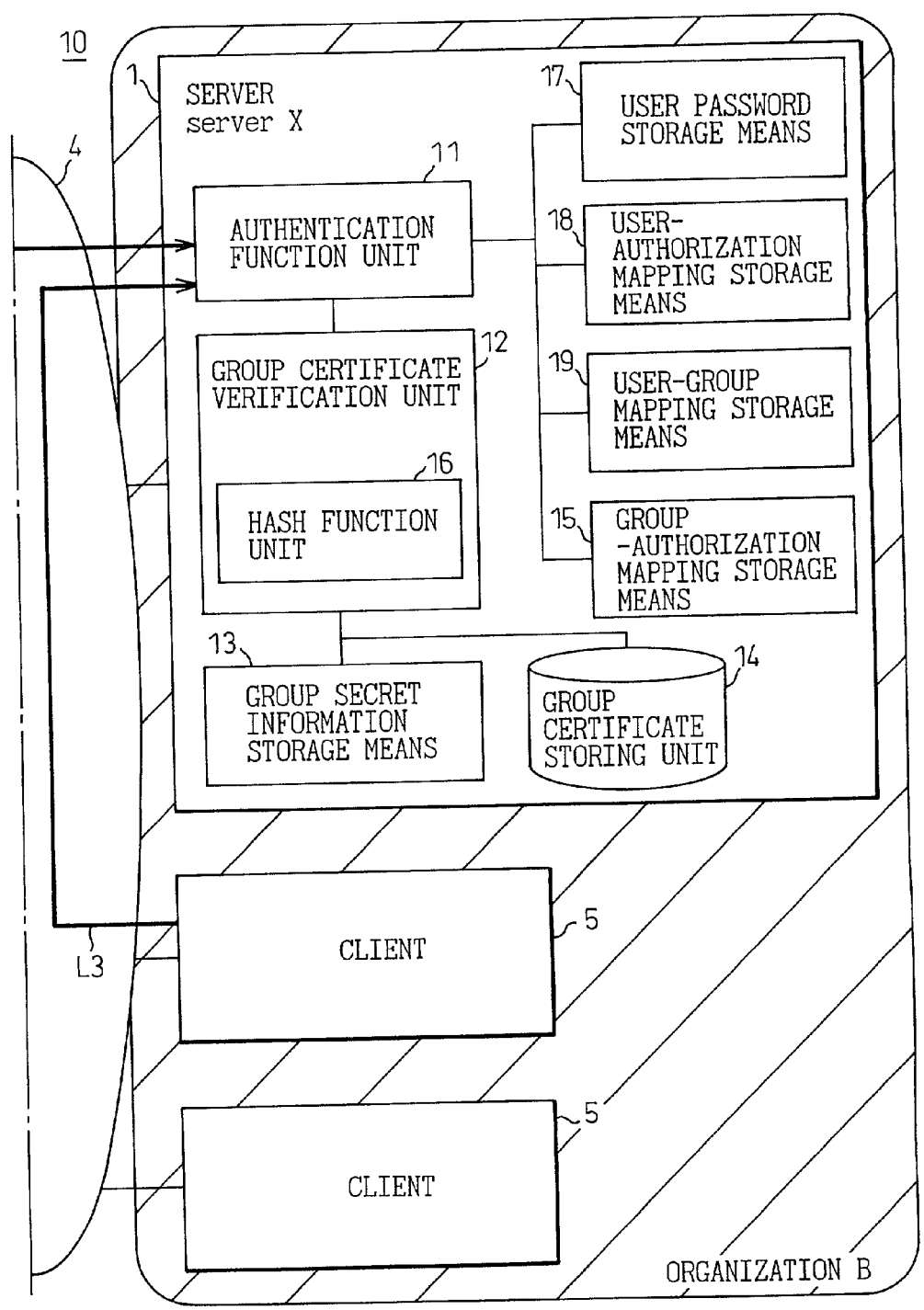
FIG. 6 is a second part of a view of an example of the overall configuration to which the first embodiment according to the present invention is applied.

FIGS. 5 and 6 are parts of a view of an example of the overall configuration using the first embodiment according to the present invention.

Note that, the examples of the overall configurations using the first embodiment to the seventh embodiment explained later become similar to that shown in FIG. 5 and FIG. 6.

In FIG. 5 and FIG. 6, computer systems of an organization A and an organization B are connected by the network 4, the group certificate issuing apparatus 3 is managed by the organization A, and the server (server name is described as "server X") 1 is managed by the organization B.

The server 1 is provided with a user password storage means 17, a user-authorization mapping storage means 18, and a user-group mapping storage means 19 for the users in its own organization B. The users of the organization B are registered in them. A user of the organization B transmits its user name and authentication information in the server 1 from the client 5 in its own organization B via a line L3 and requests remote processing after receiving the authentication.

Contrary to this, the user of the organization A is not registered in the storage means 17, 18, and 19 in the server 1, so asks the group certificate issuing apparatus 3 in its own organization A to issue the group certificate GC via a line L1 and transmits this to the server 1 via a line L2 to be able to request the remote processing.

Namely, a user of the organization B requests remote processing by the conventional method, while a user of the organization A can request remote processing by the group certificate GC even if each user information (user name, password, authorization, etc.) is not registered in the server 1 of the organization B.

FIG. 7 is a view of an example of the data structure in a password storage means 21.

This storage means 21 is provided in the group certificate issuing apparatus 3 shown in FIG. 5. The stored data is comprised of sets of user names in the related organization A, for example, user A, user B, . . . and passwords corresponding to the users, for example, password A, password B, . . . It is assumed that the password is shared between each user and the apparatus 3 in secret.

FIG. 8 is a view of an example of the data structure in the user-group mapping storage means 32.

This storage means 32 is provided in the group certificate issuing apparatus 3 shown in FIG. 3 and FIG. 5. The stored data is comprised of sets of user names, for example user A, user B, . . . and group names assigned to the users, for example group 3, group 1, . . .

The group certificate issuing apparatus 3 can centrally manage the distributed groups not only with one server X, but also with a not illustrated server other than the server X. Therefore, in this example, in the item of the user name, the set of the server name and the user name in its own organization A is described. Further, also for the name of the group, the server name is imparted in order to clarify in which server the group name is stored.

Figure 9:
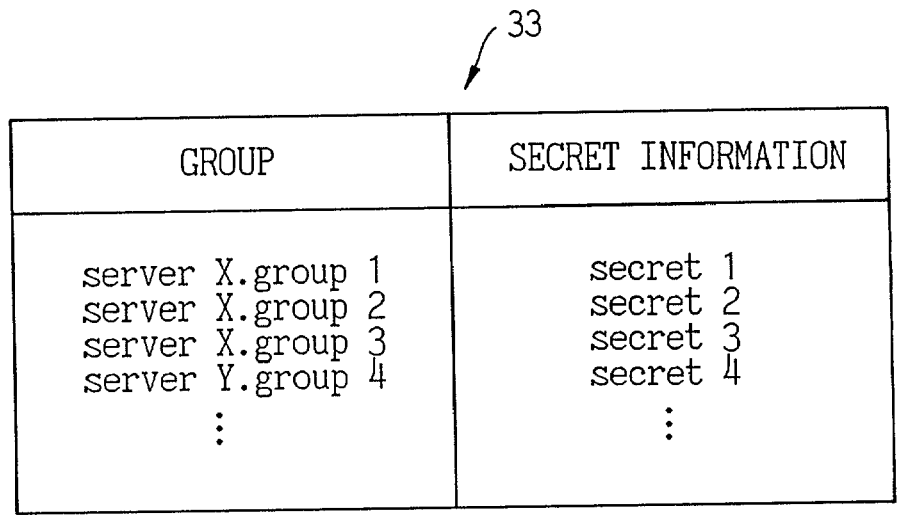
FIG. 9 is a view of an example of the data structure in a group secret information storage means 33.

FIG. 9 is a view of an example of the data structure in the group secret information storage means 33.

This storage means 33 is provided in the group certificate issuing apparatus 3 shown in FIG. 5. The stored data is comprised of sets of names of groups in the server and the secret information assigned for every group, for example, secret 1, secret 2, . . . Each set must be common to each set in the group secret information storage means 13 (FIG. 6) of the corresponding server 1. The secret information of the group shared in this way must be shared between the group certificate issuing apparatus 3 and the server 1 in secret. This is for preventing the secret information from flowing on the network 4.

Figure 10:
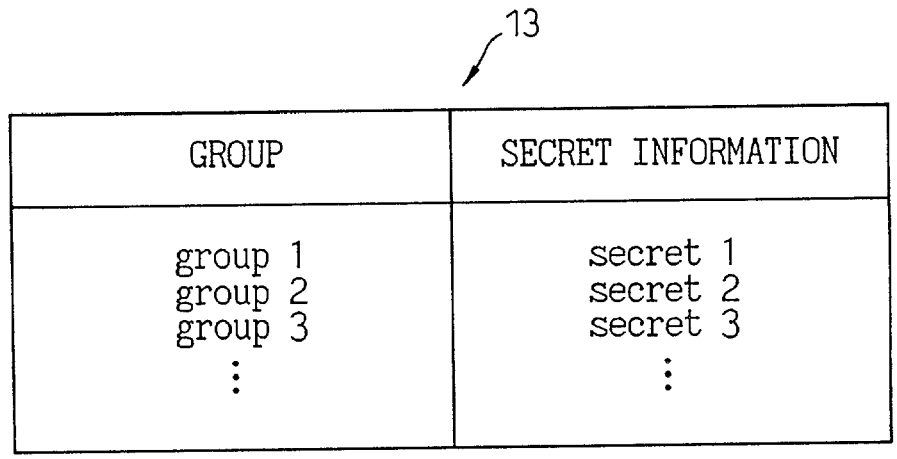
FIG. 10 is a view of an example of the data structure in a group secret information storage means 13.

FIG. 10 is a view of an example of the data structure in the group secret information storage means 13.

This storage means 13 is provided in the server (server X) shown in FIG. 4 and FIG. 6. The stored data is comprised of sets of the names of groups handled by the server (server X) itself and the secret information assigned to the groups. Each set is held in common with the group secret information storage means 33 in the group certificate issuing apparatus 3 as explained above.

Note that, as the names of the groups in the left column of the table of FIG. 10, the server name is given in the group certificate issuing apparatus 3, but in the server 1, it is self-evident that the server name to be given is its own name (server X here), so it is omitted.

FIG. 11 is a view of an example of the data structure in the group-authorization mapping storage means 15.

This storage means 15 is provided in the server (server X) 1 shown in FIG. 4 and FIG. 6. The stored data is comprised of sets of the names of groups and the authorization assigned to the groups. In the example of the figure, the authorization is comprised of sets of the names of the remote processing object and the type of the processing content permitted for the processing objects. In this example, the processing object is the file name, and the processing content is "r" representing a read operation and "w" representing a write operation. Namely, "r" represents permission for a read operation, "w" represents permission for a write operation, and "-" represents no permission.

Note that, permission or no permission of a read and write operation of a file is only one example of the remote processing authorization. The invention is not limited to this. As another example, there also exists permission or no permission of the use of a printer. Also, the invention is not limited to permission or no permission. The type of setting designating the mode of operation at the time of remote processing for every user and group is included in this remote processing authorization.

Next, a detailed explanation will be given of the group certificate GC (FIG. 1, FIGS. 3 and 4, FIGS. 5 and 6, etc.) as one of the characteristic features to be noted in the present invention.

Figure 12:
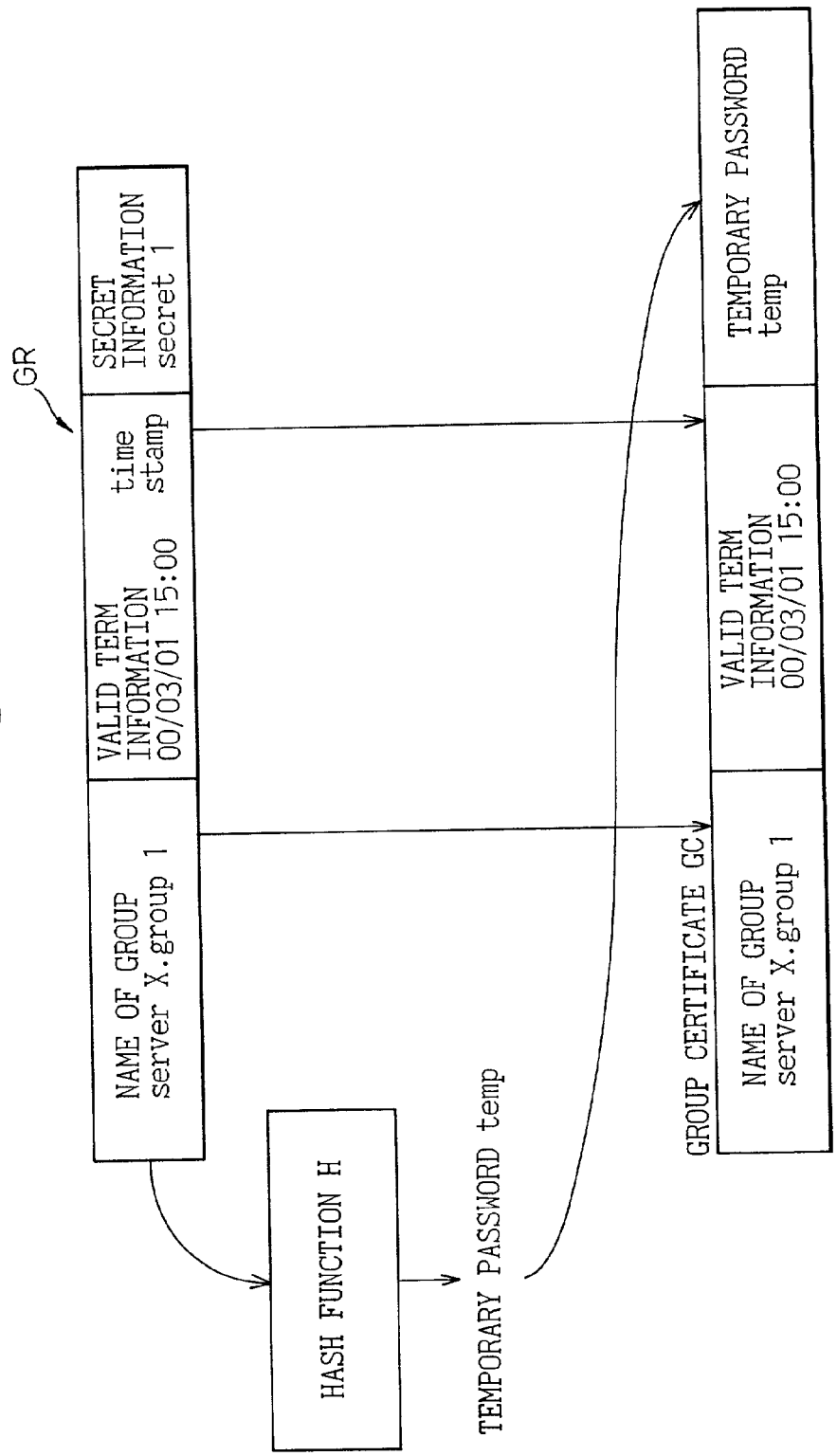
FIG. 12 is a view of a concrete method of generation of a group certificate GC according to the first embodiment.

FIG. 12 is a view of a concrete method of generation of the group certificate GC according to the first embodiment. In the following explanation, a case where the user U (user B) requests the issuance of the group certificate GC for the remote processing in the server 1 (server X) is assumed. Further, it is assumed that the group 1 is assigned to the user B.

First, original group information GR comprised of three pieces of information, i.e., the group name "group 1", valid term information "timestamp" and the secret information "secret 1" of a group are combined by a certain reversible method (reproducible method on the reception side). This combination is represented by a symbol "|" here.

Next, a temporary password "temp" is generated by applying a cryptographic hash function H to the original group information GR. In the example of the figure, each value is expressed by a character train, the server name is imparted to the group name, and the valid term information is formed by arranging information of the date and the "hour and min" of the time by two columns, but it is not limited to this. Also, the secret information is obtained from the group secret information storage means 33 in the group certificate issuing apparatus 3.

The hash function H is applied to the thus obtained original group information GR. The result thereof (hash value) will be referred to as a temporary password "temp". Namely, $$\text{temp} = H \text{ (group 1|timestamp|secret 1).}$$

The hash function H is referred to as a cryptographic hash function and has cryptographic and/or computational one-wayness (that is, it is easy to find y=H(x) from x, but it is very difficult to find x from y=H(x)) and a collision-free property (that is, for given x, it is impossible or very difficult to find a value of z other than x resulting in H(x)=H(z)). As such a hash function, MD5, SHA1, etc. can be mentioned.

The group certificate GC is obtained by combining the hash value, that is, the temporary password "temp", with the group name "group 1" and the valid term information "timestamp" the same as those of the original group information GR. The group certificate issuing apparatus 3 shown in FIG. 3 and FIG. 5 returns the group certificate GC to the user U (user B).

As explained above, in the group certificate issuing apparatus 3 according to the first embodiment, the issuance side processor (hash function unit 34) centrally processes at least the group name and the secret information unique to that group by the hash function H, regards the obtained issuance side processed value (hash value) as the temporary password "temp", and generates the group certificate GC from at least the group name and temporary password.

Figure 13:
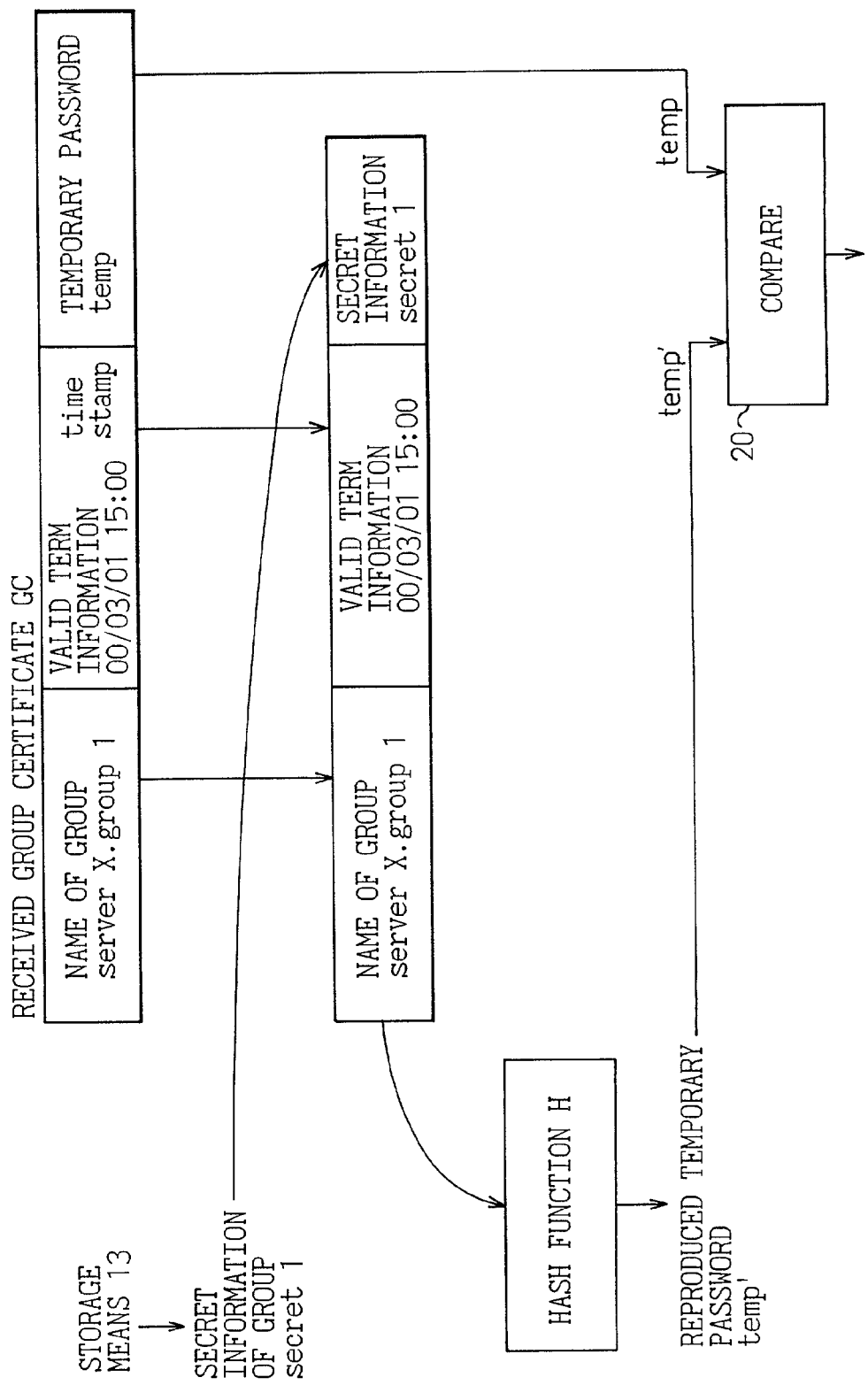
FIG. 13 is a view of a concrete method of verification of the group certificate GC according to the first embodiment.

FIG. 13 is a view of a concrete method of verification of the group certificate GC according to the first embodiment.

The group certificate GC on the server 1 side is verified by confirming if the same result is obtained by the generation of the group certificate GC from given information in the same way. Namely, the group name and the valid term information are fetched from the received group certificate GC, the secret information of the related group (group 1) acquired from the group secret information storage means 13 in the server 1 is combined with these information, and the hash function H is applied to the whole in the same way as the client side. Then, the resultant reproduced temporary password "temp'" is compared with the temporary password "temp" included in the received group certificate GC in a comparison means 20 (formed in for example the verification unit 12 of FIG. 4). If the two are identical, it is seen that the group certificate GC is a legitimate one free from forgery or tampering on the network 4. This is because, if even part of the information in the group certificate has been altered, the two cannot become identical due to the nature of the hash function H explained above. Tampering resulting in an identical temporary password is impossible or very difficult due to the natures of the hash function H.

As explained above, in the group certificate verification unit 12 according to the first embodiment, the verification side processor (hash function unit 16) centrally processes at least the group name and the secret information unique to that group included in the group certificate GC received from the client side by the hash function H so as to reproduce the verification side processed value (hash value) as the reproduced temporary password "temp'".

In short, the system of distributed group management 10 of the first embodiment performs the processing illustrated in the following FIG. 14 to FIG. 16.

Figure 14:
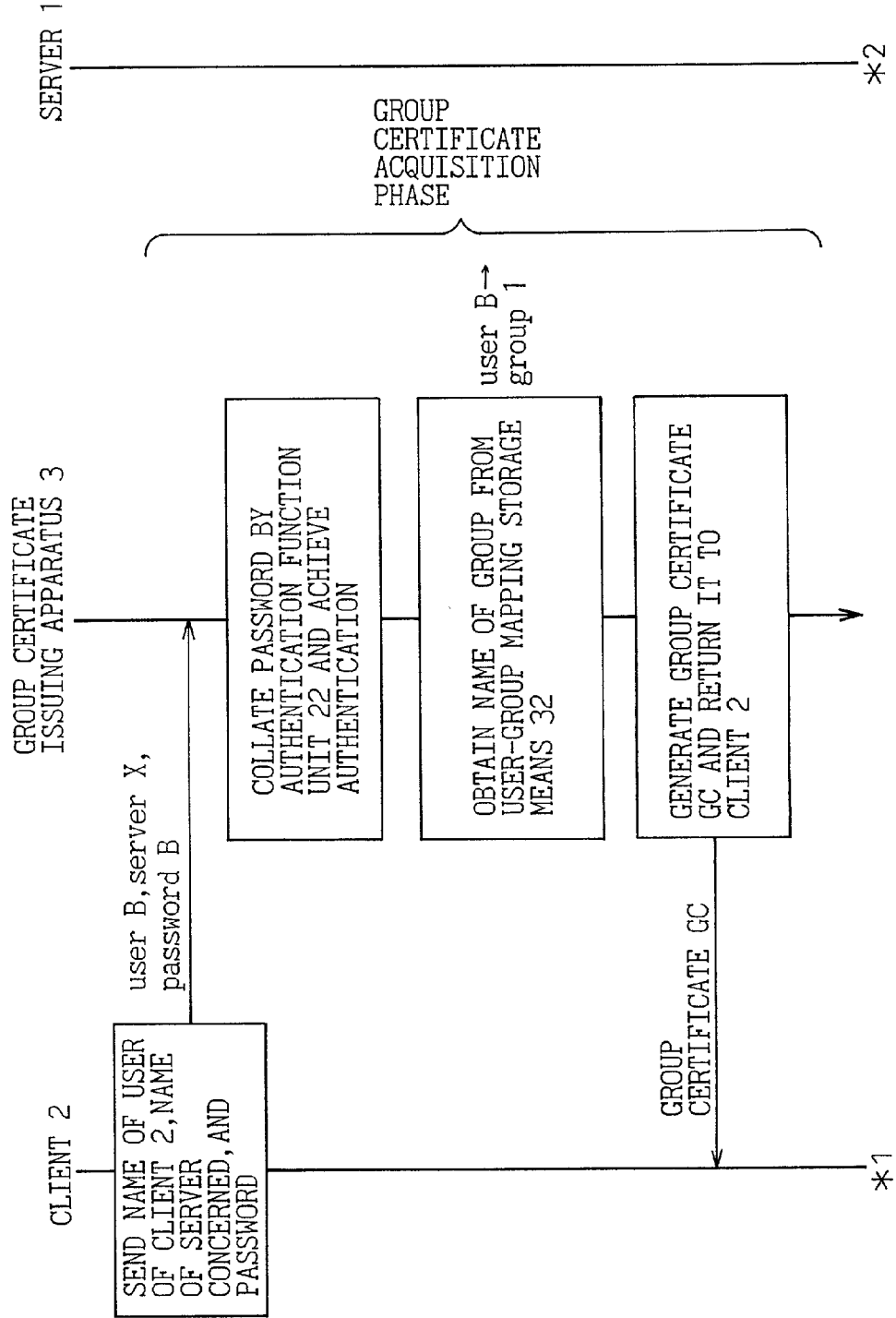
FIG. 14 is a first part of a view of the flow of the overall processing according to the first embodiment.
Figure 15:
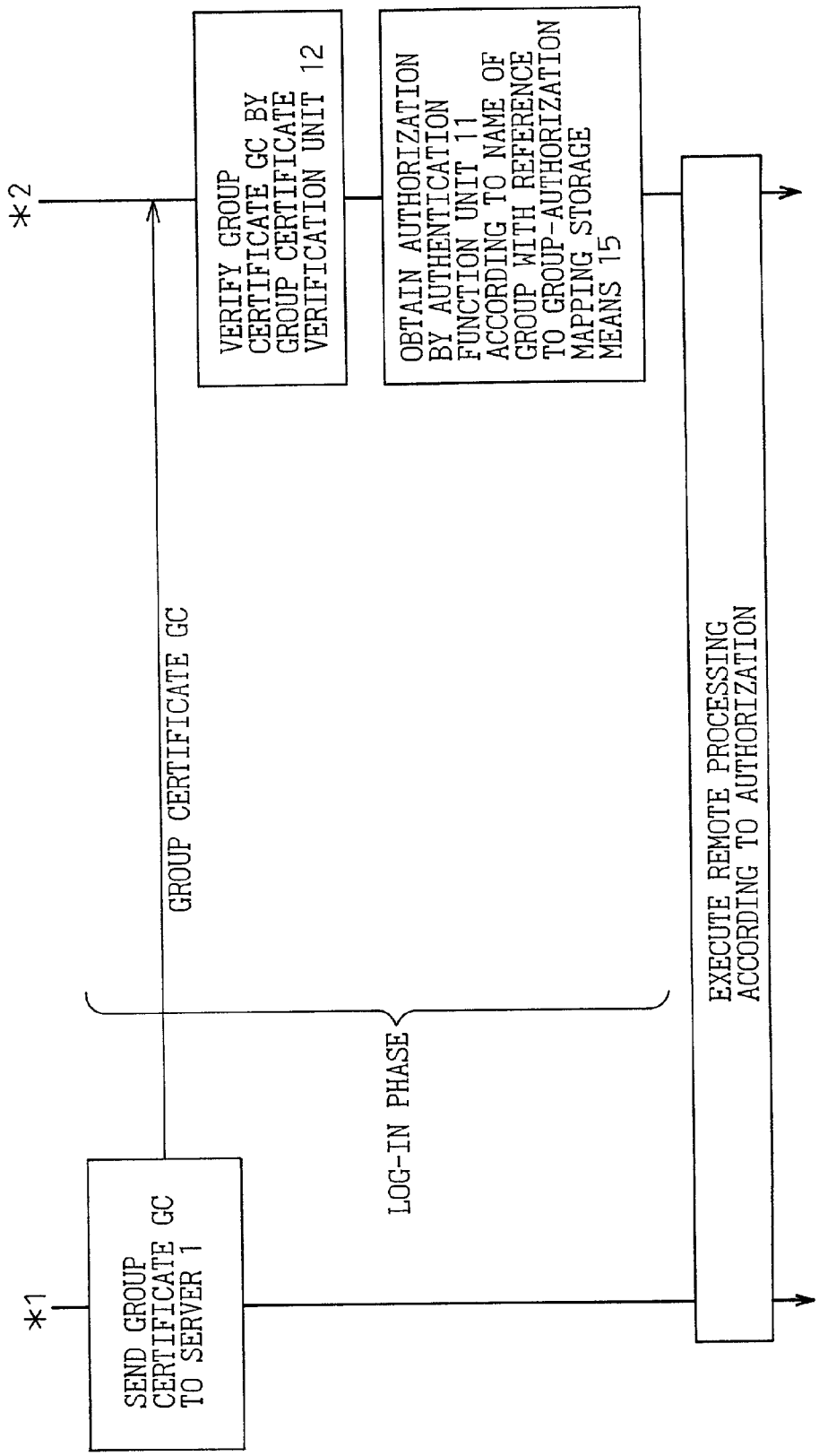
FIG. 15 is a second part of a view of the flow of the overall processing according to the first embodiment.

FIGS. 14 and 15 are parts of a view of the flow of the overall processing according to the first embodiment.

The flow of the processing of these figures will be explained by referring to FIG. 5 and FIG. 6.

First, the client 2 transmits three pieces of information, i.e., the user name "user B", the server name "server X" to which it wants to request the remote processing, and the password "password B" to the group certificate issuing apparatus 3.

The group certificate issuing apparatus 3 first checks the password by an authentication function unit 22 to authenticate the user 1, then checks the received server name "server X" and user name "user B" at the user-group mapping storage means 32 and acquires the group name "group 1" assigned to this user B.

Next, the group certificate GC is generated from the group name "group B", valid term information "timestamp", and the secret information by the above method. Note that the method of determining the valid term is not particularly determined in the present invention, but there are shortcomings when the term is both long and short, so it is suitably determined. The group certificate generated in this way is returned to the user. The above processing will be referred to as a "group certificate acquirement phase".

This group certificate GC may be transmitted to the server 1 for requesting remote processing by the client 2 to the server 1. At the server 1 receiving this group certificate GC, first the group certificate verification unit 12 verifies the received group certificate. The detailed method of verification will be explained in FIG. 16, but when it is decided that the group certificate is correct as a result of the verification, the group name included in the group certificate GC is regarded as correct, and the group name is used for obtaining the corresponding authorization from the group-authorization mapping storage means 15. The above processing is referred to as the "log-in phase". The desired remote processing is executed after that.

Figure 16:
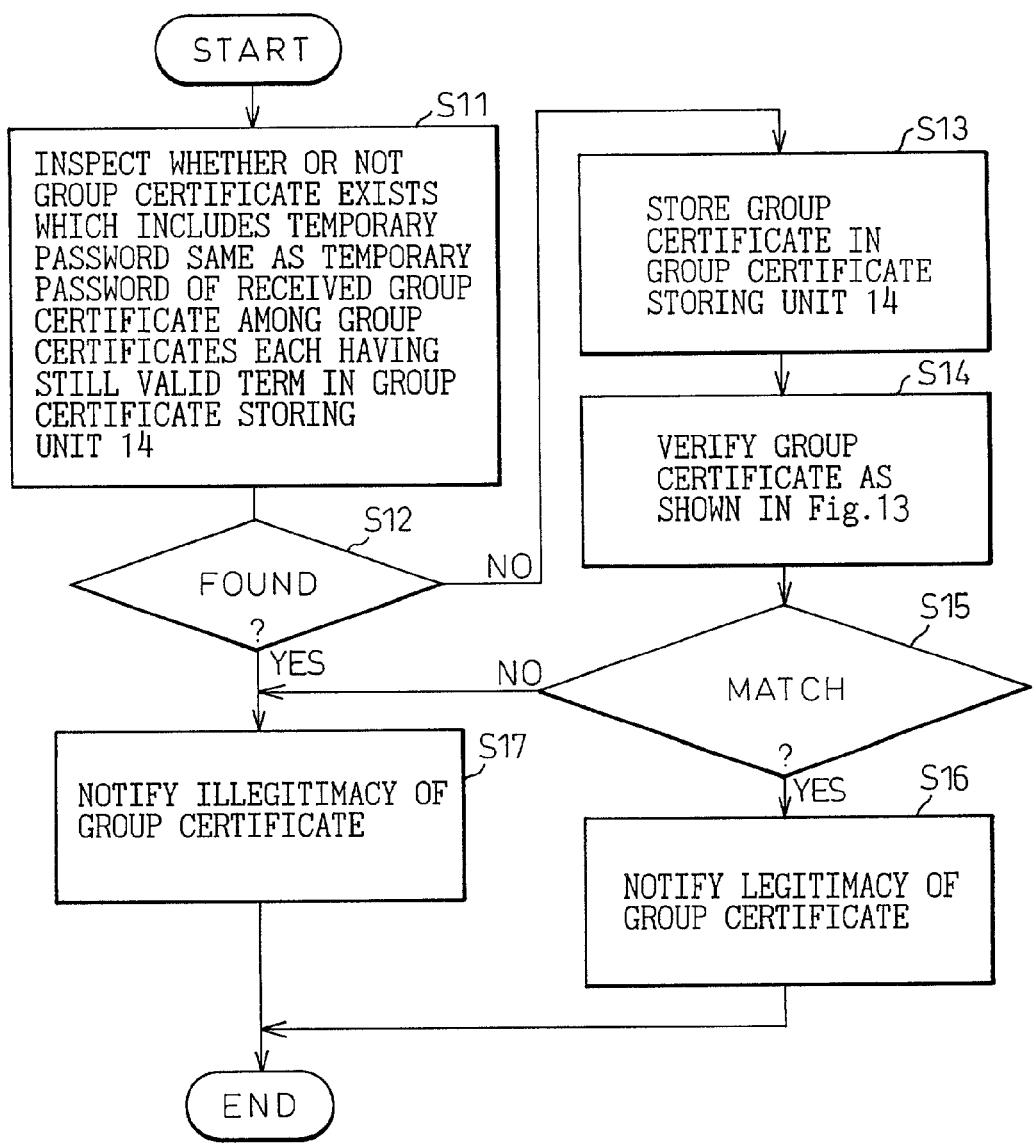
FIG. 16 is a view of the flow of operation of a group certificate verification unit 12 according to the first embodiment.

FIG. 16 is a view of the flow of operation of the group certificate verification unit 12 according to the first embodiment. First, the group certificate storing unit 14 successively storing received group certificates GC is searched through to investigate if there is a group certificate having the same temporary password "temp" as that of the group certificate GC currently received among the group certificates GC with the unterminated valid terms (step S11).

If there is such a certificate, the received group certificate GC was illegitimately doubly used, so the related remote processing request is rejected (steps S12 and S17). If there is not such certificate, the received group certificate GC is added to the group certificate storing unit 14 (steps S12 and S13).

Next, the received group certificate GC is verified. If it is correct (steps S14 and S15), it is notified to the authentication function unit 11 that it passed the verification (step S16).

Note that, in this first embodiment, the authentication between the group certificate issuing apparatus 3 and the user is carried out by a password, but the method of authentication is not limited to this. If there is no possibility of illegitimacy between the group certificate issuing apparatus 3 and the user, the authentication need not be carried out. Alternatively, it is also possible to utilize another reliable method other than a password, for example utilize a physical characteristic or utilize a host address of the client. On the other hand, if the path (line L1) between the group certificate issuing apparatus 3 and the user is not safe and there is a possibility of eavesdropping or tampering, it is possible to have the two share an encryption key in the same way as in the Kerberos and combine authentication and protection against covert viewing or tampering by the encrypted communication.

As explained above, according to the first embodiment, by applying the hash function H, the group certificate GC is generated and verified. The processing of this hash function H is performed at a high speed, i.e., at least several times faster than the relatively high speed processing of conventional encryption by a shared key. Therefore, there is the effect of contribution to faster issuance and verification of the group certificate.

[Second Embodiment]

Figure 17:
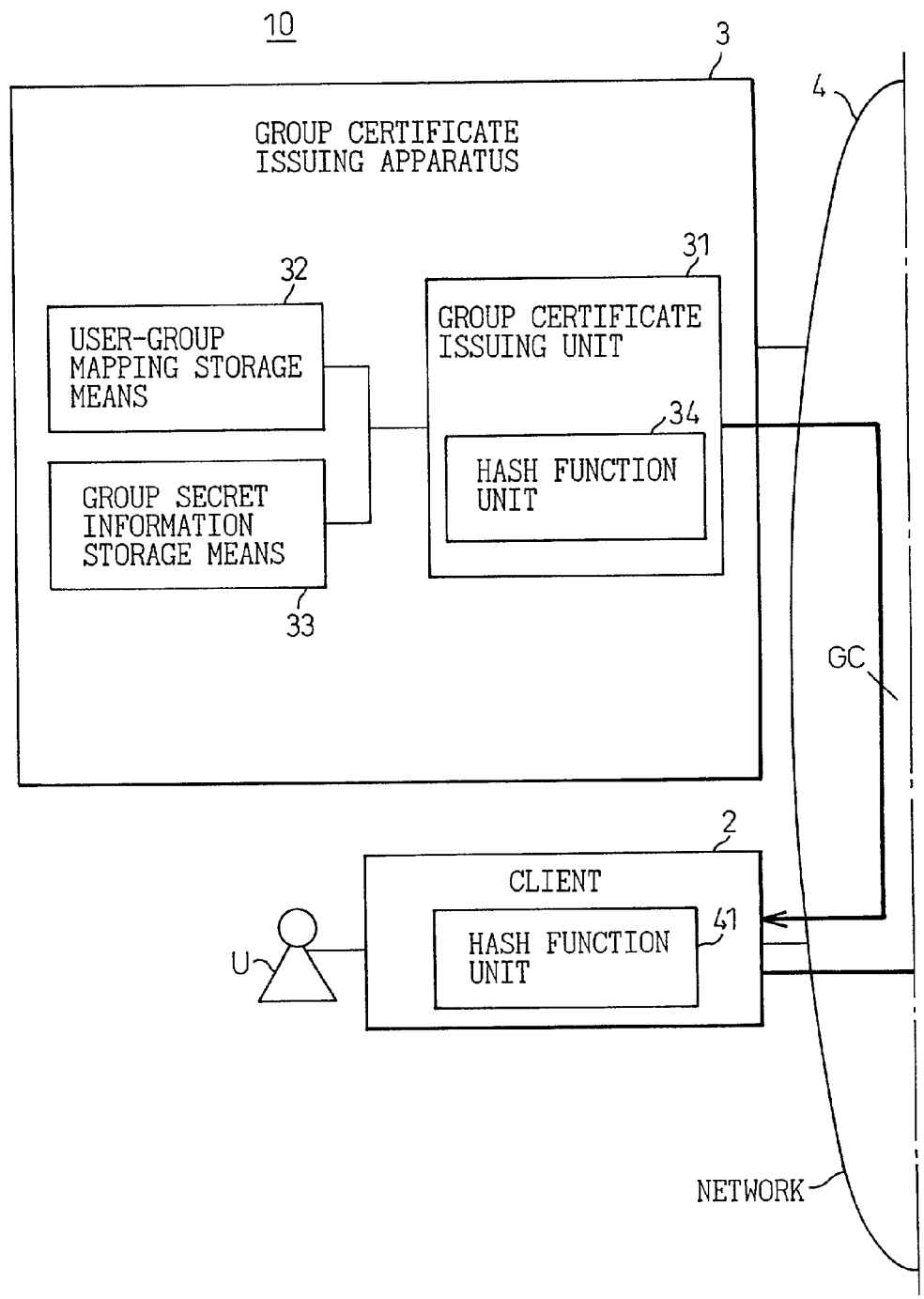
FIG. 17 is a first part of a view of a second embodiment according to the present invention.
Figure 18:
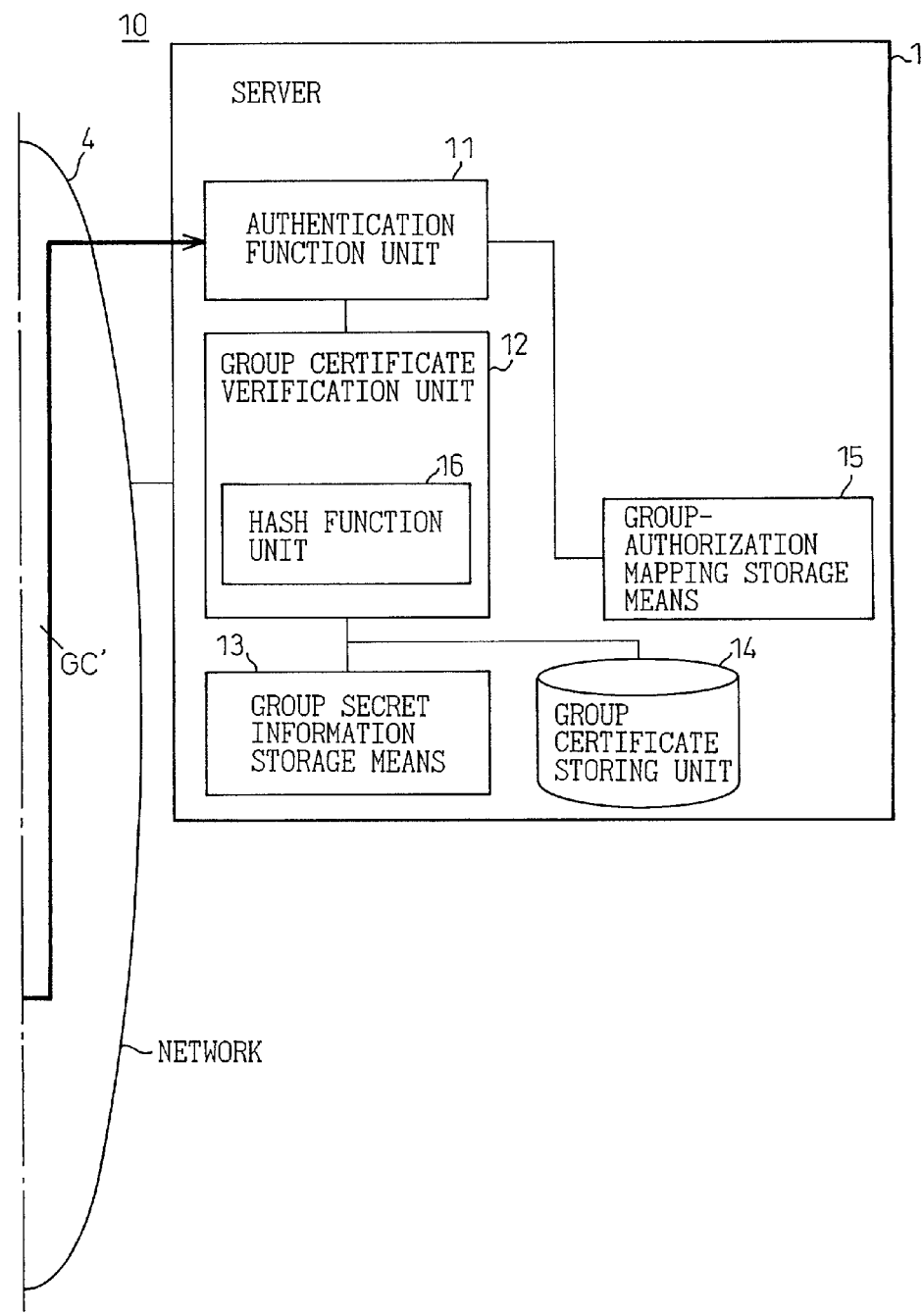
FIG. 18 is a second part of a view of the second embodiment according to the present invention.

FIGS. 17 and 18 are parts of a view of a second embodiment according to the present invention.

The group certificate issuing apparatus 3 in this second embodiment cooperates with a hash function unit 41 provided in the client 2. This hash function unit 41 processes the temporary password "temp" explained above by the hash function H m number of times. The obtained issuance side processed value (hash value) is used as a one-time password. A log-in request GC' comprised of at least the group name and the one-time password is generated by the client 2 in place of the group certificate GC explained above.

In the group certificate verification unit 12 in the second embodiment, the hash function unit 16 serving as the verification side processor processes the temporary password "temp" by the hash function H m number of times to reproduce the verification side processed value (hash value) as a one-time password and confirms that the one-time password extracted from the log-in request GC' including the one-time password similarly generated on the client 2 side and the reproduced one-time password coincide for the authentication.

In the system of distributed group management 10 of the first embodiment explained above, the group certificate GC was transmitted from the client 2 to the server 1, but the group certificate GC is not concealed at this time. Therefore, if this is leaked due to covert viewing or the like, a third party can transmit the group certificate GC to the server 1. At this time, the server 1 cannot distinguish if the transmitting side of the group certificate GC is the correct user or a third party. Such an attack will be referred to as a replay attack. In order to prevent this replay attack, in the system of distributed group management 10 of the first embodiment, the group certificate is held in the group certificate storing unit 14 to prevent double use.

However, measures against such double use are predicated on transmission of the group certificate GC to the server 1 by a legitimate user earlier than a third party. If a third party has transmitted the group certificate GC to the server 1 before the correct user transmits the group certificate GC due to some sort of reason, the server 1 regards the third party as correct and rejects requests for remote processing from the legitimate user transmitting a group certificate GC after that as double use.

Also, since double use is rejected, one group certificate GC can be used only one time. For this reason, while there is no problem if establishing a session by one authentication, then treating the subsequent series of remote processing requests as the same session, if not using the concept of a session and requiring authentication for every remote processing request, it becomes necessary to obtain a different group certificate GC every time a remote processing request occurs, so the efficiency is poor.

Referring to FIG. 17 and FIG. 18 again, in the system of distributed group management 10 of the first embodiment, as explained above, the group certificate GC was transmitted from the client 2 to the server 1, but in the second embodiment, this group certificate GC is replaced by the log-in request GC' obtained from the group certificate GC by the cryptographic hash function H.

The client 2 receiving the group certificate GC from the group certificate issuing apparatus 3 fetches the value of the temporary password "temp" from the content of the group certificate GC at the remote processing request to the server 1, applies the hash function H a plurality of times (m) to this by the method in the same way as that for the usual one-time password, and then replaces this by the original temporary password and uses this replaced value as the modified group certificate, that is, the log-in request GC'. Then, the client 2 transmits this to the server 1.

In the server 1, the group certificate (log-in request) verification unit 12 verifies the legitimacy of the received log-in request GC' by applying the hash function H by exactly the same number of times as the number of times at the client 2 by using the group secret information storage means 13 and the group certificate (log-in request) storing unit 14. When it is legitimate, the log-in request GC' and the information relating to the number of times (m) of application of the hash function are stored in the group certificate storing unit 14. The authentication function unit 11 deems the authentication as complete with the success of this verification, checks the group name in the log-in request GC' at the group-authorization mapping storage means 15 to obtain the authorization corresponding to that group, and uses the same for the execution of the remote processing requested from the user of the client 2.

The number of times (m) of application of the hash function H relating to the log-in request GC' is decremented by a predetermined number (for example 1) at each of the client 2 and the server 1 by the same manner as the technique of the usual one-time password, that is, first starting from a predetermined fixed number of times and then each time preparing or verifying a log-in request utilizing the same group certificate.

Figure 19:
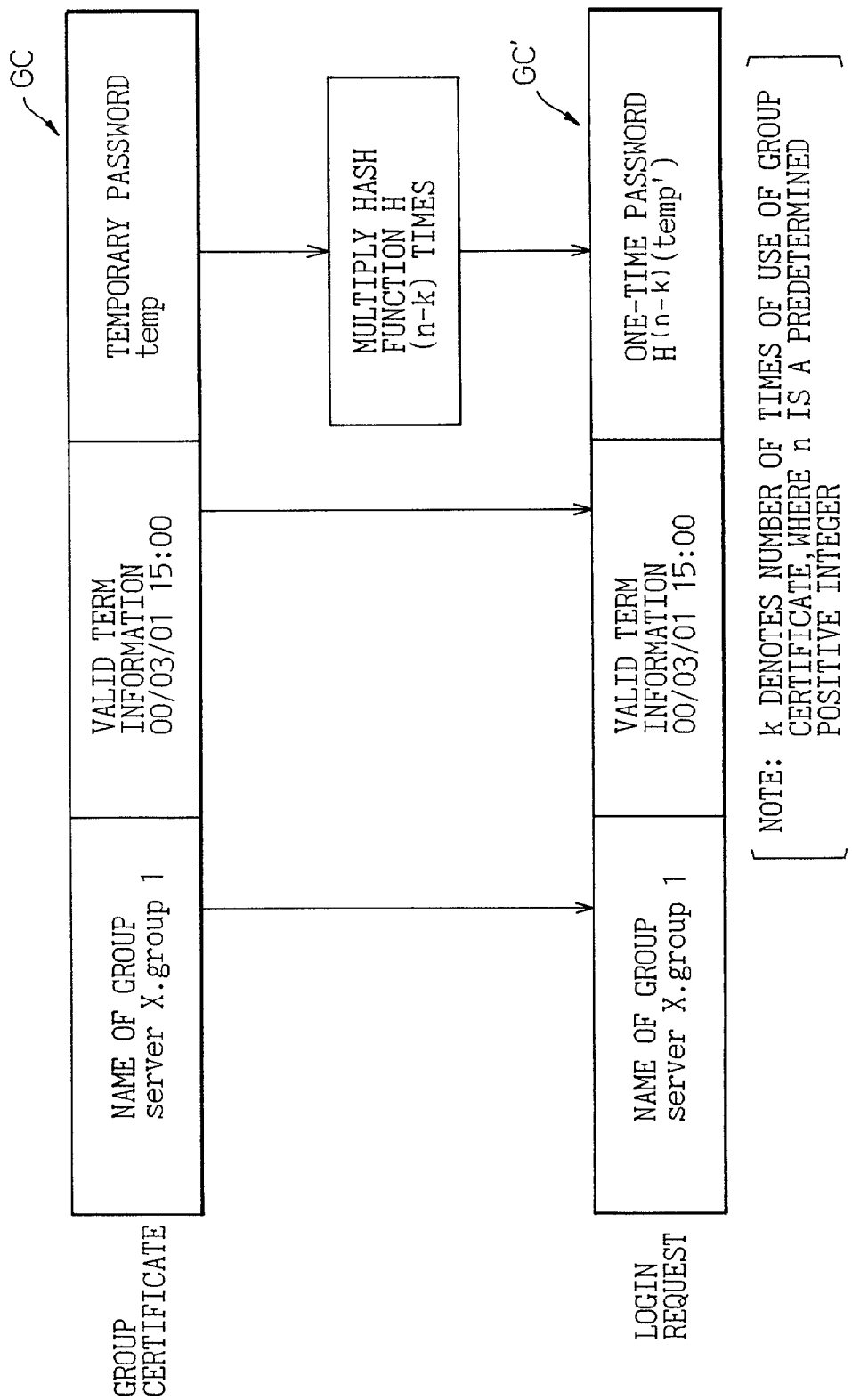
FIG. 19 is a view of a concrete method of generation of a modified group certificate (log-in request) GC'.

FIG. 19 is a view of a concrete method of generation of the modified group certificate (log-in request) GC'.

The modified group certificate (log-in request) GC' is formed by generating the one-time password with the temporary password "temp" in the group certificate GC as a seed. In this second embodiment, the log-in request is realized by applying the cryptographic hash function H a plurality of times (m) and decrementing the number of times m by one from the predetermined value n whenever the same group certificate GC is used. Namely, defining the number of times up to the current usage of the group certificate GC as k, the hash function H is applied to the temporary password "temp" (n–k) number of times. Then, the result is switched with the original temporary password and used as the one-time password. This becomes the log-in request GC'. When k=n is reached, the number of times by which the group certificate GC can be used ends, and it is necessary to ask the issuing apparatus 3 to newly issue the group certificate GC.

Note that, in this example, a hash function H the same as that used when generating the group certificate according to the first embodiment is used, but it is not necessary to use the same in this way.

Figure 20:
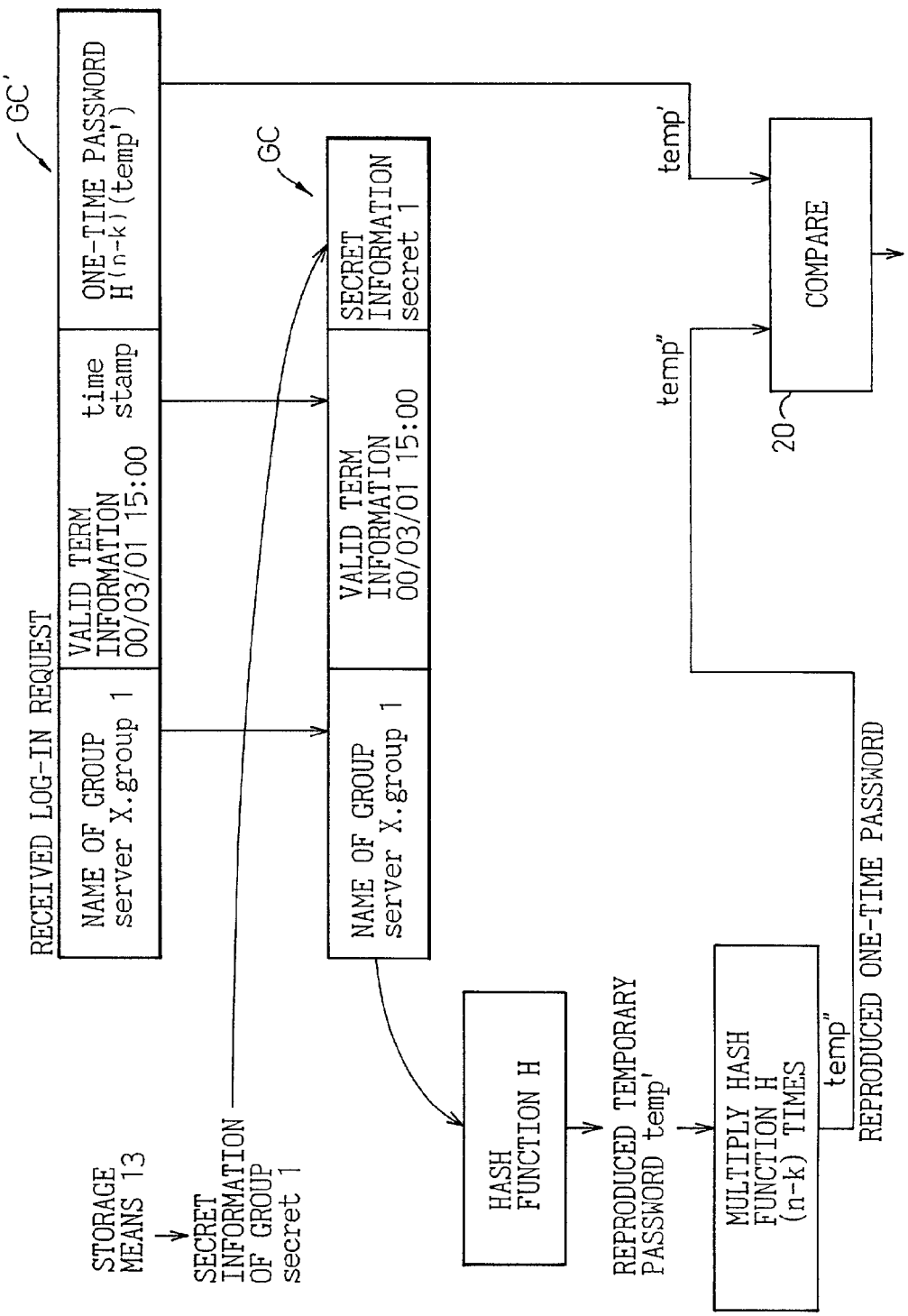
FIG. 20 is a view of a concrete method of verification of a modified group certificate (log-in request) GC' in the second embodiment.

FIG. 20 is a view of a concrete method of verification of the modified group certificate (log-in request) GC' in the second embodiment.

In the same way as the first embodiment, after the temporary password "temp" is calculated, the hash function H is applied to the temporary password "temp'" (n–k) number of times to generate the expected one-time password "temp''", then the password "temp''" is compared with the value which the one-time password "temp'" should be in the log-in request GC' at the comparison means 20. If the two are equal, it is seen that the received log-in request GC' is a legitimate one free from forgery and tampering.

FIG. 21 is a view of an example of the data held in the modified group certificate (log-in request) storing unit 14.

According to the first embodiment, it was sufficient to store the received group certificates GC in the storing unit 14 (FIG. 4, FIG. 6) as they were, but in the second embodiment, it is necessary to store the value of k of the number of times of usage of the same group certificate GC, that is, the number of times of application of the hash function H. In this example, the value of k when the log-in request GC' is used last is held. Note, 0, 4, 6, . . . are examples at certain points of time.

Figure 22:
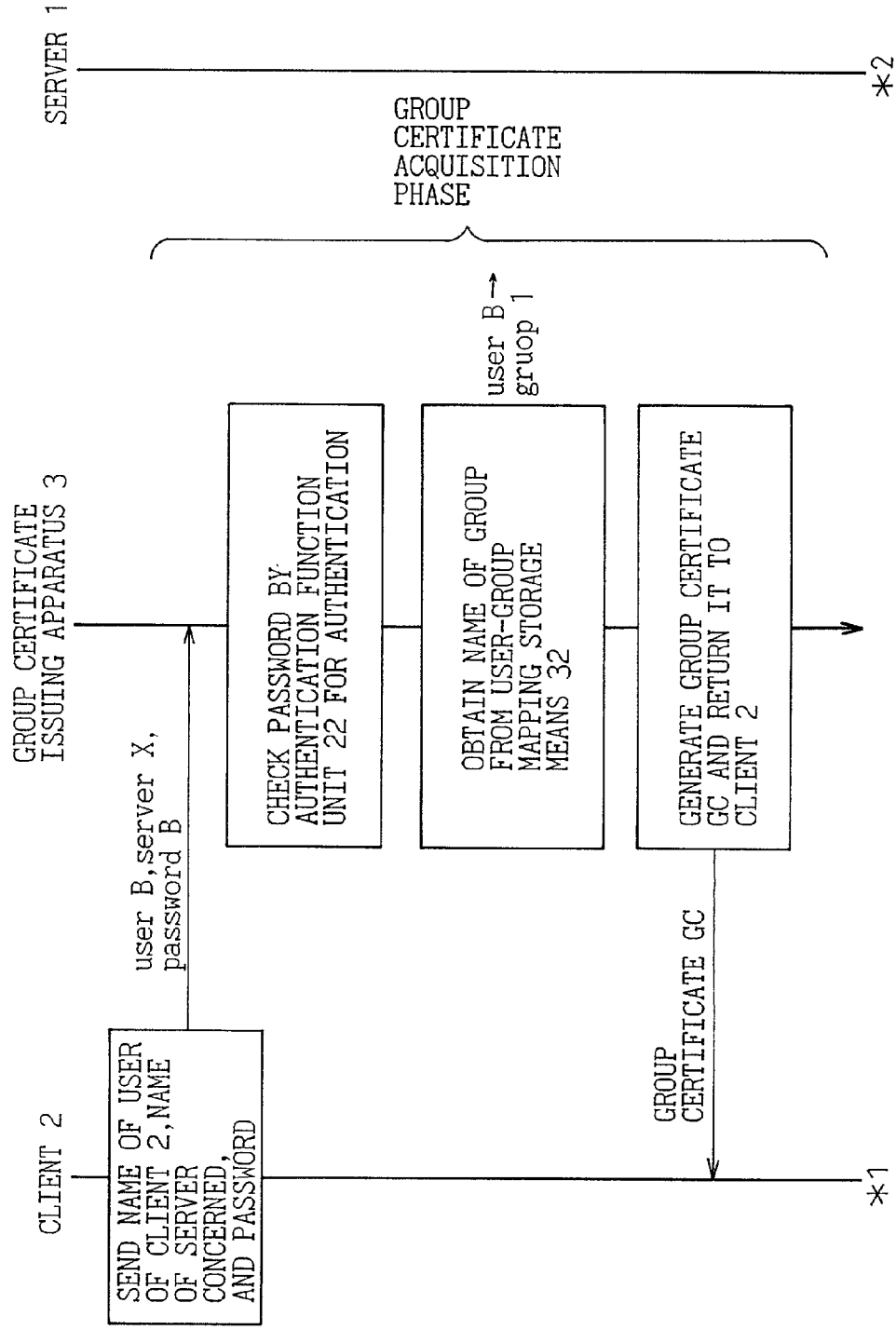
FIG. 22 is a first part of a view of the flow of the overall processing according to the second embodiment.
Figure 23:
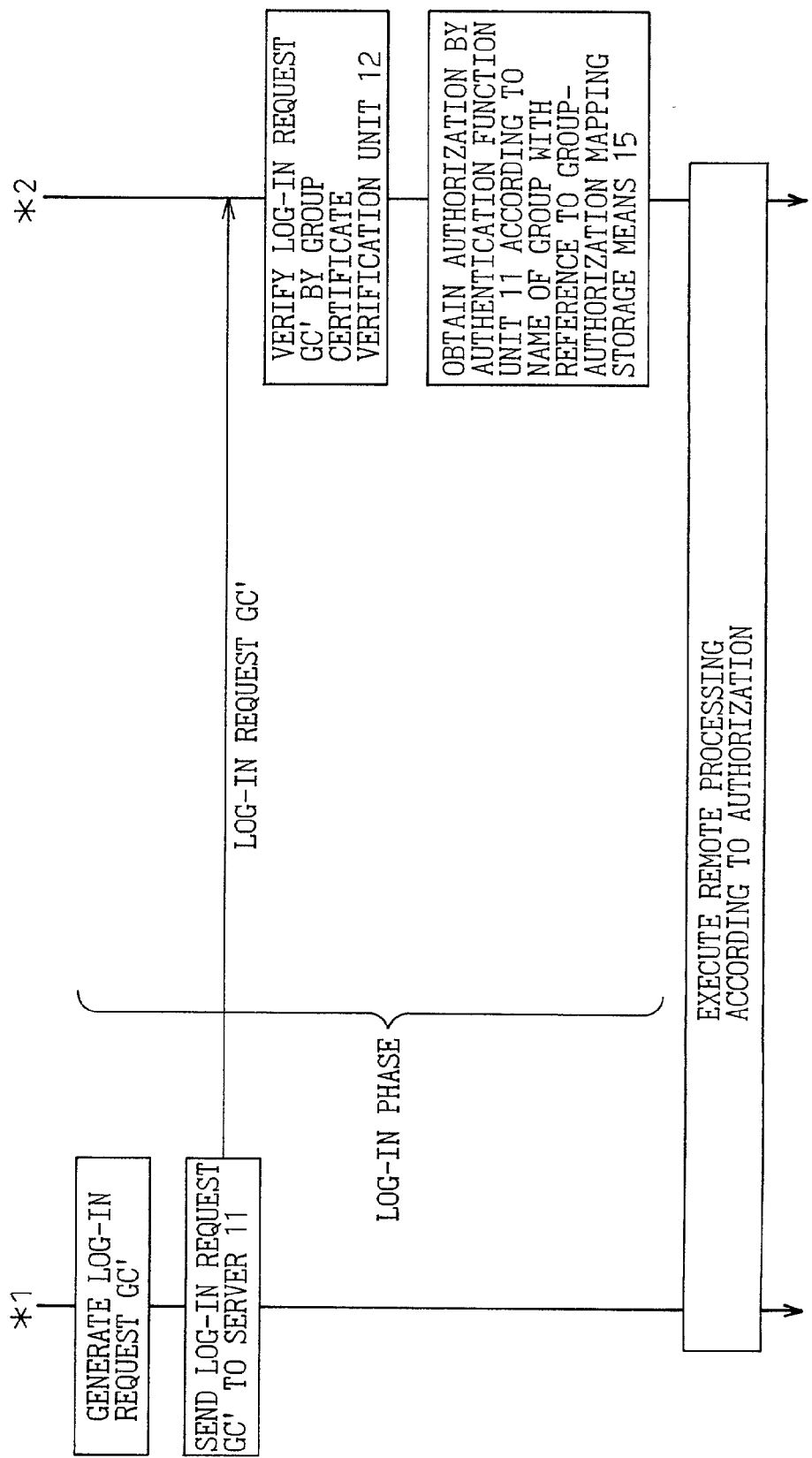
FIG. 23 is a second part of a view of the flow of the overall processing according to the second embodiment.

FIGS. 22 and 23 are parts of a view of the flow of the overall processing according to the second embodiment.

The flow of the processing of these figures will be explained by referring to FIG. 22 and FIG. 23.

The "group certificate acquirement phase" shown in FIG. 22 is the process until the client 2 acquires the issued group certificate. It is the same as the first embodiment, so the explanation is omitted.

Thereafter, as shown in FIG. 23, when requesting remote processing to the server 1, the client 2 generates the log-in request GC' from the group certificate GC by the method explained above and transmits this log-in request GC' to the server 1.

The server 1 first verifies the received log-in request GC' at the modified group certificate (log-in request) verification unit 12. If this log-in request GC' is legitimate, it regards the group name in the log-in request GC' as legitimate in the same way as the first embodiment and acquires the authorization given to the related group (refer to "log-in phase").

Figure 24:
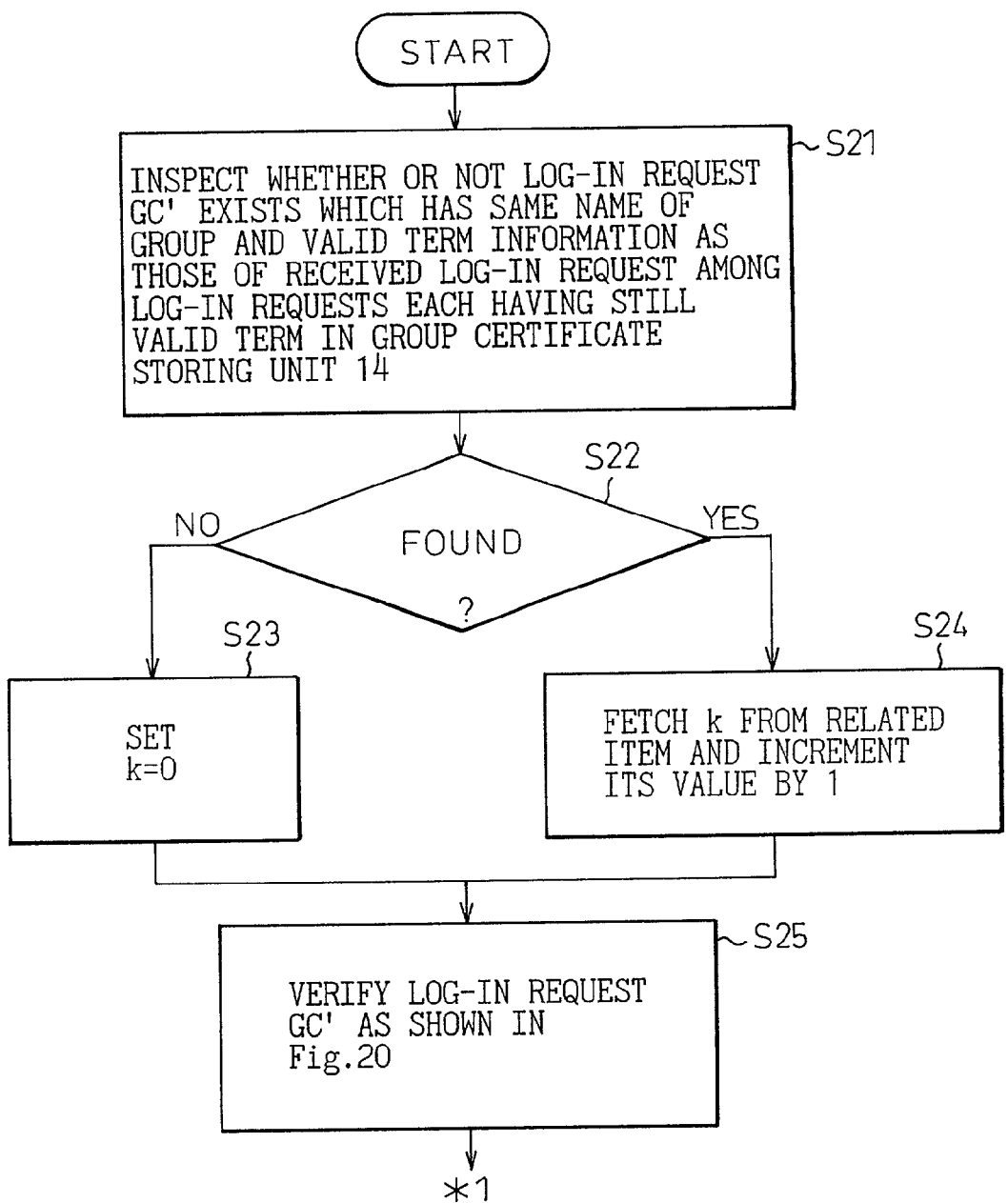
FIG. 24 is a first part of a view of the flow of operation of the modified group certificate (log-in request) verification unit 12.
Figure 25:
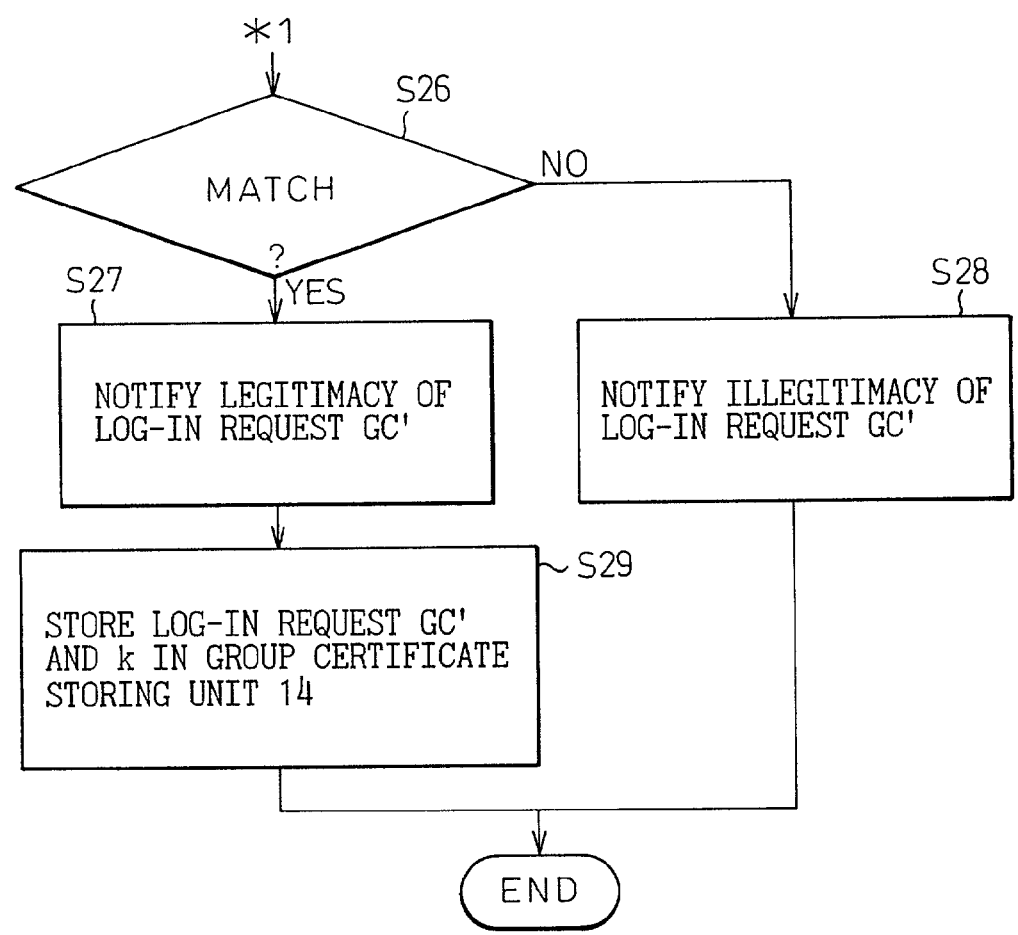
FIG. 25 is a second part of a view of the flow of the operation of the modified group certificate (log-in request) verification unit 12.

FIGS. 24 and 25 are parts of a view of the flow of operation of the modified group certificate (log-in request) verification unit 12.

In FIG. 24, first the modified group certificate (log-in request) storing unit 14 is searched through to confirmed if there is any log-in request having the same group name and the same valid term information as those of the received log-in request GC' among the log-in requests GC' having unterminated valid terms (step S21). If there is no such request, it is regarded that the group certificate was used first and k is made equal to 0. If there is such a request, the value of the k of that item is fetched and is incremented by exactly 1 (steps S22, S23, and S24).

Next, by using this k, as shown in FIG. 20, the received log-in request GC' is verified (step S25). When "temp" and "temp'" coincide, it is regarded that the log-in request GC' is legitimate (steps S26 and S27). At this time, the previously found item in the verification unit 12 is replaced by the received new log-in request GC' and the just used value of k incremented by exactly 1. Further, the content thereof is stored in the storing unit 14 (step S29).

As explained above, in the second embodiment, even if the log-in request GC' is leaked to a third party due to for example eavesdropping of the communication between the client 2 and the server 1, the temporary password "temp" per se is not leaked. Also, due to the nature of the cryptographic hash function H, it is also impossible to predict and calculate the next log-in request from a currently leaked log-in request. Accordingly, the server 1 will not accept a third party pretending itself as the legitimate user so long as the server 1 does not accept the same log-in request. Therefore it becomes possible for a legitimate user to form a plurality of log-in requests GC' from one group certificate GC and request remote processing to the server 1 a plurality of times while avoiding the risk of replay attack. Therefore, even in a case where a plurality of remote processing requests cannot be accepted as one session established by one-time authentication, a single issuance of the group certificate is sufficient. Therefore there is the effect that the processing efficiency greatly rises.

[Third Embodiment]

Figure 26:
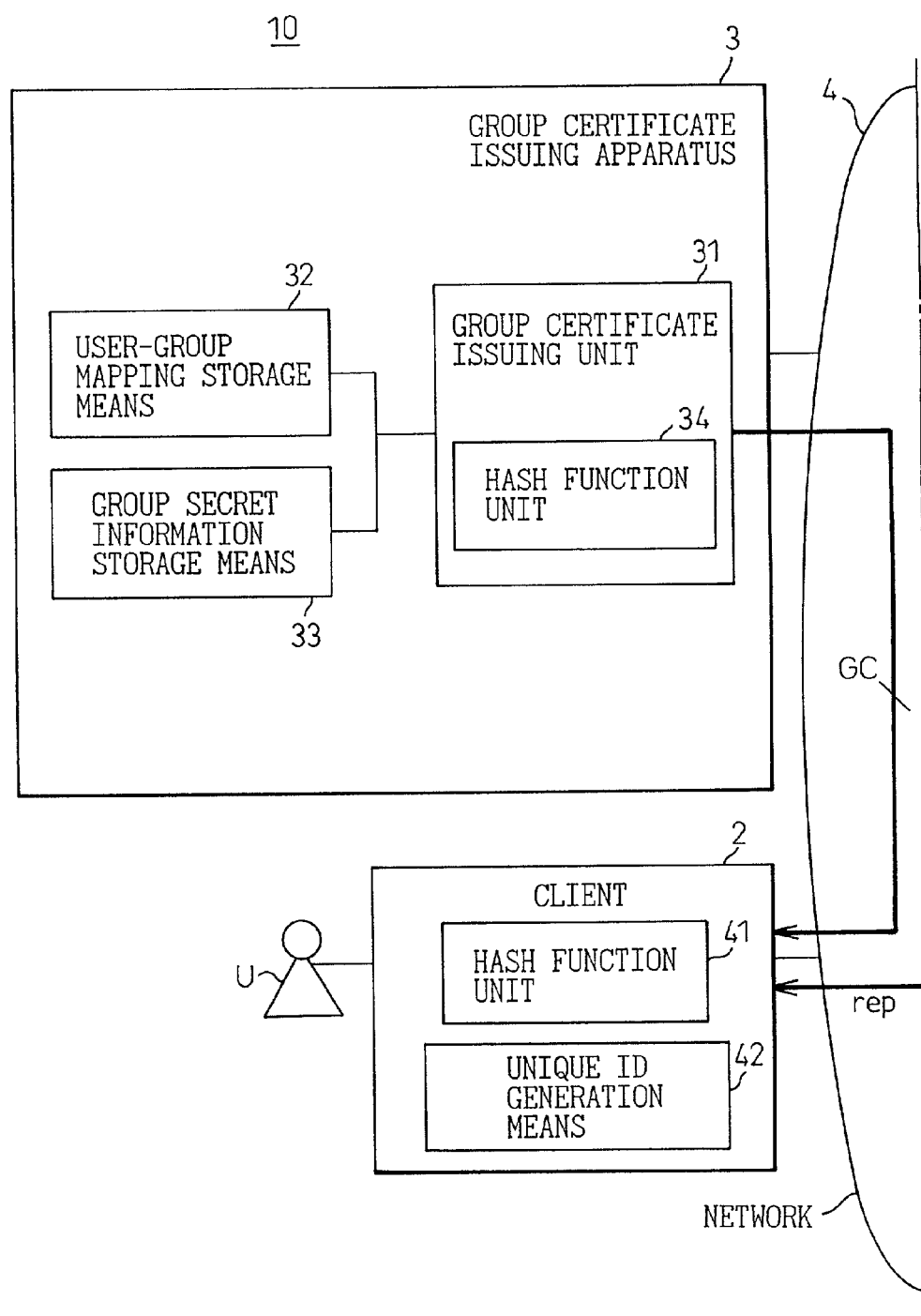
FIG. 26 is a first part of a view of a third embodiment according to the present invention.
Figure 27:
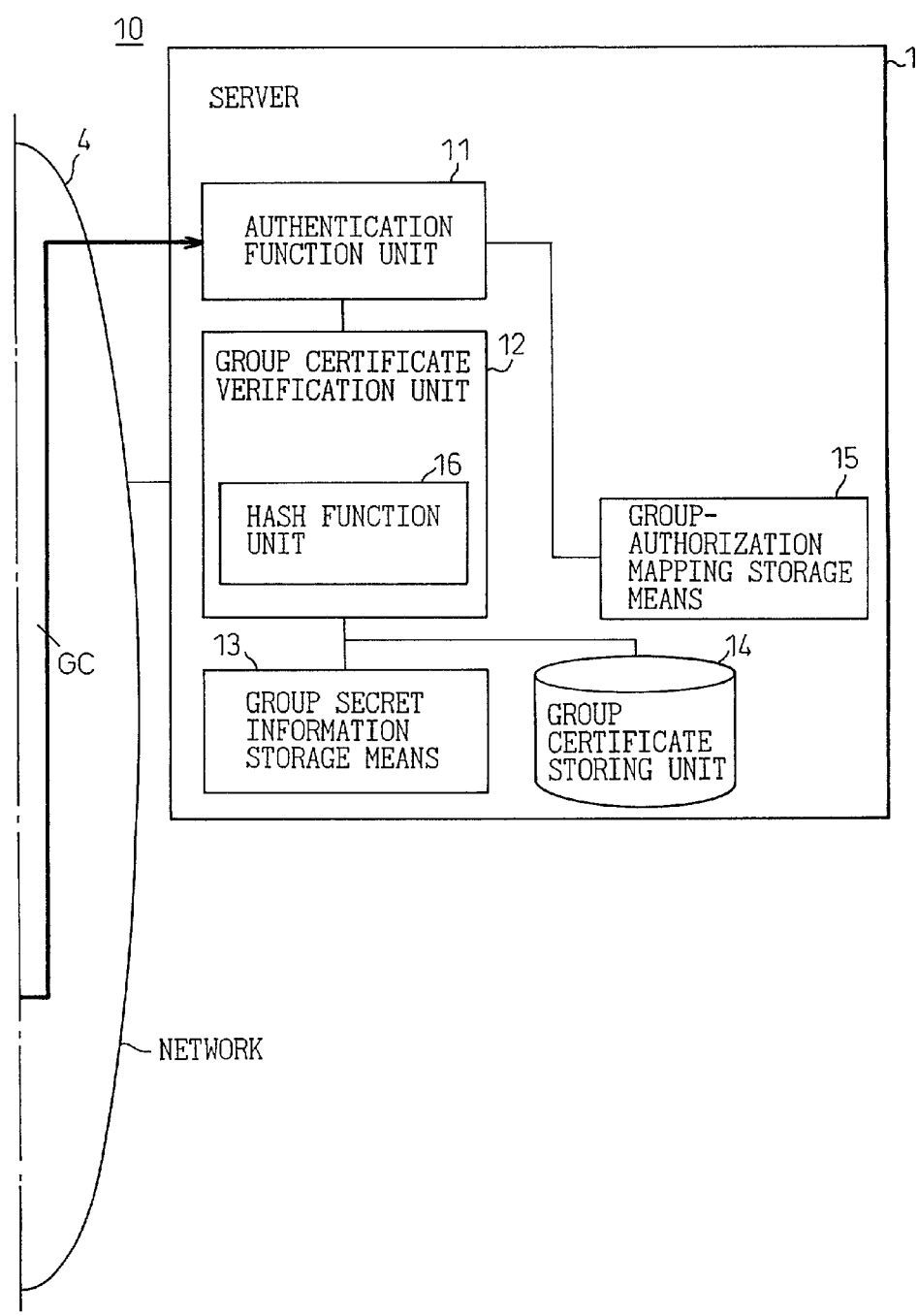
FIG. 27 is a second part of a view of the third embodiment according to the present invention.

FIGS. 26 and 27 are parts of a view of a third embodiment according to the present invention.

The group certificate issuing apparatus 3 in this third embodiment cooperates with a unique ID generation means 42 provided in the client 2. This unique ID generation means 42 generates an authentication ID "auth_id" for mutual authentication between the client 2 and the server 1, includes this authentication ID in the group certificate GC, and transmits the same to the server 1.

Also, in the group certificate verification unit 12 in the third embodiment, for the mutual authentication between the client 2 and the server 1, the authentication ID "auth_id" transmitted included in the group certificate GC is received from the client 2 and predetermined processing is applied to this to generate the server reply "rep". This server reply is returned to the client 2. This returned server reply is compared with the server reply "rep'" expected in the client 2 by using the same processing as the predetermined processing. When the two coincide, the client 2 can authenticate the server 1.

Furthermore, the group certificate issuing apparatus 3 in the third embodiment receives the group certificate GC including the transmitted authentication ID "auth_id" at the server, applies predetermined processing to this, and returns the thus obtained server reply "rep" to the client 2. The server reply "rep'" expected at the client 2 by using the same processing as the predetermined processing and the returned server reply "rep" are compared. When the two coincide, the client 2 authenticates the related server.

In the systems of distributed group management 10 of the embodiments explained above, the server 1 authenticated the user U of the client 2, but the client 2 did not conversely authenticate the server 1. Namely, there was no means for confirming from the client 2 if the server 1 requested by the client 2 to do the remote processing was the real server which knew the secret information (secret 1, secret 2, . . . ) of the group corresponding to the group name.

For this reason, it was impossible to prevent a false server from accepting a request from a client 2 on the pretext of being the real server, so there was a disadvantage in security.

Referring to FIG. 26 and FIG. 27 again, in the third embodiment, in addition to the components of the embodiments explained above, the client 2 has the unique ID generation means 42.

The client 2 receiving the group certificate GC from the group certificate issuing apparatus 3 generates an authentication ID "auth_id" unique over a sufficient number of times of generation and of a generated value which cannot be expected by using the unique ID generation means 42 at time of a remote processing request to the server 1. Then, the client transmits this authentication ID and the group name and the valid term information "timestamp" in the group certificate GC to the server 1.

The server 1 receiving them generates the value of the server reply "rep" which cannot be generated unless all of these values are known from three received values and the secret information corresponding to the related group by utilizing the hash function unit 16, then returns this generated reply "rep"to the client 2.

The client 2 processes the value of the server reply expected from the temporary password "temp" and the authentication ID and compares the two so as to confirm the value is equal to the server reply "rep" returned from the server 1. If they are equal, the client 2 regards that the authentication of the server succeeded, transmits the temporary password "temp" or log-in request GC' to the server 1 in the same way as the already explained embodiments thereafter, and receives the authentication.

Figure 28:
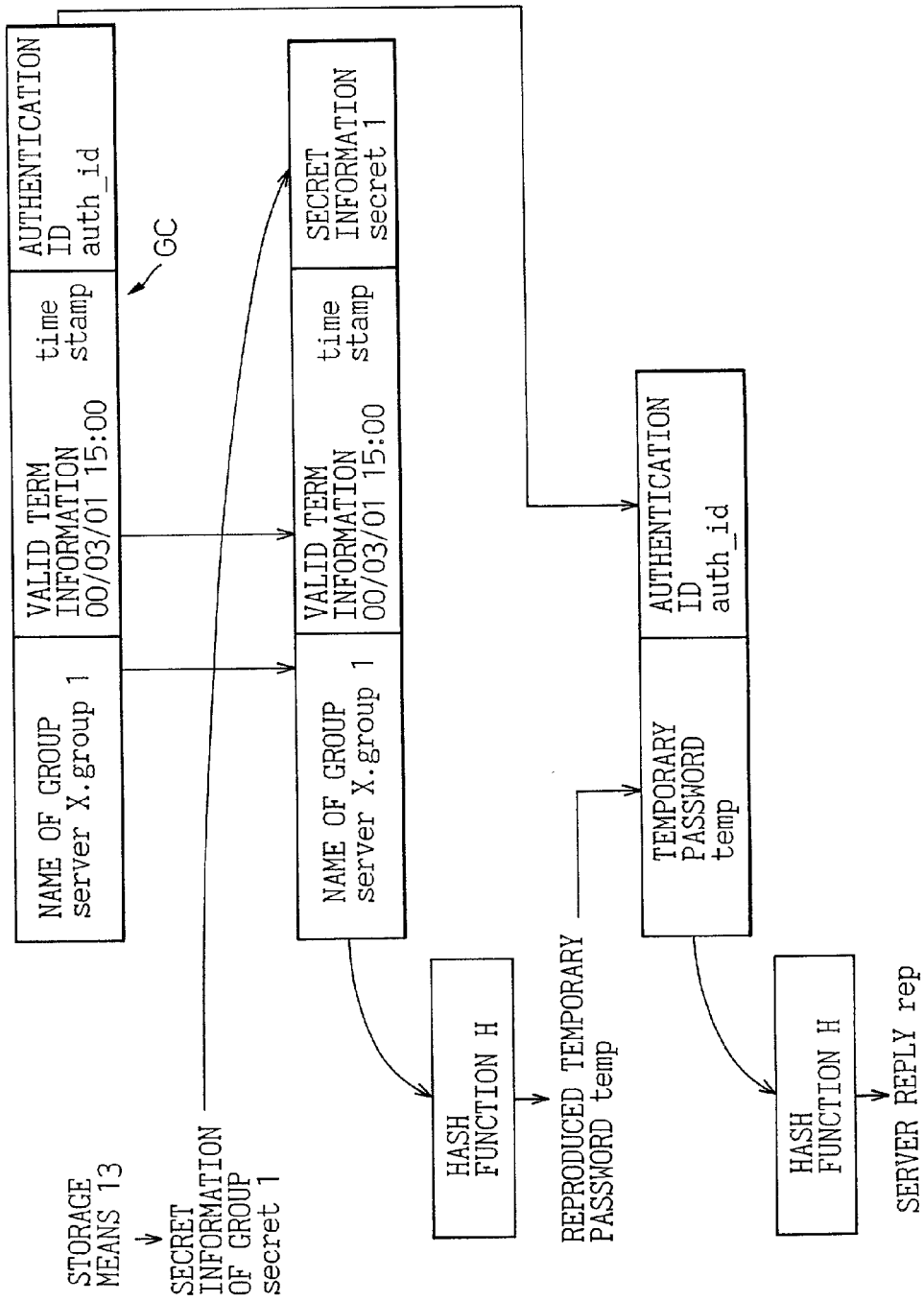
FIG. 28 is a view of a concrete method of generation of a server reply "rep"

FIG. 28 is a view of a concrete method of generation of the server reply "rep".

The server 1 fetches the group name and the valid term information from the group certificate GC (the uppermost stage in the figure) received from the client 2, adds the secret information of the related group (defined as the secret 1) to them, and applies the hash function H to reproduce the temporary password "temp" (middle stage in the figure).

Further, it adds the authentication ID "auth_id" fetched from the group certificate GC to the temporary password "temp" and applies the hash function H again. The value obtained here becomes the server reply "rep".

Figure 29:
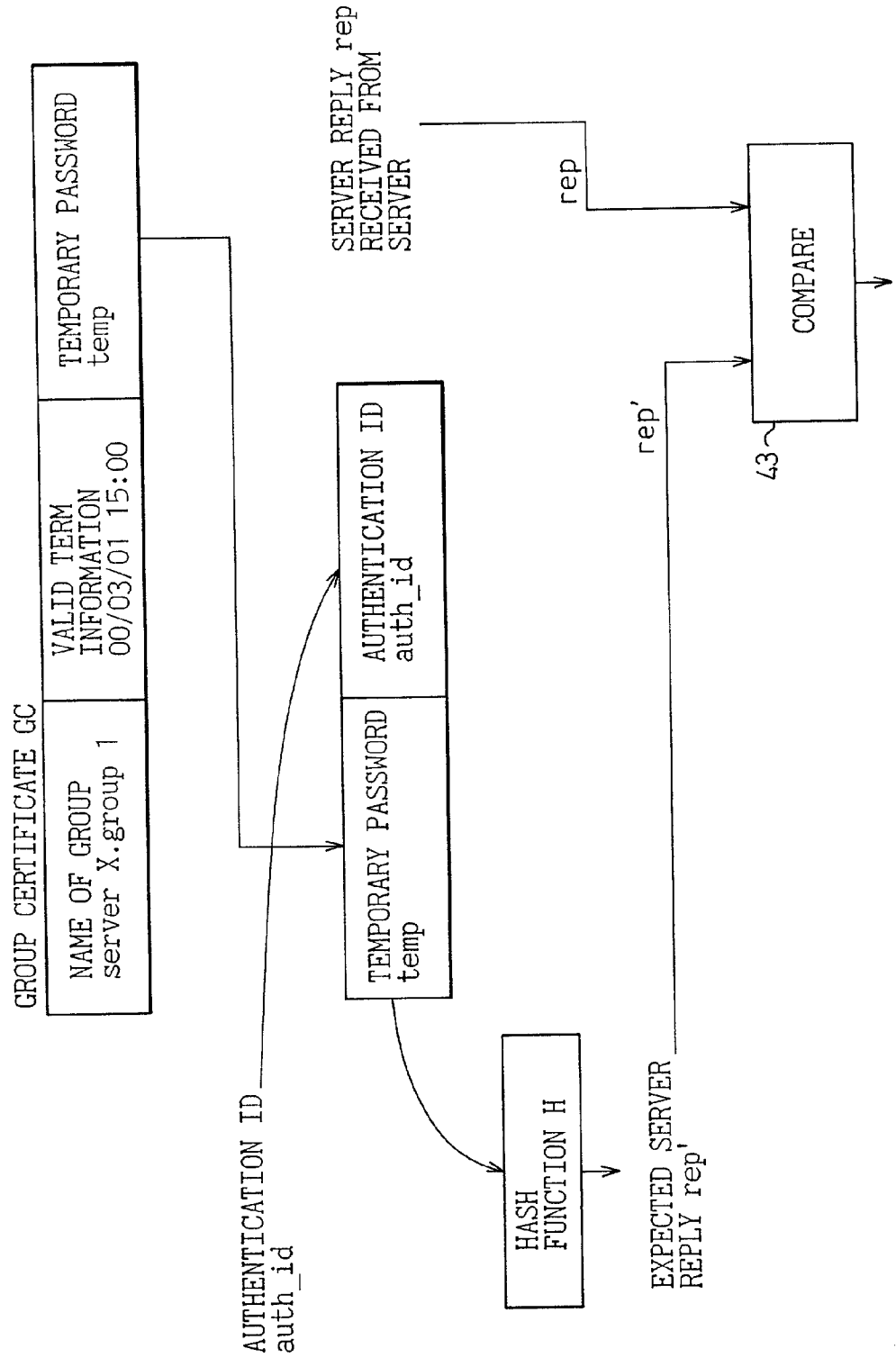
FIG. 29 is a view of a concrete method of verification of the server reply "rep" on the client side.

FIG. 29 is a view of a concrete method of verification of the server reply on the client side.

In the client 2, the temporary password "temp" is fetched from among the information of the held group certificates GC, the held authentication ID "auth_id" explained above is added to this, and the hash function H is applied in the same way as the server side. By this, the expected server reply "rep'" is obtained.

The client 2 compares the expected server reply "rep'" and the server reply "rep" of FIG. 26 returned from the server 1 at its own comparison means 43. When the two are equal, it can determine the related server is the correct server 1.

Figure 30:
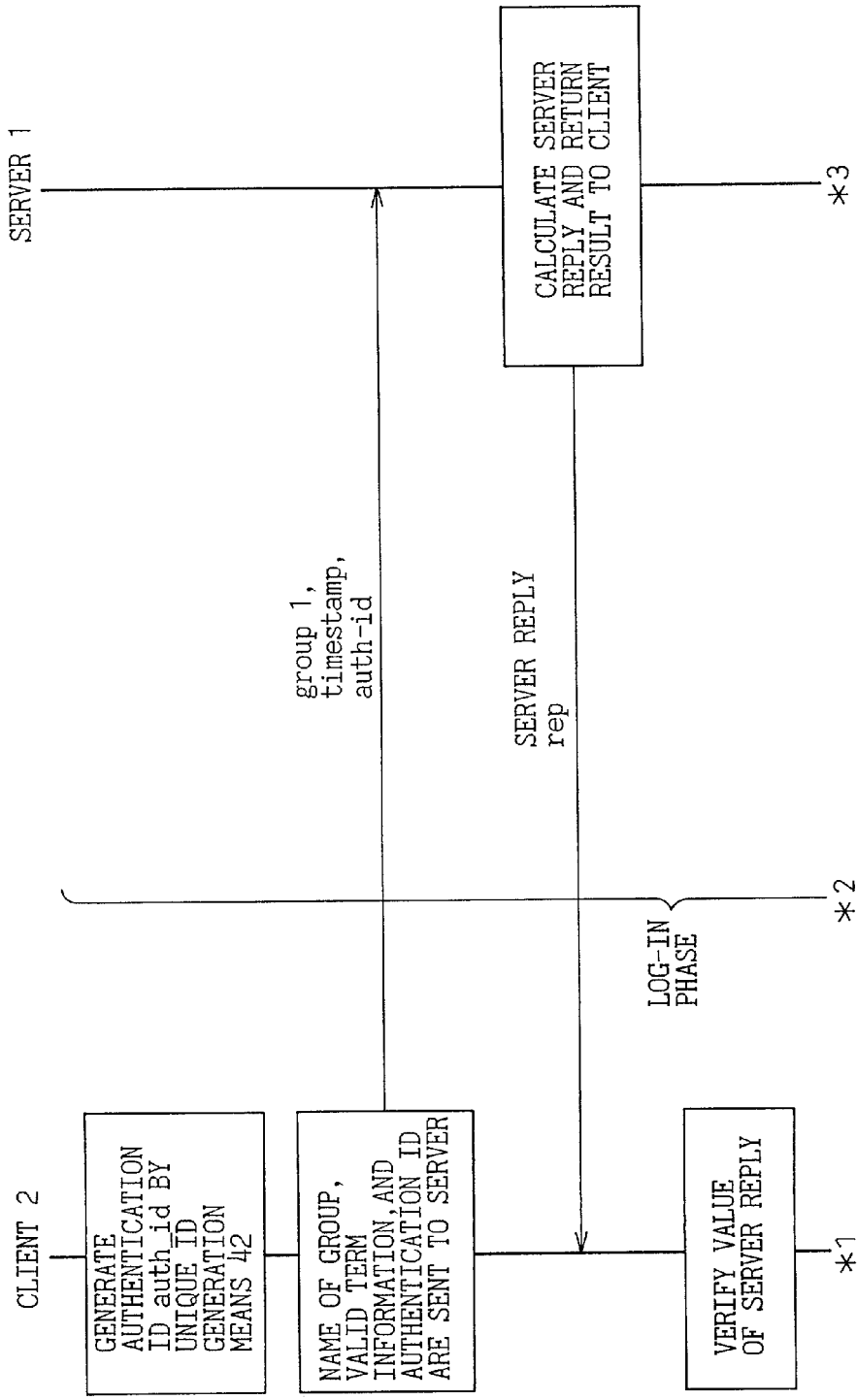
FIG. 30 is a first part of a view of the flow of the overall processing according to the third embodiment.
Figure 31:
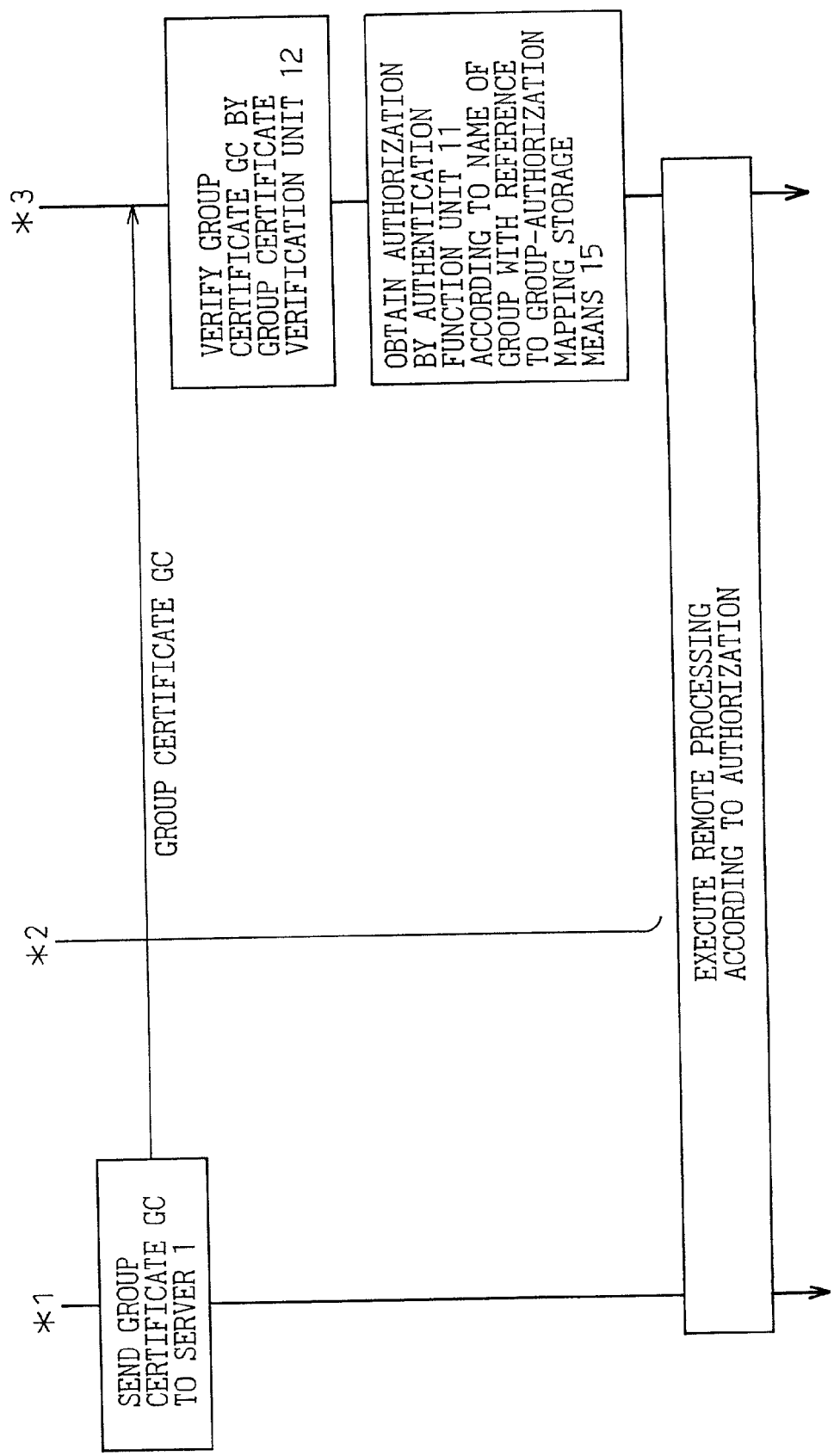
FIG. 31 is a second part of a view of the flow of the overall processing according to the third embodiment.

FIGS. 30 and 31 are parts of a view of the flow of the overall processing according to the third embodiment.

In order to request remote processing to the server 1, the client 2 first generates the authentication ID "auth_id" by the unique ID generation means 42 and transmits three pieces of information, that is, the group name, valid term information, and the authentication ID, to the server 1. The server 1 generates the server reply "rep" by the method shown in FIG. 28 explained above and returns this "rep" to the client 2. The client 2 verifies this by the method shown in FIG. 29 explained above. If the result of the verification is correct, thereafter, the group certificate GC or the log-in request GC' is transmitted to the server 1 in the same way as the already explained embodiments.

Note that, the authentication ID "auth_id" must be unique to an extent that prediction of the next value is impossible to compute and there is a very small probability of a value accidentally matching. Simple random numbers are also possible, but in order to avoid accidental loss of the uniqueness, it is further preferred if a value which varies every time like a serial number is combined with the random numbers. This is because the next value can be predicted by just the serial numbers.

As explained above, in the third embodiment, the client 2 transmits an authentication ID "auth_id" different every time to the server 1. The server 1 generates the server reply "rep" from the authentication ID and the secret information of the group and returns it to the client 2. The client 2 verifies the server reply "rep". Accordingly, a false server which does not know the secret information of the group cannot generate the server reply correctly corresponding to the authentication ID which differs every time. For this reason, it becomes possible for the client to authenticate the server. By this, the request of remote processing to a false server can be prevented, so there is an effect that the security rises.

[Fourth Embodiment]

Figure 32:
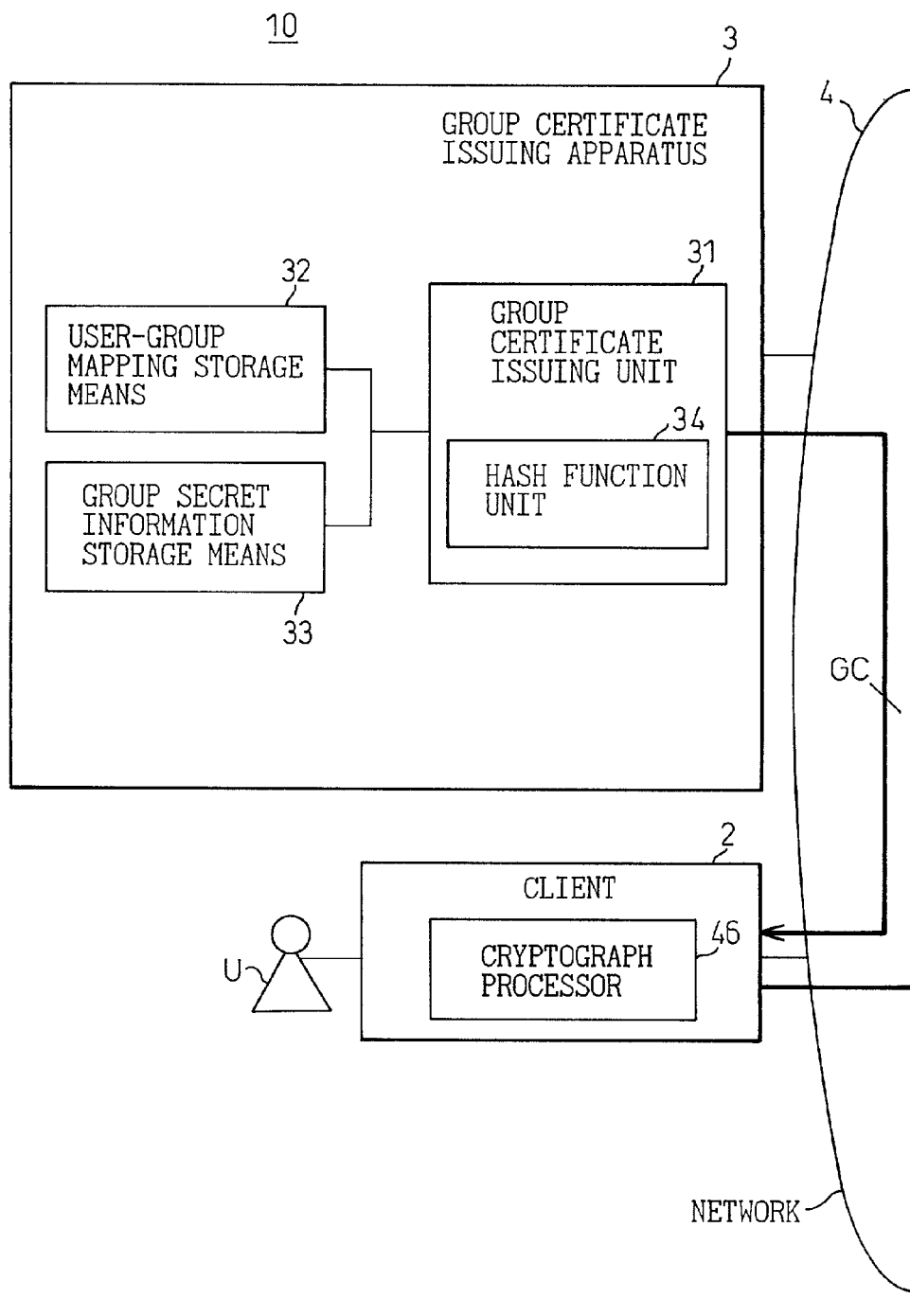
FIG. 32 is a first part of a view of a fourth embodiment according to the present invention.
Figure 33:
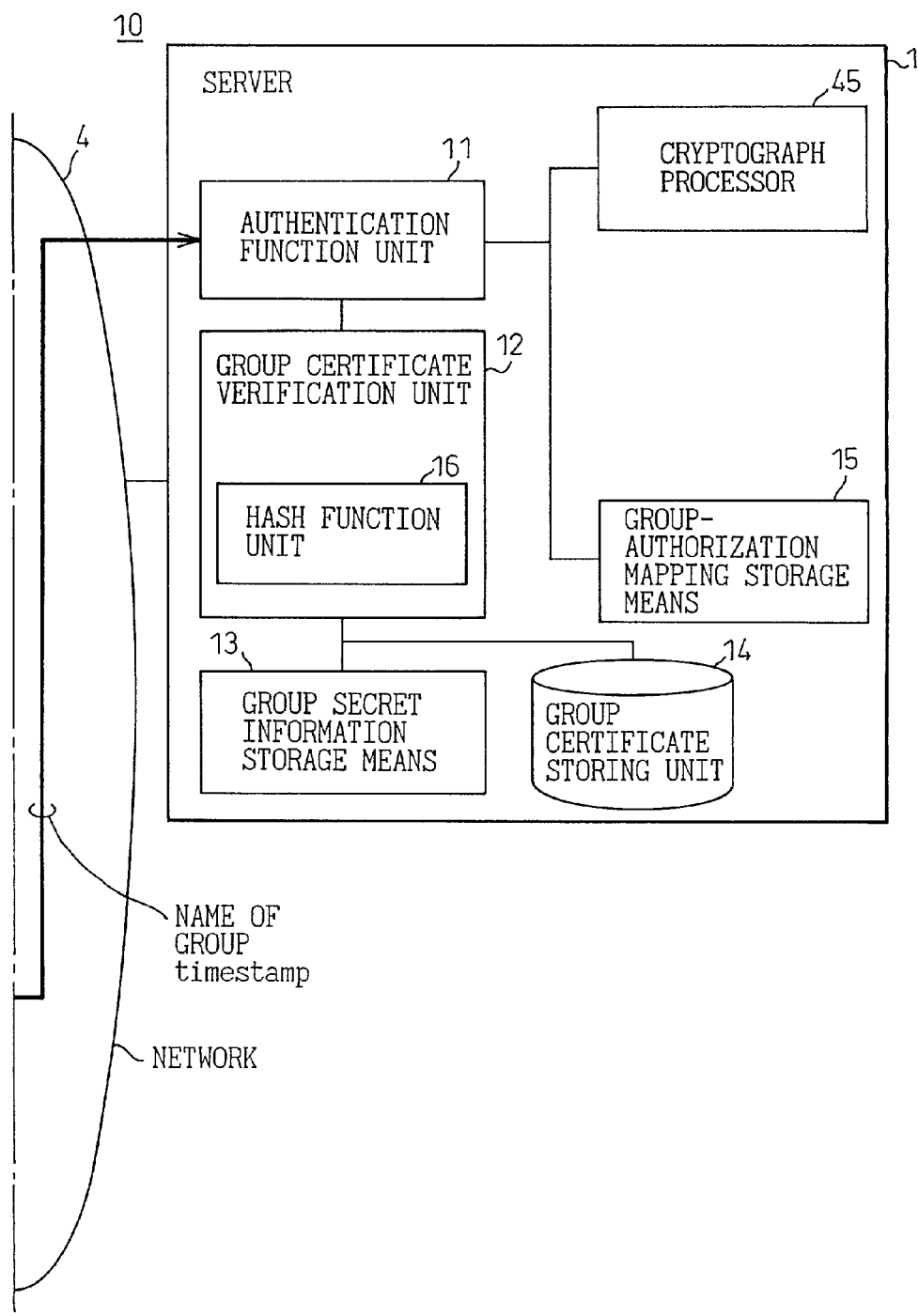
FIG. 33 is a second part of a view of the fourth embodiment according to the present invention.

FIGS. 32 and 33 are views of a fourth embodiment according to the present invention.

The group certificate issuing apparatus 3 in this fourth embodiment cooperates with an encryption processing unit 46 provided in the client 2. This encryption processing unit 46 operates so as to establish the encryption session from the client 2 to the server 1 with the temporary password "temp" as the encryption key.

Also, the group certificate verification unit 12 in the fourth embodiment cooperates with an encryption processing unit 45 provided in the server 1. This encryption processing unit 45 operates so as to establish the encryption session from the server 1 to the client 2 with the temporary password "temp" as the encryption key.

In the systems of distributed group management 10 of the first and second embodiments explained above, the server 1 authenticates the user U of the client 2, but the client 2 does not conversely authenticate the server.

For this reason, in the already explained first and second embodiments, there is the disadvantage in security as explained in the third embodiment.

Referring to FIG. 32 and FIG. 33 again, in this fourth embodiment, in addition to the components of the first and second embodiments explained above, the encryption processing units 45 and 46 are provided so that the server 1 and the client 2 can perform encryption and/or decryption based on the same encryption algorithm.

The client 2 receiving the group certificate GC from the group certificate issuing apparatus 3 transmits the group name and the valid term information to the server 1 at the time of a remote processing request to the server 1. The server 1 receiving them generates the group certificate GC from these two values and the secret information of the group. Thereafter, communication relating to the remote processing request is encrypted with the value of the temporary password "temp" in the group certificate as the encryption key, the communication is transmitted to each other, and decryption is carried out when it is received.

Figure 34:
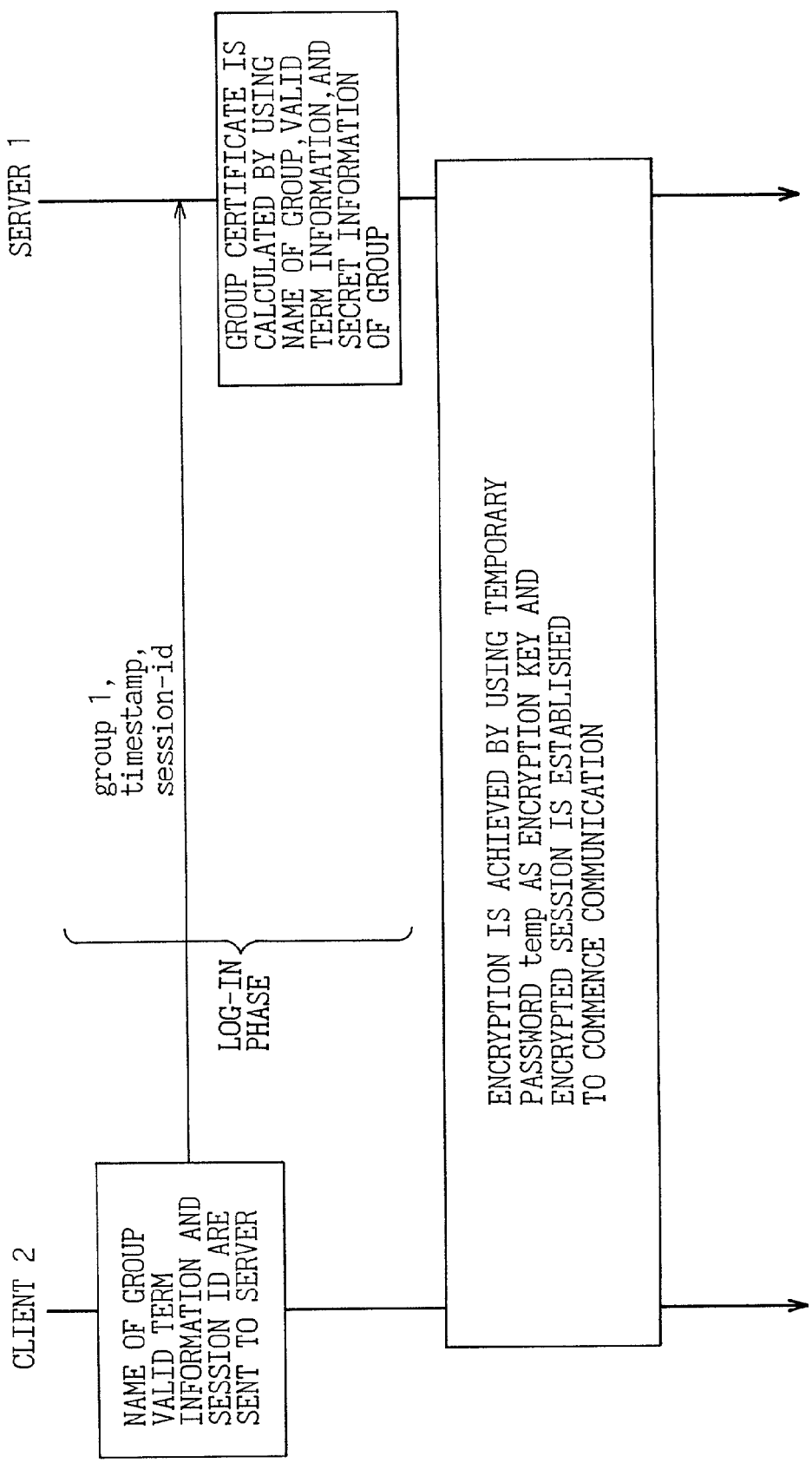
FIG. 34 is a view of the flow of the overall processing according to the fourth embodiment.

FIG. 34 is a view of the flow of the overall processing according to the fourth embodiment. Note, the "group certificate acquirement phase" is similar to that explained above, so only the "log-in phase" is shown.

In the fourth embodiment, in the same way as the first and second embodiments, after receiving the issuance of the group certificate GC, the client 2 transmits the group name and the valid term information "timestamp", and the server 1 processes the temporary password "temp" from them and the secret information of the group. By this, the value of the temporary password is shared between the server 1 and the client 2, therefore, thereafter, the encrypted communication is carried out with this value as the encryption key. By this, even without the explicit authentication as in the case of the third embodiment, the communication content can be sent only with respect to the correct opposing party. In an example of the flow of the processing of the log-in phase of FIG. 34, the session ID "session_id" is transmitted from the client 2. This is added where a plurality of users U or clients 2 are connected to the same server in order to discriminate them on the server side. Accordingly, this is not always necessary for the principle of the fourth embodiment. The session ID "session_id" may be explicitly generated at the client 2 and transmitted. Alternatively, use may be made of a value obtained from the communicating means, for example, the host address or port number of the client.

As explained above, in the fourth embodiment, the client 2 obtains the temporary password "temp" from the issued group certificate GC, and the server 1 obtains the temporary password "temp" from the three pieces of information of the group name and the valid term information received from the client 2 and the secret information of the group held by itself and can share the "temp" in secret.

By using this temporary password "temp" for encryption of the following communication, only the above two units (except the group certificate issuing apparatus 3) can decrypt this encrypted communication. Therefore, even if the authentication is not explicitly carried out, the communication content is transferred to only the correct opposing party as if the mutual authentication were carried out. By this, the request of remote processing to the false server can be prevented, so there is the effect that the safety rises.

[Fifth embodiment]

Figure 35:
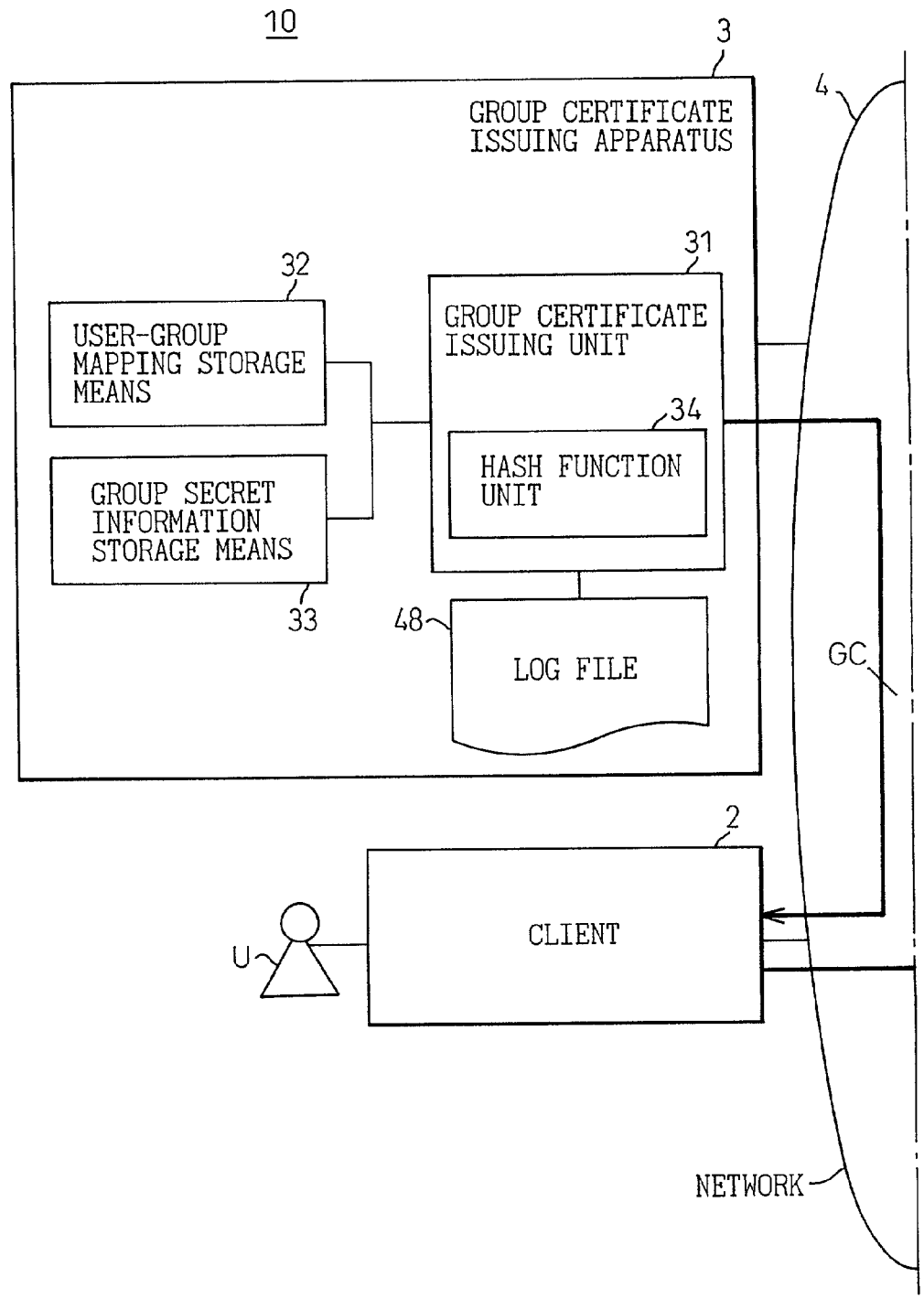
FIG. 35 is a first part of a view of a fifth embodiment according to the present invention.
Figure 36:
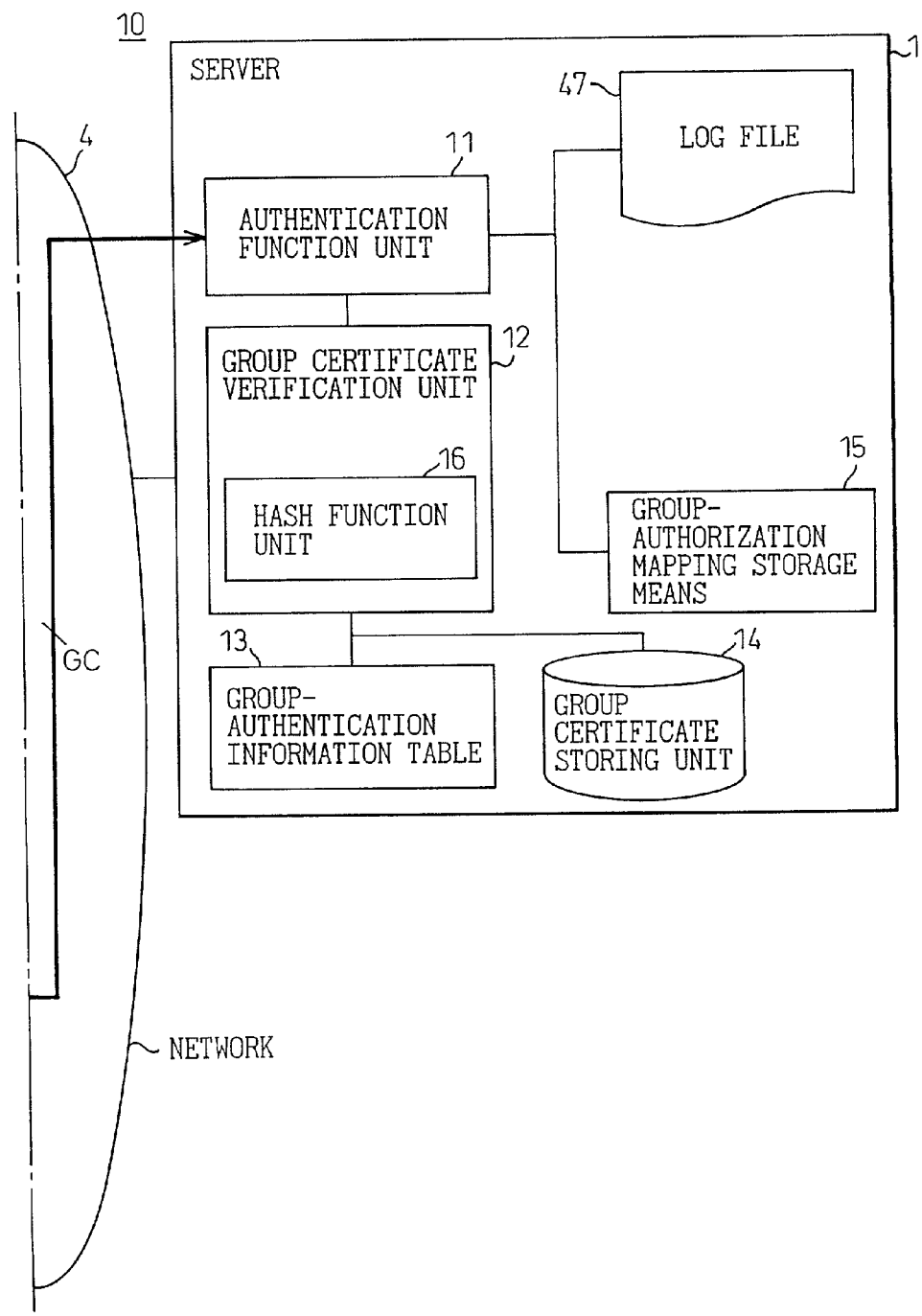
FIG. 36 is a second part of a view of the fifth embodiment according to the present invention.

FIGS. 35 and 36 are parts of a view of a fifth embodiment according to the present invention.

The group certificate issuing apparatus 3 in this fifth embodiment is provided with a log file 48 for recording a log of the session according to each remote processing request for each of the users U and supervises each user based on the log.

Also, the group certificate verification unit 12 in the fifth embodiment cooperates with a log file 47 provided in the server 1. This log file 47 records a log of the session according to each remote processing request for each of the users U and supervises each user based on this log.

Further, in the group certificate issuing apparatus 3 in the fifth embodiment, the temporary password "temp" for every session is included in the log so as to identify the sessions.

Also, the group certificate verification unit 12 of the fifth embodiment includes the temporary password "temp" for every session in the log to enable identification of the sessions.

In the server, who requests what operation and what was performed is sometimes recorded in the log. However, in the systems of distributed group management 10 of the embodiments explained above, the server 1 can determine on which group the request is based, but cannot determine which user actually transmitted the request. For this reason, there is a disadvantage that, in a special case where for example every user is charged for part of the processing or an important processing is violated, it cannot be determined from the log which users were involved in the processing.

In the system 10 of the fifth embodiment, in addition to the system of the first embodiment, the server 1 has a log file 47, and the group certificate issuing apparatus 3 has a log file 48.

The group certificate issuing unit 31 of the group certificate issuing apparatus 3 records information capable of uniquely identifying the user name and the group certificate (for example the temporary password "temp") as the log together with the other information usually recorded (for example the server name, issuance date, and the valid term information) in the log file 48 in the processing for issuance of the group certificate explained according to the first embodiment.

The authentication function unit 11 of the server 1 records information capable of uniquely identifying the group name and the group certificate the same as the group certificate thereof as the log together with other information usually recorded in the log file 47 when receiving the group certificate GC explained according to the first embodiment or performing the verification. Note that, the present embodiment was explained as an improvement of the system 10 of the first embodiment, but a similar improvement is possible also with respect to the systems of the other embodiments. Also, the above "information capable of uniquely identifying" is sufficient so far as it can be regarded as unique in terms of probability even if it is not completely unique in terms of information theory (absolutely).

FIG. 37 is a view of an example of the data in the log file 48 in the group certificate issuing apparatus 3 of the fifth embodiment, and FIG. 38 is a view of an example of the data in the log file 47 in the server 1 of the fifth embodiment.

As explained above, in the fifth embodiment, in addition to the above embodiments, the group certificate issuing apparatus 3 and the server 1 record the logs in the log files 48 and 47. By checking them, individual auditing of the users becomes possible.

Referring to FIG. 37, in order to specify the user and the group certificate GC issued to the user, it is sufficient so far as there are the user name and the temporary password "temp". In this example, other than them, the issuance date, server name, group name, and the valid term information (timestamp) of the issued group certificate GC are recorded in the log file 48.

Referring to FIG. 38, in the same way as the case of the log file 48 in the group certificate issuing apparatus 3, in addition to the temporary password "temp" for specifying the group certificate, a starting date and an ending date of the remote processing, host name of the client, group name, and the valid term information are recorded in the log file 47.

What events the server 1 records in the log file 47 and at what time and upon what opportunity it records them are not particularly limited in the present invention, but there can be mentioned for example a time when the group certificate is received, a time when the verification of the group certificate succeeds, a time when an important remote processing that requires charging is carried out, and a time when an important violation occurs in the execution of the security and the remote processing.

Note that, in these examples, the temporary password is expressed as a series of decimal digits, but the password can be recorded in the log files 47 and 48 in any format so far as it has a format that can uniquely identify the original password.

As explained above, in the fifth embodiment, the log including information capable of uniquely identifying the group certificate GC and the group name is recorded in the log file 47 on the server 1 side, while the log including information capable of uniquely identifying the group certificate GC and the user name is recorded in the log file 48 on the group certificate issuing apparatus 3 side. In other words, it is recorded in the log file 48 on the server 1 side what was requested and what was performed by using which group certificate, while, in the log file 47 on the group certificate issuing apparatus 3 side, which group certificate is issued to which user is recorded.

Accordingly, there is an effect such that it can be determined which user requested what to the server and performed what by checking the log files of the two between the items wherein the information capable of uniquely identifying the group certificate are the same.

[Sixth embodiment]

Figure 39:
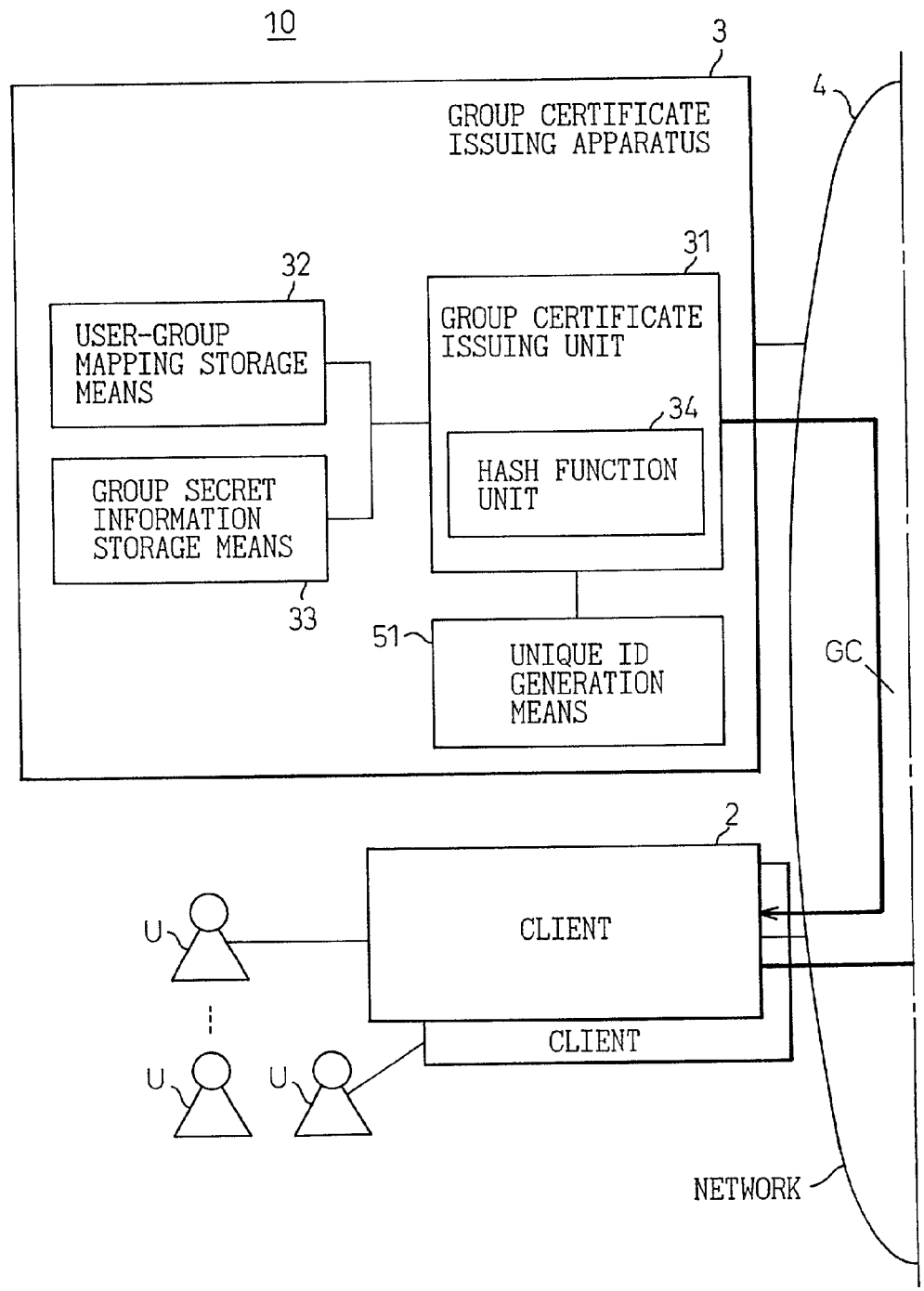
FIG. 39 is a first part of a view of a sixth embodiment according to the present invention.
Figure 40:
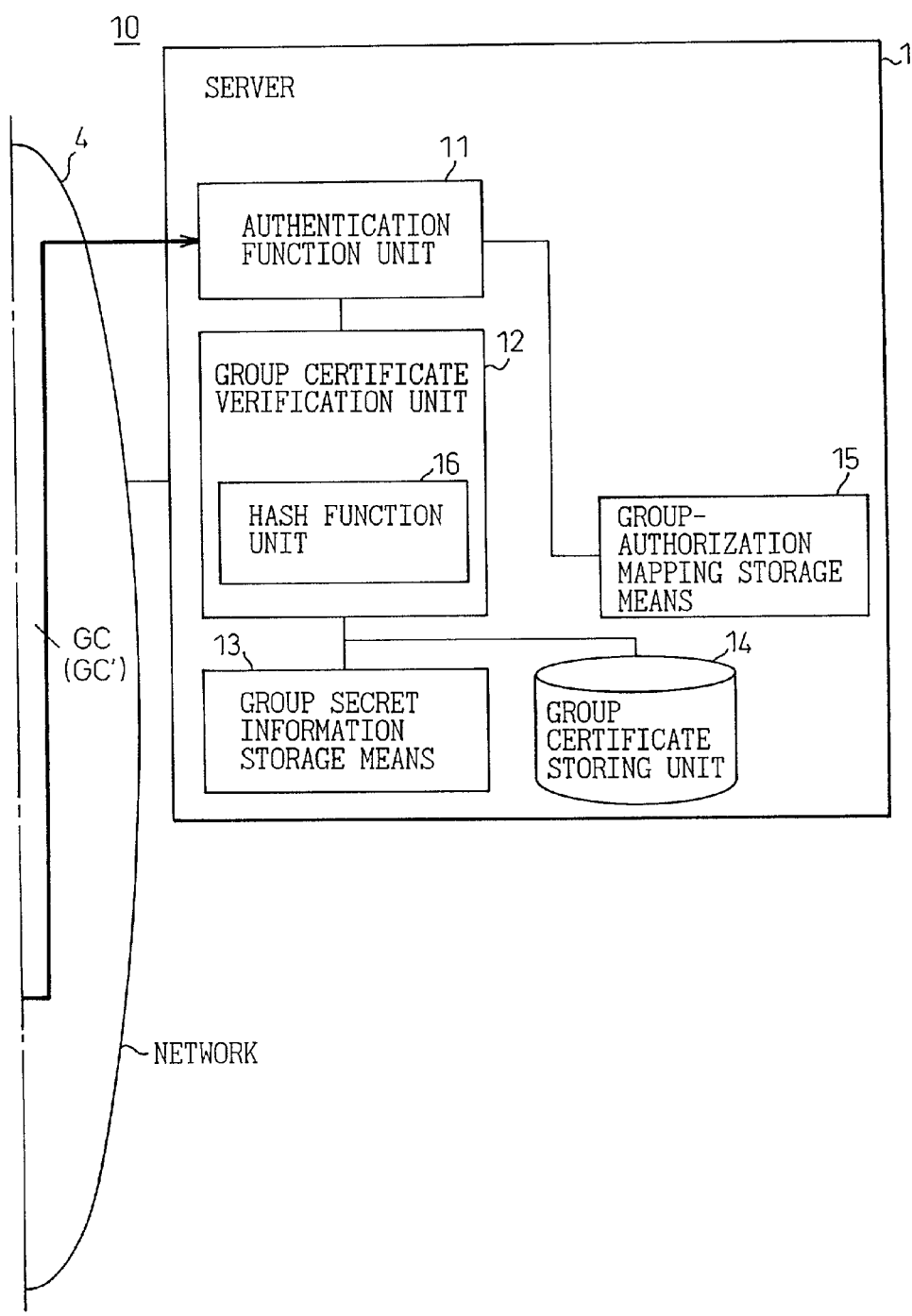
FIG. 40 is a second part of a view of the sixth embodiment according to the present invention.

FIGS. 39 and 40 are parts of a view of a sixth embodiment according to the present invention.

The group certificate issuing apparatus 3 in this sixth embodiment further includes a unique ID generation means 51. Further, the hash function unit 34 forming the issuance side processor further adds valid term information (timestamp) to the group name and the secret information unique to the group, applies the processing of the hash function H to this, regards the obtained issuance side processed value (hash value) as the temporary password (temp), and generates a group certificate GC from the group name, valid term information (timestamp), and the temporary password. Here, the unique ID generation means 51 generates a certificate ID for identifying the group certificate for every user and adds the same to corresponding group certificate GC when group certificates GC having identical contents are issued with respect to a plurality of different users.

Also, the group certificate verification unit 12 in the sixth embodiment receives a group certificate GC plus a certificate ID for identifying the group certificate for every user from the client 2 and allots a plurality of different users to the identical group by the certificate IDs when group certificates GC having identical contents are issued with respect to a plurality of different users.

Similarly, this group certificate issuing apparatus 3 in the sixth embodiment includes the above unique ID generation means 51. Further, the hash function unit 34 forming the issuance side processor further adds the valid term information to the group name and the secret information unique to that group and applies the processing of the hash function H to this, obtains the one-time password "temp'" based on the obtained temporary password "temp", and generates the log-in request GC'. Here, the unique ID generation means 51 generates a certificate ID for identifying the log-in request for every user and adds the same to each corresponding log-in request GC' when log-in requests GC' having identical contents are issued with respect to a plurality of different users.

The group certificate verification unit 12 established corresponding to the group certificate issuing apparatus 3 receives a log-in request GC' plus the log-in request ID for identifying the log-in request for every user from the client 2 and allots the plurality of different users to the identical group by the log-in request ID when log-in requests GC' having identical contents are issued with respect to the plurality of different users.

In the systems of distributed group management 10 in the above embodiments, the identical group certificate may be issued overlappingly. Namely, when assuming that a plurality of users request the issuance of group certificates GC having the same valid term for the same group of the same server to the group certificate issuing apparatus 3 from the identical or different clients 2, group certificates having the same contents will be issued to different users. This is because, the group certificate GC is comprised of the group name, valid term information (timestamp), and the temporary password (temp), and this temporary password is uniquely prepared from the group name, valid term information, and the secret information of the group.

Accordingly, there arises an inconvenience that a plurality of different users cannot be discriminated by the group certificates GC or by the log-in requests GC' generated from the group certificates GC. For example, according to the first embodiment, the server 1 rejects the double use of the same group certificate (for the prevention of illegitimate use). Therefore, when one user previously uses a group certificate and once uses the server 1, usage by another user after that is rejected, so he must newly receive the issuance of the group certificate or log-in request in order to use the server 1. This causes a disadvantage that the system 10 becomes inefficient.

The system of distributed group management 10 of the sixth embodiment is provided with a function of imparting a certificate ID to the group certificate GC or the log-in request GC' in addition to the systems of the above embodiments. This certificate ID has sufficient uniqueness if within a range of frequency where the group certificates GC are issued overlappingly. In this case, as the method of generation of the certificate ID, for example the usage of random numbers or serial numbers can be used.

The group certificate issuing apparatus 3 has the unique ID generation means 51 for this purpose, generates the certificate ID capable of uniquely identifying the group certificate GC (or GC') by using the means 51 when issuing the group certificate GC, and imparts this to the group certificate GC (or GC') and issues the same.

The client 2 handles the certificate ID in the group certificate GC in the same way as the group name and the valid term information. When a log-in request GC' is generated, in the same way as the group name and the valid term information, the certificate ID is imparted to the log-in request.

The server 1 handles the certificate ID as a value comprising the group certificate or log-in request in the same way as the group name and the valid term information and utilizes the same for the identification, verification, and storage.

Figure 41:
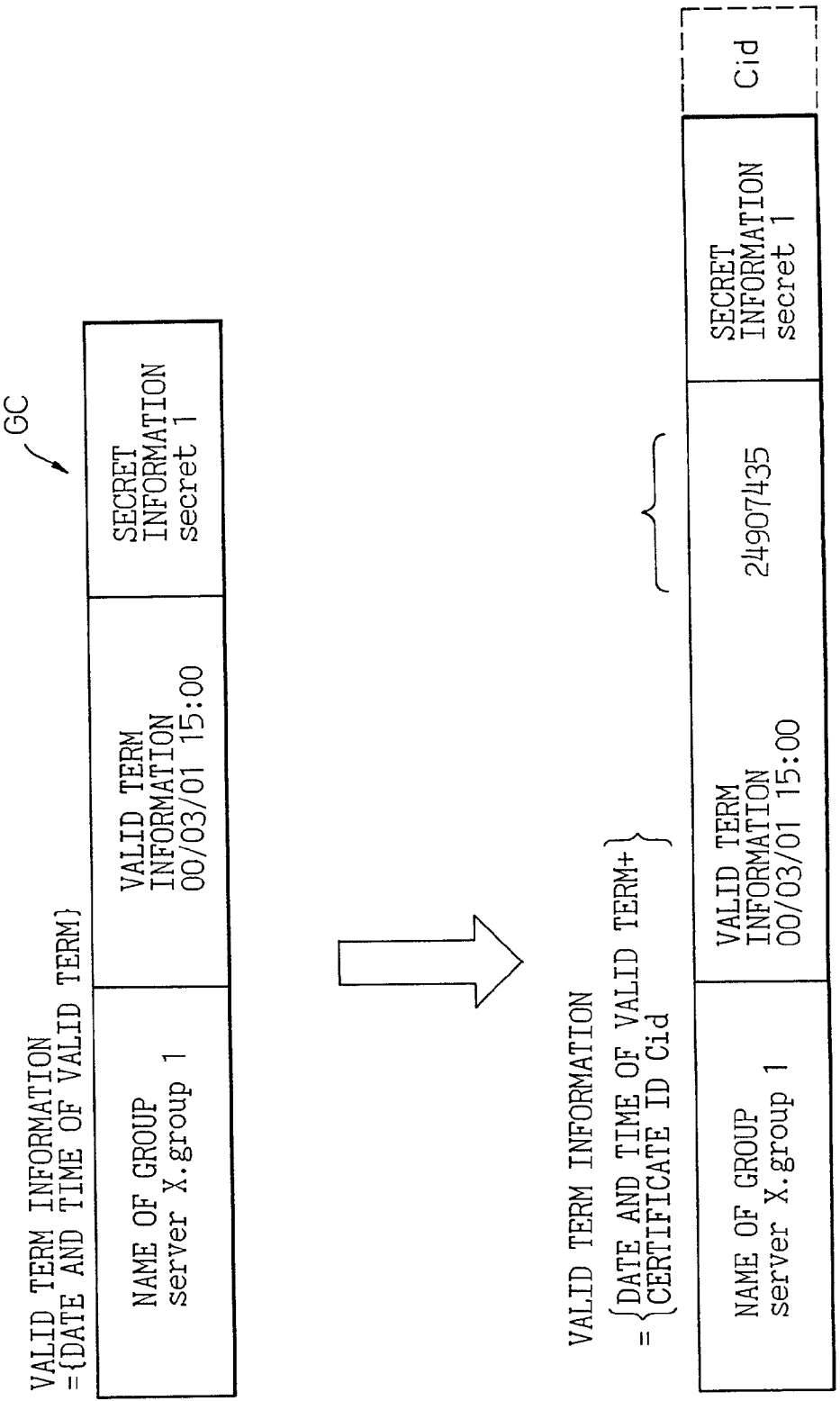
FIG. 41 is a view of an example of a certificate ID Cid based on the sixth embodiment.

FIG. 41 is a view of an example of the certificate ID Cid based on the sixth embodiment.

In the sixth embodiment, as an example, it is made possible to issue different group certificates GC with respect to different users from the same server name/group name/valid term information by adding the certificate ID Cid having uniqueness to the valid term information.

Referring to FIG. 41, the case where the certificate ID is added to the valid term information is shown. Here, as an example, at the preparation of the group certificate GC, the case where it is added to the data structure before applying the hash function H is shown. As shown in the figure, a certificate ID Cid comprised of eight decimal numbers is added after the date of the valid term. This certificate ID Cid is a serial number incremented by one for every group certificate issuing apparatus 3 (when there are a plurality of apparatuses 3) or whenever the group certificate is issued.

Note that, if the date of the valid term information and the certificate ID which have been already generated are fetched together and handled as shown in FIG. 41, there is the merit that the group certificate GC can be handled in the same way as the case of the above embodiments, but it is also possible to individually handle the unique certificate IDs Cid as shown on the right of the figure.

As explained above, in the sixth embodiment, by giving a unique certificate IDs Cid to the group certificate GC or the log-in request GC', even if group certificates having the same valid term with respect to the same group of the same server are issued to a plurality of different users, they can be discriminated, so the overlap of the group certificates or log-in requests is avoided.

By this, even if different users request the issuance of the overlapping group certificates, a different group certificate is issued for every user. Accordingly, as explained before, the inconvenience that a remote processing request by another user used the second and following times is rejected from the server 1 due to the rejection of the double use as explained above is solved. Accordingly, the other user does not require issuance of a new group certificate, so there is the effect that the efficiency of the system rises.

[Seventh embodiment]

Figure 42:
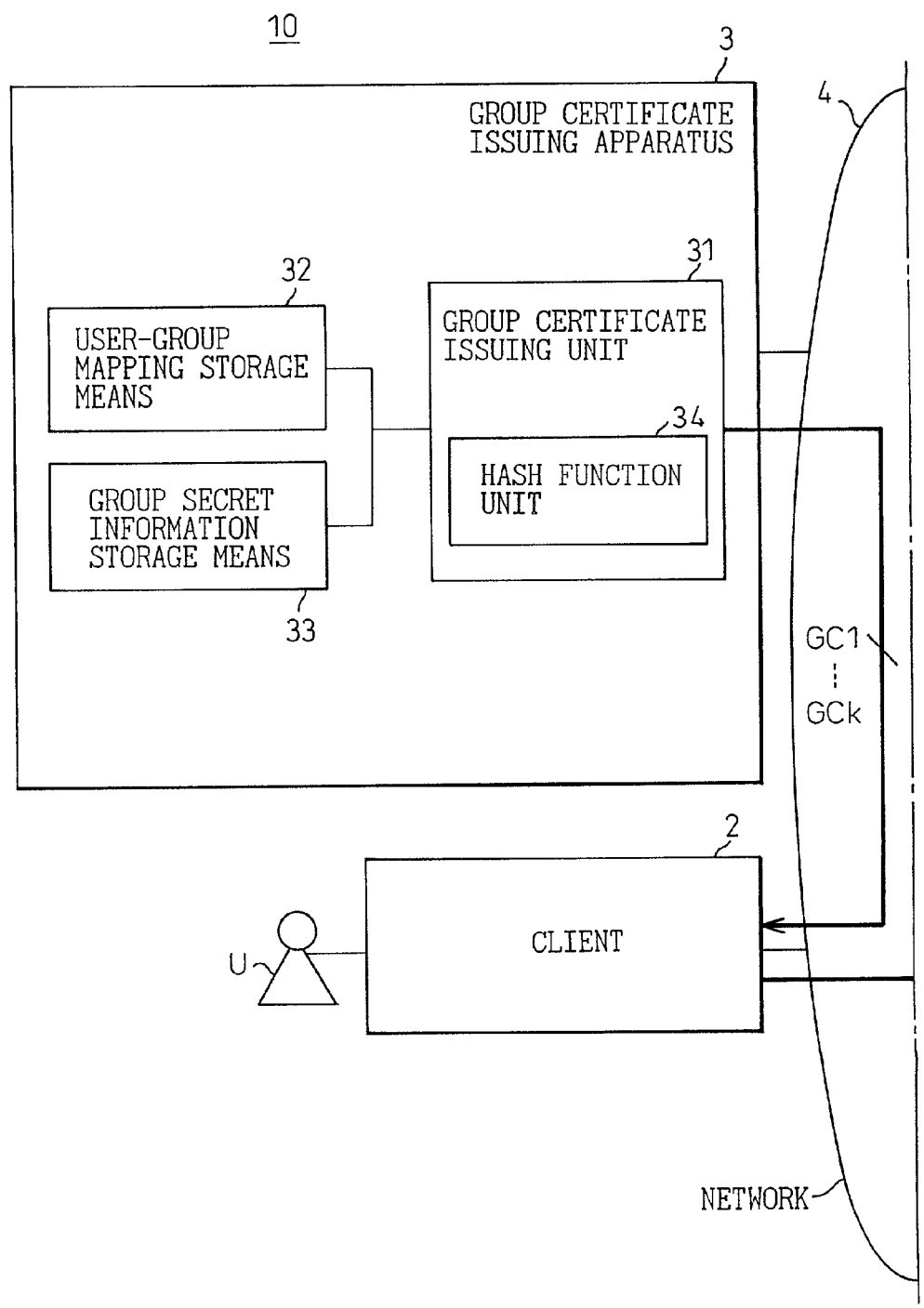
FIG. 42 is a first part of a view of a seventh embodiment according to the present invention.
Figure 43:
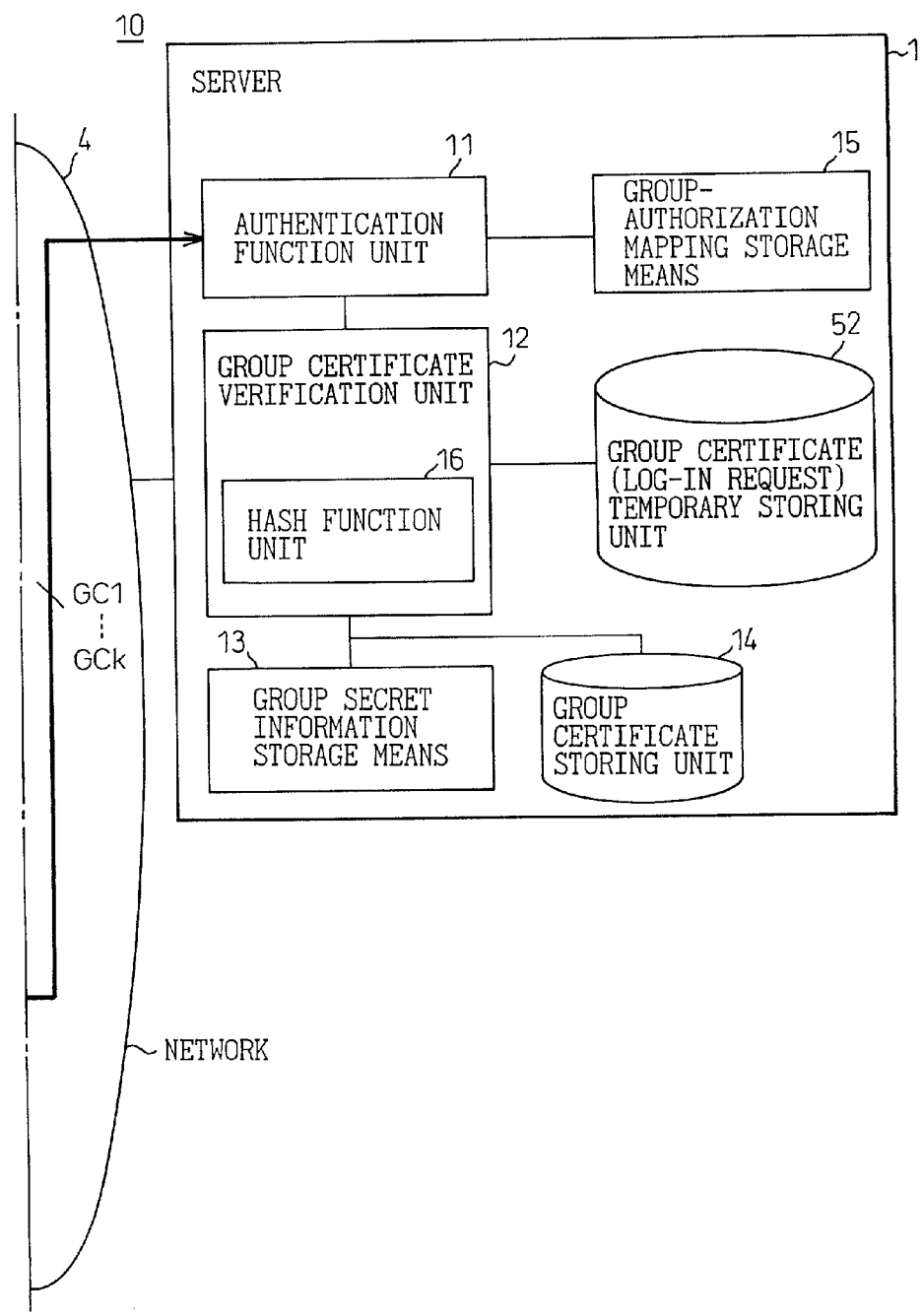
FIG. 43 is a second part of a view of the seventh embodiment according to the present invention.

FIGS. 42 and 43 are parts of a view of a seventh embodiment according to the present invention.

The group certificate issuing apparatus 3 in this seventh embodiment is provided with a user-group mapping storage means 32. This user-group mapping storage means can assign a plurality of different groups to one user.

Also, the group certificate verification unit 12 in the seventh embodiment cooperates with a group certificate temporary storing unit 52 provided in the server 1. When a plurality of different groups can be assigned to one user U, it verifies the group certificates GC received from the client 2 and then stores them in the group certificate temporary storing unit 52. Then, it switches the stored group certificates GC in accordance with the predetermined authorization necessary for the request with respect to the following remote processing requests.

Similarly, this group certificate verification unit 12 in the seventh embodiment cooperates with the log-in request temporary storing unit 52 provided in the server 1. When a plurality of different groups can be assigned to one user U, it verifies the log-in request GC' received from the client 2 and then stores this in the log-in request temporary storing unit 52. Then, it switches the stored log-in request in accordance with the predetermined authorization necessary for the request with respect to the following remote processing requests.

In the systems of distributed group management 10 of the above embodiments, when a plurality of group names are assigned to one user U, it is possible to change the systems so that the user U of the client 2 easily acquires a plurality of group certificates GC corresponding to the plurality of group names by, e.g., adding a mechanism designating the intended group name from the client 2.

However, in the end it is the server 1 that determines the authorization assigned to the group. The user U cannot always correctly select the group name with the authorization adequate for the execution of the remote processing which it itself wishes to request. Accordingly, there is a disadvantage that the remote processing must be requested by trial and error by sequentially sending some group certificates GC or log-in requests GC' to the server 1, so inconvenience and inefficient work are required.

Also, even if the user knows the necessary group and can correctly select the group, in a case where the authorization required for one series of related remote processing needs a plurality of different group names, when the processing must be moved into the next group name, if there is no authorization by the group name assigned at present, the fact that there is no authorization is notified from the server 1. For this reason, the user must execute the request of the remote processing again as the member of a new group. Accordingly, there is the disadvantage that the system 10 becomes inconvenient and inefficient.

Referring to FIG. 42 and FIG. 43 again, the system of distributed group management 10 of the seventh embodiment has the group certificate temporary storing unit 52 in the server 1 in addition to the system of the above embodiments. When the client 2 transmits a plurality of group certificate GC1 , . . . , GCk to the server 1, the server 1 verifies these GC one by one, then stores them in the group certificate temporary storing unit 52. By this, even if the client 2 does not select the group certificate or the server 1 does not inquire about the transmission of the necessary group certificate to the client 2, the server 1 per se can fetch the necessary group certificate from the group certificate temporary storing unit 52.

The client 2 receiving a plurality of group certificates GC1, . . . , GCk from the group certificate issuing apparatus 3 transmits these plurality of group certificates to the server 1 when requesting remote processing to the server 1.

The server 1 receiving these group certificates GC1, . . . , GCk verifies the received plurality of group certificates one by one in the same way as the cases of the above embodiments. In this case, the handling in the case where some of the plurality of group certificates are illegitimate is not particularly dealt with in the present invention. However, mention may be made of the steps of for example rejecting all group certificates or rejecting only the illegitimate group certificates and accepting only the legitimate group certificates to proceed with the processing.

The group certificates found to be legitimate as the result of the verification are stored in the group certificate temporary storing unit 52 until the valid term (timestamp) is ended or a separately determined period has passed. Thereafter, the server 1 fetches the suitable group certificates from the group certificate temporary storing unit 52 by switching in accordance with the remote processing requested by the user U and utilizes them in the same way as the cases of the above embodiments.

Note that, in a case where not the group certificates GC, but the log-in requests GC' are sent to the server 1, the processing the same as that described above is carried out for the log-in requests in place of the group certificates.

Figure 44:
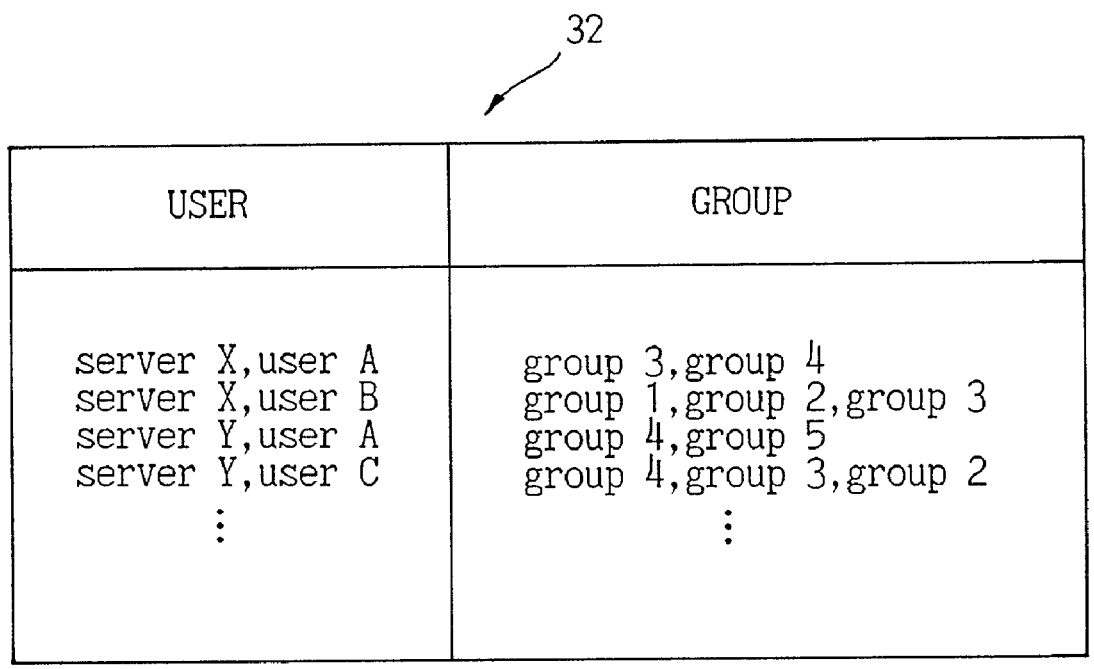
FIG. 44 is a view of an example of the data in the user-group mapping storage means 32 based on the seventh embodiment.

FIG. 44 is a view of an example of the data in the user-group mapping storage means 32 based on the seventh embodiment.

As explained above, in the seventh embodiment, in the case where a plurality of group names are assigned to one user U, and group certificates GC with respect to these plurality of group names are issued, the client 2 does not selectively transmit the group certificates GC, but transmits the plurality of group certificates to the server 1. These are temporarily stored in the group certificate temporary storing unit 52 on the server 1 side. As a result, the server 1 can selectively use the necessary groups even if the client 2 does not select the group certificates or other group certificates are not requested from the server 1 to the client 2. For this purpose, in the case where a plurality of group names are assigned to one user, as shown in FIG. 41, a plurality of group names are stored for every user in the storage means 32.

Note that, in the "group" column on the right side of FIG. 44, the server names (server X, Y, etc.) are omitted. These server names are exactly the same as those shown in the "user" column on left side of the same figure.

FIG. 45 is a view of an example of the data in the group certificate temporary storing unit 52 employed in the seventh embodiment.

In the figure, this storing unit 52 stores the plurality of group certificates GC which have been already verified in the server 1 and regarded as legitimate. In this example, the session ID Sid (for example a seven digit number) is stored together. This is the ID attached for identifying a plurality of users when the plurality of users are connected to one server, but it is not always necessary from the principle of the present embodiment. This session ID Sid can be explicitly reported from the client 2 too or use may be made of the information obtained from communicating means, for example, the host address or port number of the client and this regarded as the ID thereof.

Figure 46:
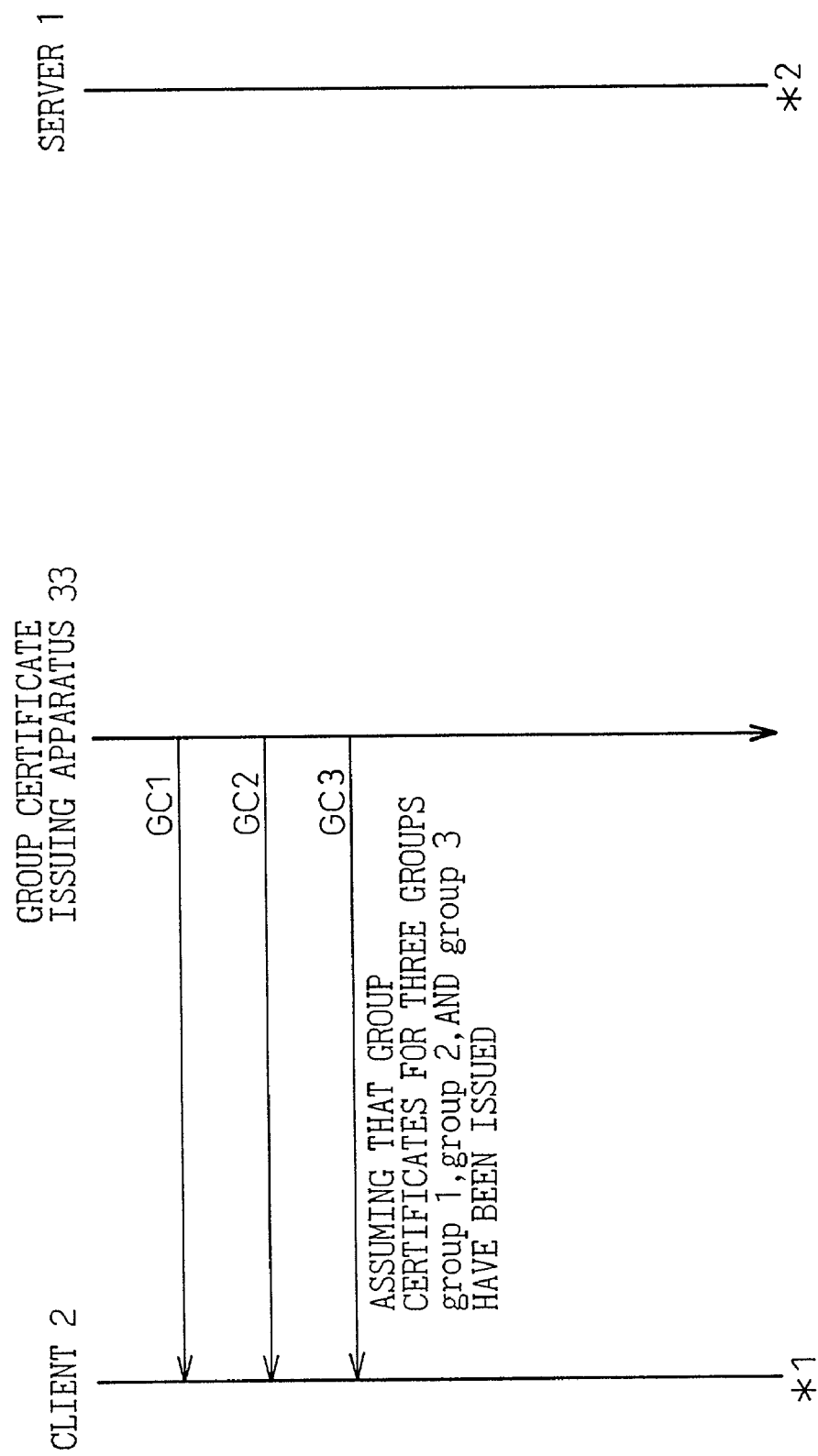
FIG. 46 is a first part of a view of the flow of the overall processing according to the seventh embodiment.
Figure 47:
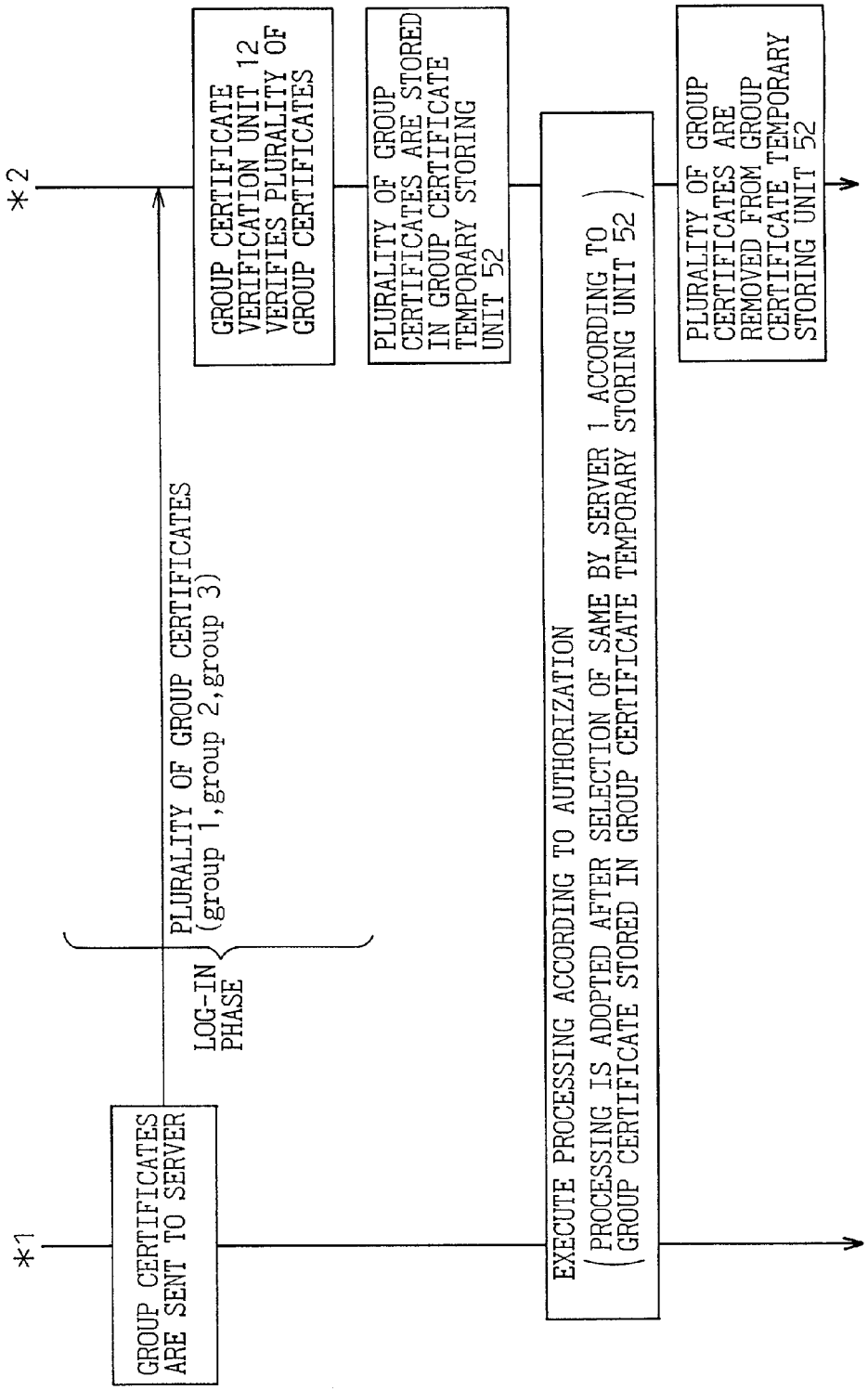
FIG. 47 is a second part of a view of the flow of the overall processing according to the seventh embodiment.

FIGS. 46 and 47 are parts of a view of the flow of the overall processing according to the seventh embodiment. Note, the description of the "group certificate acquirement phase" (refer to for example FIG. 23) is omitted, and "log-in phase" after that will be shown in detail.

First, in FIG. 46, the processing until a plurality of group certificates GC1 to GC3 are issued and the client 2 acquires them is similar to the cases of the above embodiments. When the client 2 then requests the remote processing to the server 1, the client 2 transmits the issued plurality of group certificates to the server 1.

The server 1 receiving the plurality of group certificates verifies the legitimacy of each in the group certificate verification unit 12 in the same way as the cases of the above embodiments. Some measures of how the result of this verification should be handled can be considered, but are not particularly prescribed in the present invention.

The verified group certificates are stored in the group certificate temporary storing unit 52. Some group certificates required in the following remote processing are appropriately selected and utilized. Below, an example of appropriately selecting the group certificates by the server will be shown, but here an explanation will be given by taking as an example the data of the group-authorization mapping storage means 15 shown in FIG. 11 of the first embodiment.

The user "user B" receives the group certificates for three groups of "group 1", "group 2", and "group 3" according to FIG. 44 and transmits them to the server 1 as shown in FIG. 47. It is assumed that the server 1 verifies the above three group certificates and decides that all are legitimate as the result of the verification. After that, it is assumed that the user "user B" requests remote processing such as "read (r) the file A and write (w) the result thereof into the file B" (refer to FIG. 11). In this case, for the read (r) operation of the file A, the authorization of the "group 1" was sufficient, therefore the server 1 fetches the group certificate GC corresponding to the "group 1" from the group certificate temporary storing unit 52 and uses this GC for the check in the group-authorization mapping storage means 15. Note that, if it is necessary to take a log as in the fifth embodiment, it is recorded in the log file 47 (FIG. 36) by using the group certificate corresponding to the "group 1".

Next, the result of the read (r) is written into the file B (w), but only the authorization of the "group 1" (only r) is insufficient for this. The authorization of the group 3 (both of r and w) are necessary. Accordingly, the server 1 switches to the group certificate GC3 corresponding to the group 3, fetches this from the group certificate temporary storing unit 52, and acquires the corresponding authorizations (r and w) by using this GC3 for the check in the means 15. If necessary, it describes this in the log file 47 by using the group certificate GC3 corresponding to the group 3 and performs the write operation to the file B.

As explained above, in the seventh embodiment, a plurality of group certificates GC or log-in requests GC' transmitted from the client 2 are temporarily stored after the verification by the server 1. Therefore, a suitable one is selected from among them and utilized in accordance with the remote processing requested by the user U.

By this, even in a case where the user U does not know the group membership which becomes necessary for the remote processing and a case where a plurality of different group memberships are necessary for one series of remote processings, the server side can proceed with the processing by selecting the suitable group certificate or log-in request while appropriately switching them. For this reason, on the user side, it becomes sufficient to only once transmit a plurality of group certificates or log-in requests, so an effect that the convenience and efficiency of the system 10 rise can be obtained.

As explained above, according to the present invention, in comparison with the already explained ticket of the related art, the issuance and verification of the ticket, i.e., a group certificate, at a high speed become possible.

Further, with such an authentication system, a plurality of remote processing requests may be made by one group certificate, mutual authentication between the clients and servers becomes possible, the group certificates of the same group and same valid term are issued to a plurality of users, the handling of a plurality of groups assigned to the user becomes possible, etc. By this, the effects of improvement in the safety, convenience, and efficiency are exhibited.

Also, by recording in the log file a log enabling checking of a specific user from among a plurality of users according to need, the safety and supervision capability of the system 10 are further enhanced.

While the invention has been described with reference to specific embodiment chosen for purpose of illustration, it should be apparent that numerous modifications could be made thereto by those skilled in the art without departing from the basic concept and scope of the invention.

What is claimed is:

1. A system of distributed group management for indirectly authenticating membership of a user in a group in order to manage security for a client on a client side and a server for executing a remote processing request from the client side under a predetermined authorization assigned for every group, provided with;
    a group certificate issuing apparatus for issuing a group certificate on the client side based on original group information including the name of the group to which the related user belongs when there is said remote processing request; and
    a group certificate verification unit for verifying a legitimacy of said group certificate transmitted from the client side in said server, wherein
    said group certificate issuing apparatus adds an issuance side processed value obtained by encrypting the information of the original group information by a cryptographic function to the original group information and defines this as the group certificate,
    said group certificate verification unit processes part of the information included in the received group certificate by an identical cryptographic function to obtain a verification side processed value and performs said authentication by confirming that said issuance side processed value and said verification side processed value coincide,
    said group certificate issuing apparatus includes first secret information assigned to said groups in said original group information and performs the processing by said cryptographic function, said first secret information being held only by said group certificate issuing apparatus,
    said group certificate verification unit includes second secret information assigned to the groups in part of information included in said received group certificate and performs the processing by said cryptographic function, said second secret information being held only by said group certificate verification unit,
    said first secret information and said second secret information are identical secret information for identical groups, and
    said cryptographic function is a hash function.

2. A method of distributed group management for indirectly authenticating membership of a user in a group in order to manage security for a client on a client side and a server for executing the remote processing request from the client side under a predetermined authorization assigned for every group, comprising the step of:
    processing information of original group information including the name of the group to which the related user belongs by a cryptographic function when there is said remote processing request on the client side and issuing a group certificate obtained by adding an issuance side processed value obtained by encrypting the information of the original group information by the cryptographic function to the original group information, and including first secret information assigned to said groups in said original group information and performing the processing by said cryptographic function, said first secret information being held only by a group certificate issuing apparatus,
    processing the information of the received group certificate by an identical cryptographic function to obtain a verification side processed value on a server side, and including second secret information assigned to the groups in part of information included in said received group certificates and performing the processing by said cryptographic function, said second secret information being held only by a group certificate verification unit, said first secret information and said second secret information being identical secret information for identical groups, and
    comparing said verification side processed value and received issuance side processed value on the server side and confirming that they coincide, thereby to perform said authentication, and verify the legitimacy of said group certificate transmitted from the client side in said server, wherein
    said cryptographic function is a hash function.

3. A group certificate issuing apparatus comprising part of a system of distributed group management for indirectly authenticating membership of a user to a group in order to manage security with respect to a client on a client side and a server including a group certificate verification unit for executing a remote processing request from The client side under a predetermined authorization assigned for every group, provided with:
    an issuance side processor for issuing original group information including the name of the group with the related user membership thereto when there is said remote processing request and, at the same time, adding an issuance side processed value obtained by encrypting the information of the original group information by a cryptographic function to the original group information to obtain a group certificate,
    said group certificate issuing apparatus including first secret information assigned to said groups in said Original group information and performing the processing by said cryptographic function, said first secret information being held only by said group certificate issuing apparatus, and
    said first secret information and second secret information held by said group certificate verification unit to be communicated with said group certificate issuing apparatus are identical secret information for identical groups, wherein
    said cryptographic function is a hash function, and said issuance side processor is provided with a hash facility for performing the processing of the hash function.

4. A group certificate issuing apparatus as set forth in claim 3, wherein said issuance side processor centrally applies the processing of said hash function with respect to at least the group name and the secret information unique to that group, regards said issuance side processed value as the temporary password "temp", and generates said group certificate from at least said group name and said temporary password.

5. A group certificate issuing apparatus as set forth in claim 4, wherein it cooperates with a hash function unit provided in said client and the hash function unit applies the processing of said hash function in times with respect to said temporary password, regards the obtained issuance side processed value as a one-time password, and a log-in request comprised of at least said group name and said one time password is generated by the client in place of said group certificate.

6. A group certificate issuing apparatus as set forth in claim 5, wherein a unique ID generation means is further included and, at the same time,
said issuance side processor further adds the valid term information to said group name and the secret information unique to the group and applies the processing of said hash function, obtains said one time password based on an obtained temporary password and generates said log-in request, and
said unique ID generation means generates the certificate ID for identifying the log-in requests for every user when the log-in requests having the identical contents are issued with respect to plurality of different said users and adds the same to each corresponding log-in request.

7. A group certificate issuing apparatus as set forth in claim 4, wherein it cooperates with a unique ID generation means provided in said client, and the unique ID generation means generates an authentication ID for mutual authentication between said client and said server, contains the authentication ID in said group certificate, and transmits the same to said server.

8. A group certificate issuing apparatus as set forth in claim 7, wherein said transmitted group certificate including said authentication ID is received at said server, a server reply obtained by applying a predetermined processing with respect to this is returned to said client, a server reply expected in the client by using the same processing as the predetermined processing and the returned server reply are compared, and when the two coincide, the client authenticates the server.

9. A group certificate issuing apparatus as set forth in claim 4, wherein it cooperates with an encryption processing unit provided in said client, and the encryption processing unit establishes an encryption session from the client to said server with said temporary password as an encryption key.

10. A group certificate issuing apparatus as set forth in claim 4, wherein provision is made of a log file for recording the log of the session according to each said remote processing request for each of said users, and supervision of each user is performed based on the log.

11. A group certificate issuing apparatus as set forth in claim 10, wherein said temporary password for every said session is included in said log and thereby to identify the sessions.

12. A group certificate issuing apparatus as set forth in claim 4, wherein a unique ID generation means is further included and, at the same time,
said issuance side processor further adds valid term information to said group name and the secret information unique to the group and applies the processing of said hash function, regards obtained said issuance side processed value as the temporary password, and generates said group certificate from said group name, said valid term information, and said temporary password, and
said unique ID generation means generates the certificate ID for identifying these group certificates for every user and adds the same to corresponding each group certificate when the group certificates having the identical contents are issued with respect to plurality of different said users.

13. A group certificate issuing apparatus as set forth in claim 3, wherein provision is made of a user-group mapping storage means, and in the user-group mapping storage means, a plurality of different groups can be assigned for one said user.

14. A group certificate verification unit comprising a system of distributed group management for indirectly authenticating the membership of a user to a group in order to manage security of a client on a client side and a server for executing a remote processing request from the client side under a predetermined authorization assigned for every group, including:
a verification side processor for processing information included in a group certificate issued by a group certificate issuing apparatus and received from the client side by a cryptographic function to generate a verification side processed value on the server side and performing said authentication by confirming that an issuance side processed value included in the received group certificate and said verification side processed value coincide,
said group certificate verification unit including second secret information assigned to the groups in part of information included in said received group certificate and performing the processing by said cryptographic function, said second secret information being held only by said group certificate verification unit, and
first secret information held by said group certificate issuing apparatus to be communicated with said group certificate verification unit and said second secret information are identical secret information for identical groups, wherein
said cryptographic function is a hash function and said verification side processor is provided with the hash facility for performing the processing of the hash function.

15. A group certificate verification unit as set forth in claim 14, wherein said verification side processor centrally applies the processing of said hash function with respect to at least the group name and the secret information unique to that group included in said group certificate received from the client side so as to reproduce said verification side processed value as the reproduced temporary password.

16. A group certificate verification unit as set forth in claim 15, wherein said verification side processor is a bash function unit, and the hash function unit applies the processing of said hash function to said temporary password rn number of times to reproduce said verification side processed value as a one-time password and confirms that the reproduced one-time password and the one time password extracted from the log-in request including the one-time password similarly generated on the client side coincide to perform said authentication.

17. A group certificate verification unit as set forth in claim 16, wherein it receives log-in requests added with log-in request IDs for identifying these log-in requests for every user from said client and allots said plurality of different users to identical groups by the log-in request ID when said log-in requests having the identical contents are issued with respect to plurality of different said users.

18. A group certificate verification unit as set forth in claim 15, wherein, for the mutual authentication between said client and said server, the authentication ID transmitted included in said group certificate is received from said client, predetermined processing is applied with respect to this to generate a server reply, the server reply is returned to said client and compared with the server reply expected in the client by using the same processing as the predetermined processing, and when the two coincide, the client authenticates the server.

19. A group certificate verification unit as set forth in claim 15, wherein it cooperates with an encryption processing unit provided in said server, said encryption processing unit establishing an encryption session from the server to said client with said temporary password as an encryption key.

20. A group certificate verification unit as set forth in claim 15, wherein it receives group certificates added with certificate IDs for identifying these group certificates for every user from said client and allots said plurality of different users to the identical groups by the certificate IDs when group certificates having identical contents are issued with respect to a plurality of different users.

21. A group certificate verification unit as set forth in claim 15, wherein it cooperates with a log-in request temporary storing unit provided in said server, and, when the assignment of the plurality of different groups is enabled for one said user, it verifies said log-in requests received from said client, stores them in the log-in request temporary storing unit, and switches and uses the stored log-in requests in accordance with said predetermined authorization necessary for the request with respect to following remote processing requests.

22. A group certificate verification unit as set forth in claim 14, wherein it cooperates with a log file provided in said server, the log file recording a log of the session according to each said remote processing request for each of said users, each user being supervised based on the log.

23. A group certificate verification unit as set forth in claim 22, wherein said temporary password for every said session is included in said log to identify the sessions.

24. A group certificate verification unit as set forth in claim 14, wherein it cooperates with a group certificate temporary storing unit provided in said server, and, when the assignment of a plurality of different groups is enabled for one said user, it verifies said group certificates received from said client, stores them in the group certificate temporary storing unit, and switches and uses the stored group certificates in accordance with said predetermined authorization necessary for the request with respect to the following remote processing requests.

* * * * *